US012765469B2

(12) # United States Patent
Horst

(10) Patent No.: US 12,765,469 B2
(45) Date of Patent: Oct. 20, 2026

(54) BALER

(71) Applicant: Marcrest Manufacturing Inc., Listowel (CA)

(72) Inventor: Keith Horst, Listowel (CA)

(73) Assignee: Marcrest Manufacturing Inc., Listowel (CA)

( * ) Notice: Subject to any disclaimer, the term of this patent is extended or adjusted under 35 U.S.C. 154(b) by 181 days.

(21) Appl. No.: 18/910,057

(22) Filed: Oct. 9, 2024

(65) Prior Publication Data

US 2025/0113777 A1 Apr. 10, 2025

Related U.S. Application Data

(60) Provisional application No. 63/543,336, filed on Oct. 10, 2023.

(51) Int. Cl.

*A01F 15/14* (2006.01)
*A01F 15/08* (2006.01)
*A01F 15/10* (2006.01)
*B65B 13/26* (2006.01)

(52) U.S. Cl.

CPC ........ *A01F 15/145* (2013.01); *A01F 15/0858* (2013.01); *A01F 15/10* (2013.01); *B65B 13/26* (2013.01); *A01F 2015/0866* (2013.01)

(58) Field of Classification Search

CPC ............ A01F 2015/0866; A01F 15/145; A01F 15/0858; A01F 15/10; B65B 13/26

See application file for complete search history.

(56) References Cited

U.S. PATENT DOCUMENTS

| | | | |
|---|---|---|---|
| 3,366,036 | A | 1/1968 | May et al. |
| 4,074,623 | A | 2/1978 | White |
| 4,196,661 | A | 4/1980 | Peterson et al. |

(Continued)

FOREIGN PATENT DOCUMENTS

| | | | |
|---|---|---|---|
| DE | 10244816 | A1 | 4/2004 |
| EP | 0636308 | B1 | 3/1999 |

(Continued)

OTHER PUBLICATIONS

The search report for the corresponding GB Application No. GB2414902.3 dated Mar. 12, 2025.

*Primary Examiner* — Jimmy T Nguyen

(74) *Attorney, Agent, or Firm* — Gowling WLG (Canada) LLP

(57) ABSTRACT

A baler for forming crop material into bales. The baler includes a plunger moved by a plunger subassembly to form the bale, a knotter mechanism for knotting twine that is pulled onto the bale, and a knotter control assembly for controlling the knotter mechanism. The knotter control assembly includes a drive sprocket rotatable about its axis in timed relationship with movement of the plunger, a clutch plate mounted to the drive sprocket, and a knotter shaft positioned coaxially with the clutch plate. The knotter control assembly includes an actuation subassembly for engaging and disengaging the clutch plate with the knotter shaft. Upon activation, the actuation subassembly engages the clutch plate with the knotter shaft to activate the knotter mechanism, for knotting the twine on the bale. The actuation subassembly subsequently disengages the knotter shaft and the clutch plate.

12 Claims, 43 Drawing Sheets

Knotter Home

(56) References Cited

U.S. PATENT DOCUMENTS

| | | | | |
|---|---|---|---|---|
| 4,420,177 | A | 12/1983 | Munro et al. | |
| 4,735,446 | A | 4/1988 | Homberg | |
| 4,765,235 | A | 8/1988 | Schrag et al. | |
| 4,885,991 | A | 12/1989 | Borba | |
| 5,058,495 | A | 10/1991 | Van Den Bossche et al. | |
| 6,394,245 | B2 | 5/2002 | Kendrick et al. | |
| 6,474,228 | B1 | 11/2002 | Leupe et al. | |
| 7,900,555 | B2 | 3/2011 | Webber | |
| 8,671,834 | B1 | 3/2014 | Rotole et al. | |
| 9,101,092 | B2 | 8/2015 | Verhaeghe et al. | |
| 9,730,392 | B2 | 8/2017 | De Gersem et al. | |
| 9,883,633 | B2 * | 2/2018 | Demon | A01F 15/145 |
| 2022/0304241 | A1 * | 9/2022 | Wood | A01D 59/04 |

FOREIGN PATENT DOCUMENTS

| | | | | | |
|---|---|---|---|---|---|
| EP | 3646720 | A1 | * | 5/2020 | A01F 15/14 |
| EP | 3903562 | A1 | * | 11/2021 | A01F 15/148 |
| FR | 2423974 | A1 | | 11/1979 | |
| GB | 2051889 | A | * | 1/1981 | A01F 15/145 |

* cited by examiner

Knotter Rotate 100° - Trip Reset

Knotter Rotate 325° - Trip Disengage Start

BALER

CROSS-REFERENCE TO RELATED APPLICATION

This application claims the benefit of U.S. Provisional Patent Application No. 63/543,336, filed on Oct. 10, 2023, the entirety of which provisional patent application is hereby incorporated herein by reference.

FIELD OF INVENTION

The present invention is a baler for forming bales of crop material.

BACKGROUND OF THE INVENTION

As is known in the art, the production rate of a conventional baling machine often is limited by the knotter device thereof. The conventional knotter device includes a clutch for engagement of the knotter device with a drive sprocket, when a bale has been formed in a bale-forming chamber and is ready for twine to be pulled around the bale, and knotted. As is will known in the art, the bale is formed by a plunger that moves into the chamber to form the bale, to hold the bale when the twine is pulled by needles onto the bale and knotted. Subsequently, the plunger moves out of the chamber, to allow more crop material to be moved into the chamber, for formation of the next bale.

For the baler to function properly, the knotter and the plunger need to work together smoothly. For example, the needles must be withdrawn from the compression chamber before the plunger moves into the chamber again, to form the next bale.

The clutch of the conventional knotter is intended to disengage from a knotter shaft promptly once knotting is completed, and the knotter is intended to reset promptly. When the knotter functions properly, the knotter resets before the plunger moves into the chamber, to form the next bale. However, at higher productivity rates, the knotter shaft tends to overshoot, or to continue rotating, after knotting is completed, delaying the knotter's reset. Depending on the extent of the delay, the knotter's failure to reset properly may cause the entire baler to malfunction, potentially damaging the baler and, at a minimum, resulting in lost production.

The risk of this occurring can be reduced by limiting the production rate, however, this is undesirable. Also, when the production rate is reduced, the rotation of a knotter shaft may be abruptly stopped, once knotting is completed. The knotter shaft and other components may be subjected to significant sudden stresses.

There are other problems with conventional baling machines. For example, loose crop material (e.g., hay) that may accumulate in slots or notches in the floor of the bale-forming chamber tends to interfere with the twine that is pulled around the bale before the twine is knotted. When this happens, the result is a badly formed bale, in which the twine was not pulled tightly against the body of the bale before knotting.

SUMMARY OF THE INVENTION

For the foregoing reasons, there is a need for a baler that overcomes or mitigates one or more of the defects or deficiencies of the prior art. In particular, from the foregoing, it can be seen that there is a need for a baler with a knotter that consistently resets promptly in a timed relationship to the plunger, even when the baler is functioning at a high production rate.

In its broad aspect, the invention provides a baler for forming crop material into bales. The baler includes a plunger moved by a plunger subassembly to form the bale in a predetermined compression position, a knotter mechanism for knotting twine that is pulled onto the bale, and a knotter control assembly for controlling the knotter mechanism. The knotter control assembly includes a drive sprocket rotatable about its axis in timed relationship with movement of the plunger, a clutch plate mounted to the drive sprocket, and a knotter shaft positioned coaxially with the clutch plate. The knotter control assembly includes an actuation subassembly for engaging and disengaging the clutch plate with the knotter shaft. Upon activation, the actuation subassembly engages the clutch plate with the knotter shaft to activate the knotter mechanism, for knotting the twine on the bale. The actuation subassembly subsequently disengages the knotter shaft and the clutch plate.

The actuation subassembly includes a collar at least partially secured to the knotter shaft, a control arm, a stop arm partially supported by the control arm, and a trip arm that is pivotably mounted to the collar. The stop arm includes one or more upper engagement surfaces. The trip arm includes a body portion and first and second arms extending from the body portion. The first arm includes a drive roller rotatably mounted thereon, and the second arm includes a control roller rotatably mounted thereon for the upper engagement surface of the stop arm. When the bale is formed and located in the predetermined compression position, a bale length mechanism moves the control arm to an activated position thereof, causing the stop arm to move to an activated stop arm position.

When the stop arm moves to the activated stop arm position, the trip arm is moved to a trigger position thereof, to locate the drive roller in the drive cam, for engaging the knotter shaft with the clutch plate to rotate the knotter shaft about the axis, to activate the knotter mechanism. Upon the clutch plate rotating a predetermined radial distance from a preselected start position thereof, the trip arm disengages the drive roller from the drive cam, to disengage the knotter shaft from the clutch plate, thereby deactivating the knotter mechanism.

The upper engagement surface of the stop arm includes an extension region. When the trip arm disengages the drive roller from the drive cam, if the knotter shaft continues to rotate about the axis, then the control roller rolls along the extension region until the knotter shaft ceases rotating.

BRIEF DESCRIPTION OF THE DRAWINGS

The invention will be better understood with reference to the attached drawings, in which.

DETAILED DESCRIPTION

Figure 1A:
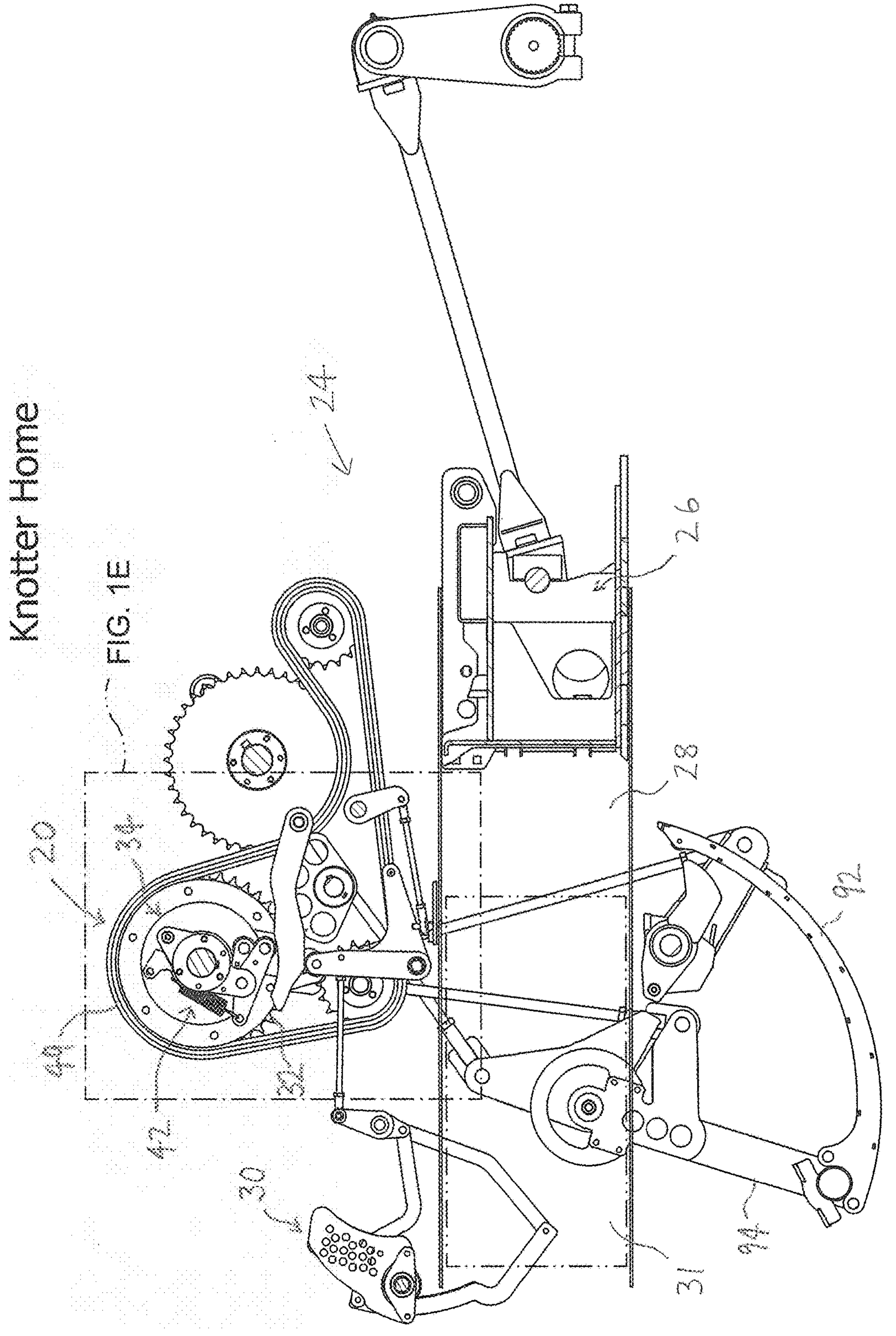
FIG. 1A is a partial cross-section of an embodiment of a baler of the invention.

In the attached drawings, like reference numerals designate corresponding elements throughout. Reference is made to FIGS. 1A-14 to describe an embodiment of a baler in accordance with the invention indicated generally by the numeral 24 (FIG. 11).

In the embodiment of the baler 24 illustrated in FIGS. 11-14, the baler 24 is configured to be connected with a tractor (not shown) or other suitable vehicle capable of moving the baler 24 and also equipped with a suitable power source (e.g., via a power take-off) that may be used to power the baler. Those skilled in the art would appreciate that an engine may, alternatively, be permanently attached to the baler, e.g., to provide power via a power take-off.

Figure 13A:
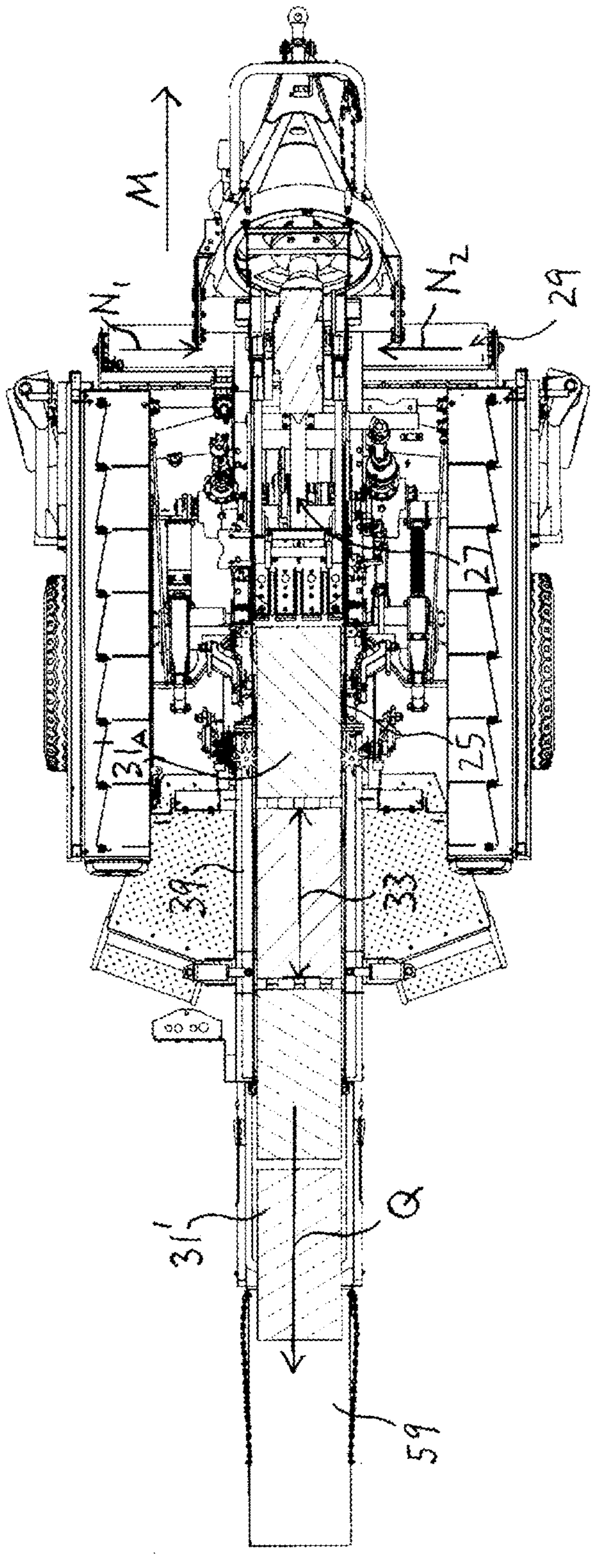
FIG. 13A is a horizontal longitudinal section through the baler of FIGS. 11 and 12.

The baler 24 is for forming a crop material (e.g., hay) into one or more bales 31, each bale 31 having a predetermined length 33 (FIG. 13A). It will be understood that the bales 31 formed by the baler 24 are "square" bales.

Preferably, the baler 24 also includes a feeder assembly 29 (FIGS. 13A, 13B, 14) for feeding the crop material (not shown) into a compression chamber 28. In FIG. 13A, a bale segment identified by reference character 31'A is shown in the compression chamber 28, in a predetermined compression position (as will be described). It will be understood that the crop material is moved by the feeder assembly 29 to a stuffer (not shown) that pushes the crop material into the compression chamber 28.

Figure 13B:
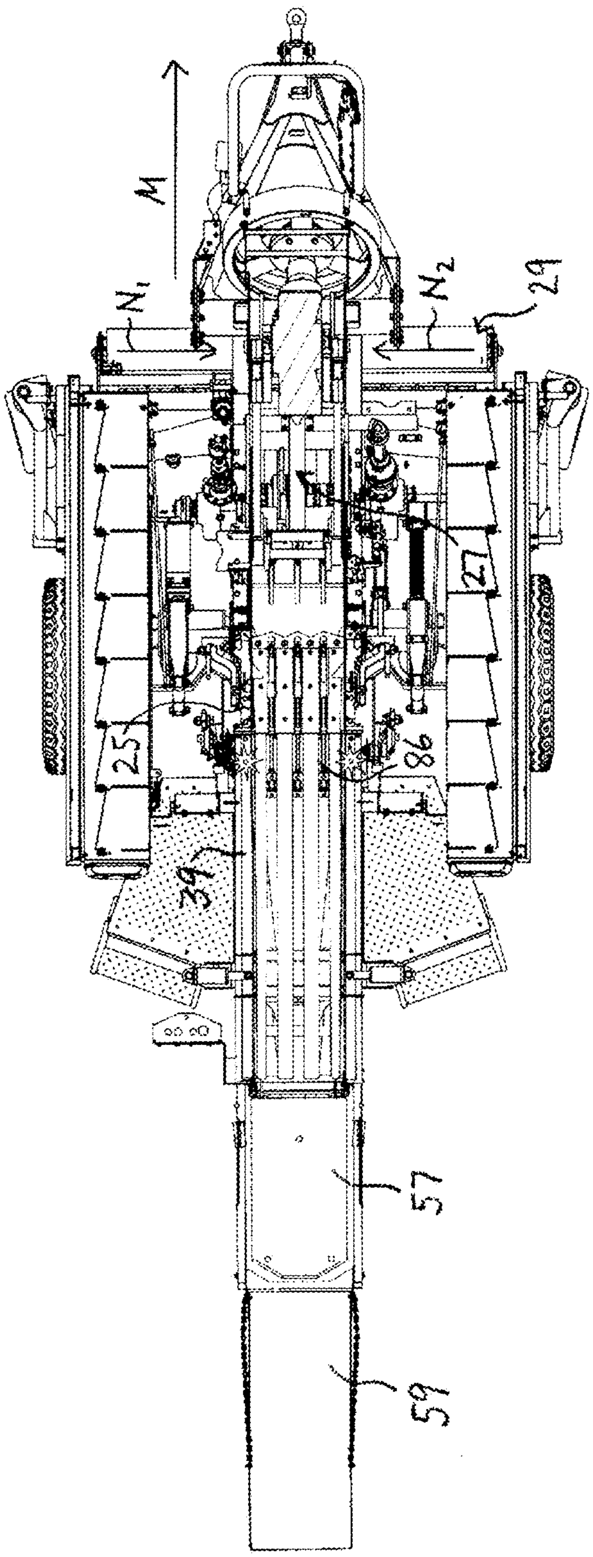
FIG. 13B is a horizontal longitudinal section midway through the baler of FIGS. 11 and 12, from which the bales are omitted.
Figure 14:
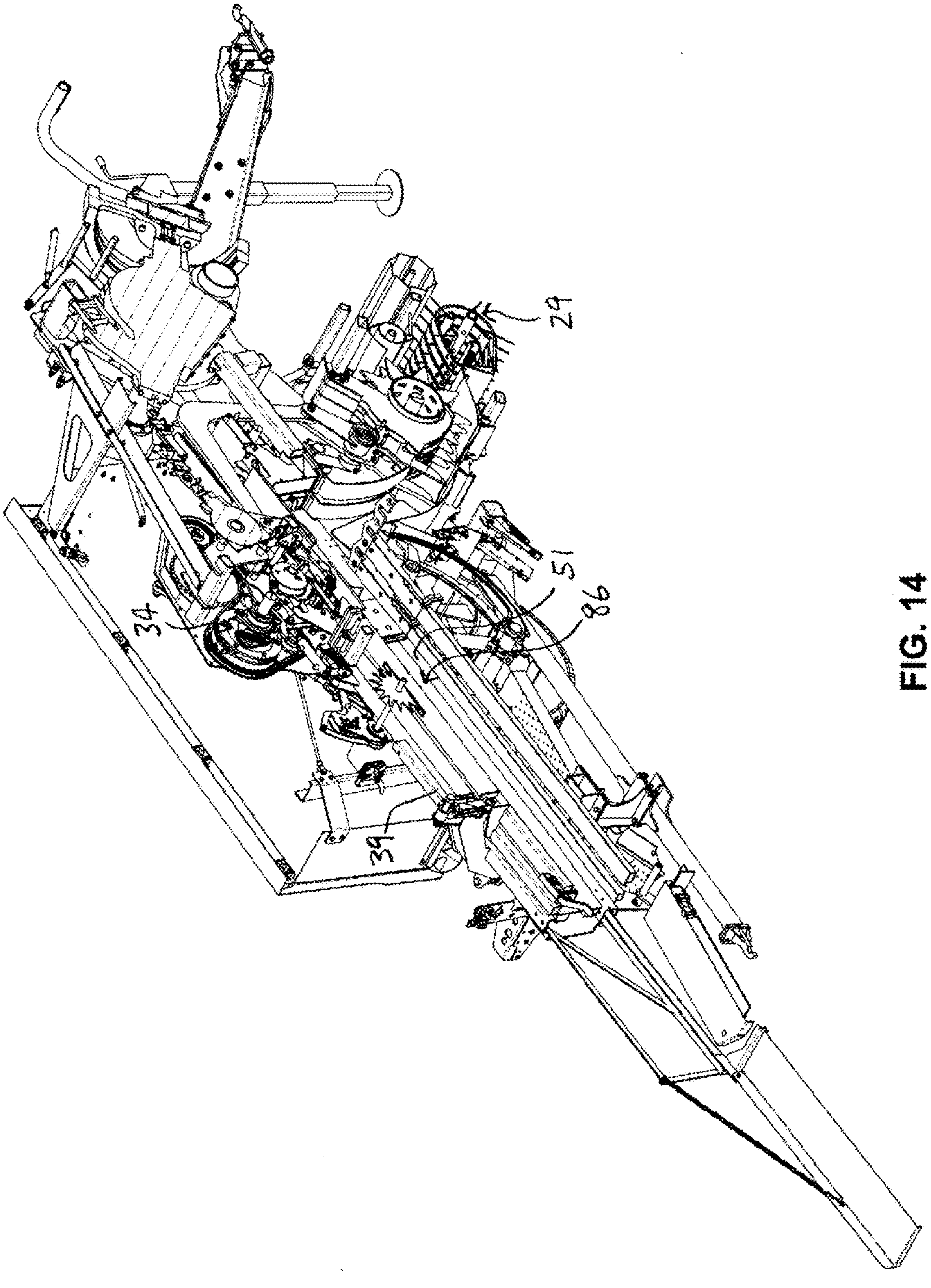
FIG. 14 is an isometric view of a partial vertical longitudinal section of the baler of FIG. 12, from which the bales are omitted.

Those skilled in the art would appreciate that the feeder assembly 29 is configured to pick up the crop material off the ground while the baler 24 is moved in a forward direction (FIGS. 13A, 13B, 14). In FIGS. 13A and 13B, the forward direction of movement is indicated by arrow "M". After the crop material is picked up, it is moved (in the directions indicated by arrows "$N_1$" and "$N_2$" in FIG. 12), toward the compression chamber 28.

The crop material is compressed in the compression chamber 28 to form the bale 31. The compression chamber 28 is partially defined by a floor 86 (FIGS. 6A, 6B) and walls 25 (FIGS. 13A, 13B). As will be described, the baler 24 preferably also includes a plunger 26 in a plunger subassembly 27 (FIGS. 13A, 13B) that is configured to move the plunger 26 between extended and retracted positions thereof (FIGS. 5A, 8A respectively) in the compression chamber 28. The plunger compresses the crop material into the bale 31 when the plunger is in the extended position. When the bale is formed and the plunger is in the extended position, the plunger 26 locates the bale 31 in the predetermined compression position in the compression chamber. It will be understood that the bale 31 is shown in the predetermined compression position in the compression chamber 28 in FIGS. 1A, 6B and 7B.

The baler includes a knotter mechanism 22, and a knotter control assembly 20. The knotter mechanism 22 is for knotting twine 37 that has been pulled onto the bale 31, when the bale 31 is in the predetermined compression position. Those skilled in the art would appreciate that, for the purposes hereof, "twine" refers to any suitable twine-like material or string (e.g., a nylon string) that may be knotted around the bale.

Figure 1B:
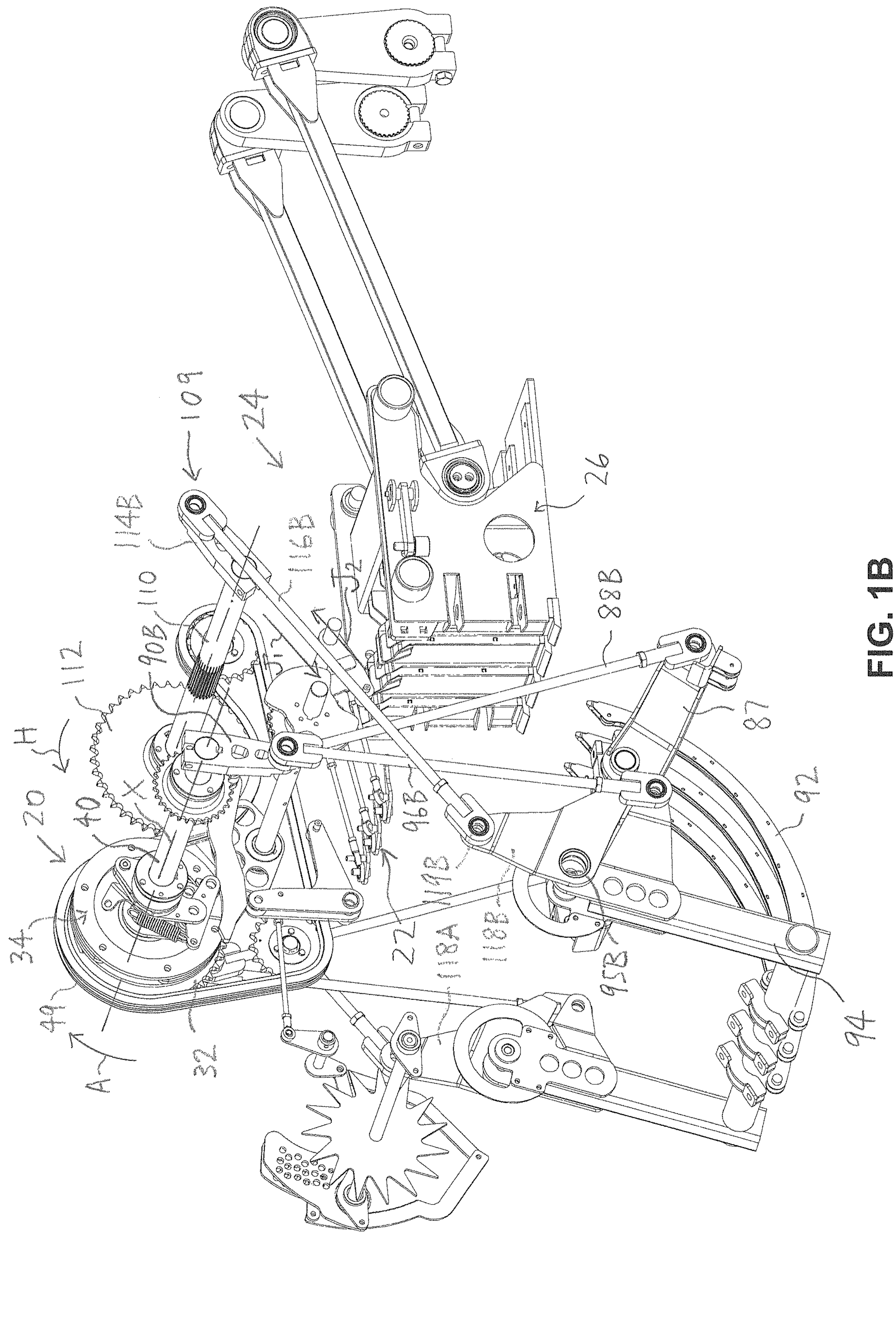
FIG. 1B is an isometric view of selected elements of the baler of FIG. 1A.
Figure 1C:
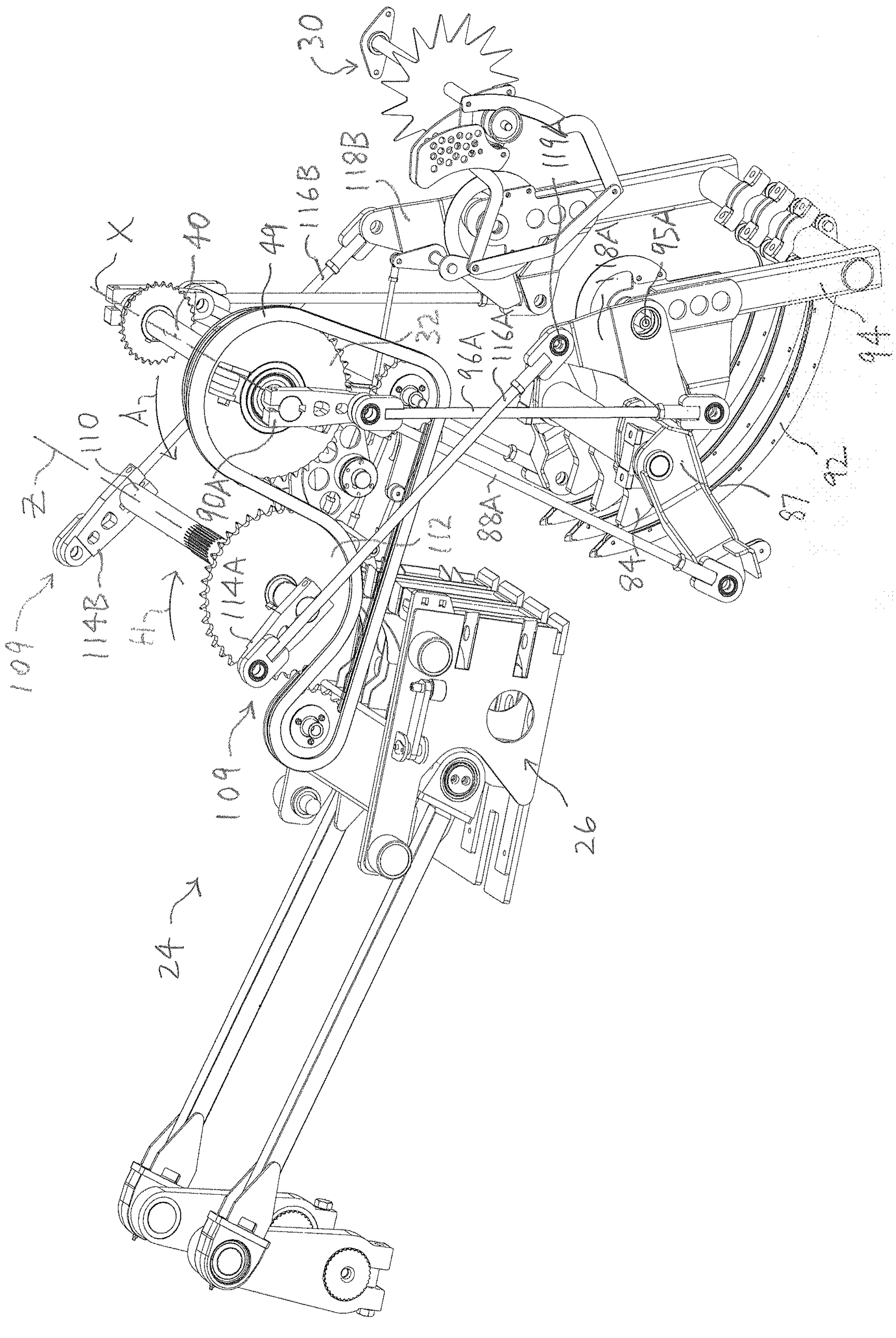
FIG. 1C is another isometric view of the elements of FIG. 1B.
Figure 1D:
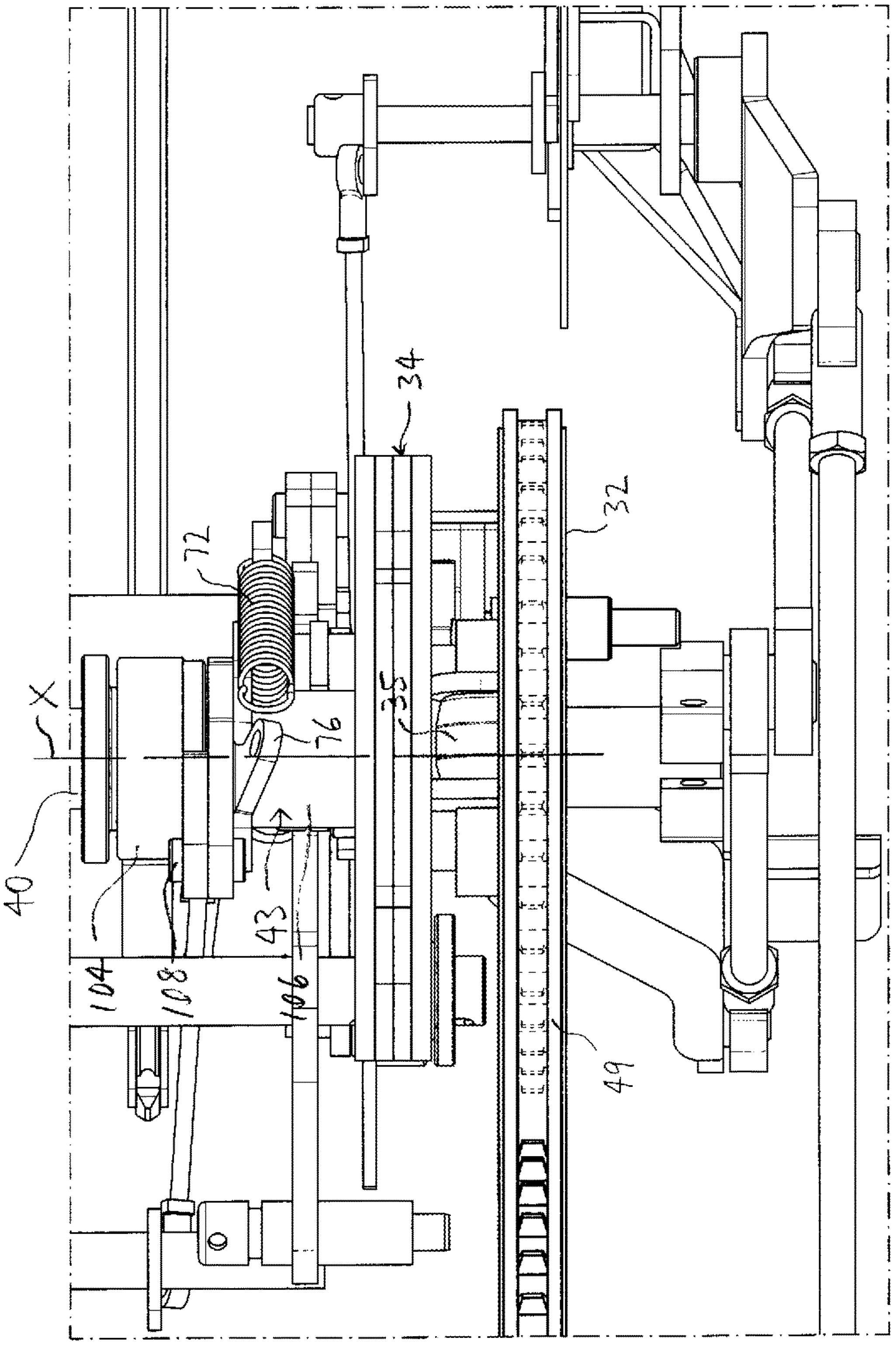
FIG. 1D is a top view of an embodiment of a clutch plate and a drive sprocket of the invention, drawn at a larger scale.

The knotter control assembly 20 is for controlling the knotter mechanism 22, as will be described. In one embodiment, the knotter control assembly 20 preferably includes a drive sprocket 32 defining an axis "X" thereof (FIGS. 1B-1D). The drive sprocket 32 is rotatable about the axis "X" in timed relationship with movement of the plunger 26 between the plunger's extended and retracted positions.

Figure 1E:
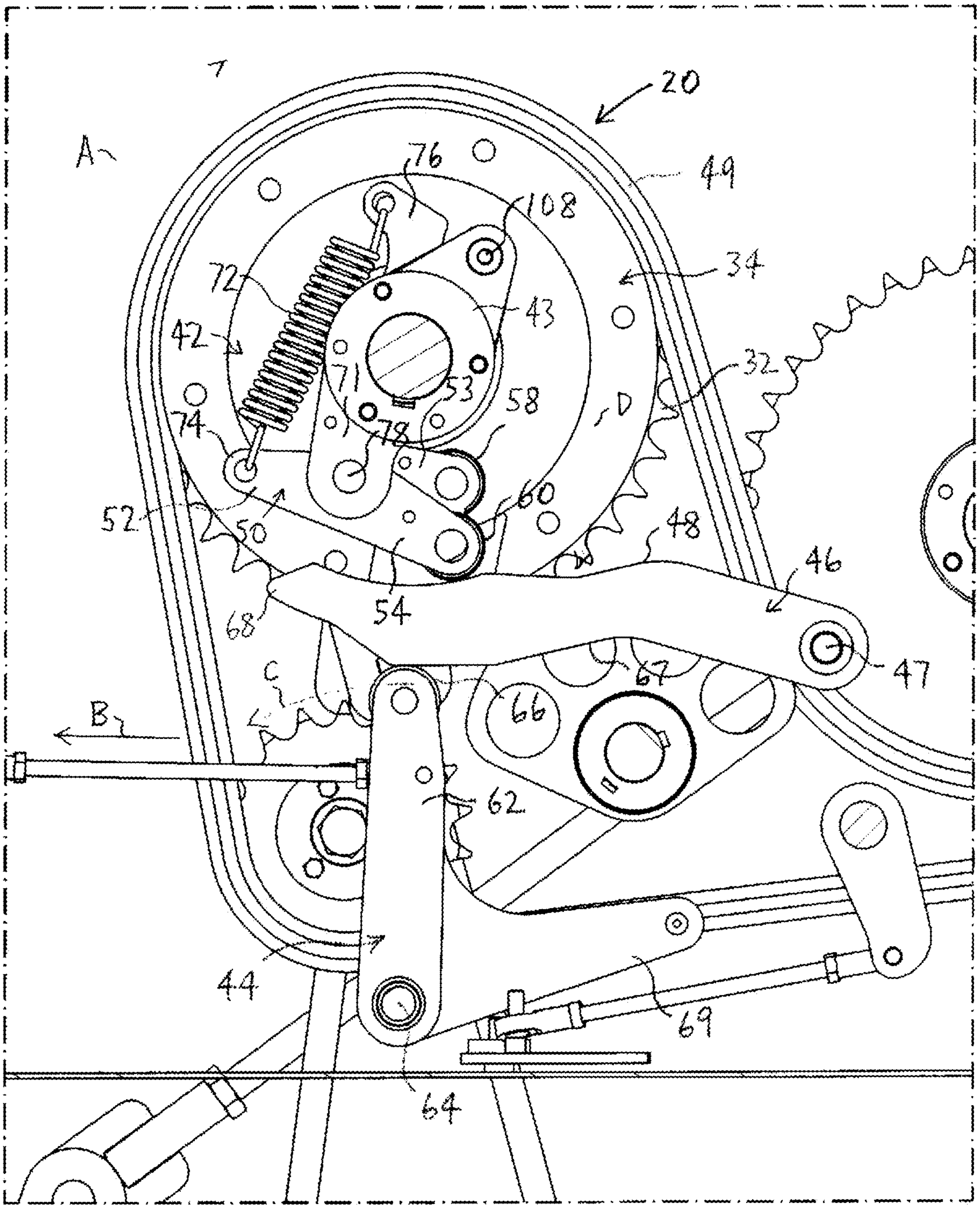
FIG. 1E is a side view of an embodiment of a knotter control assembly of the invention including an actuation subassembly and the clutch plate in which the actuation subassembly is in its home condition and the clutch plate is in a preselected start position, drawn at a smaller scale.
Figure 1F:
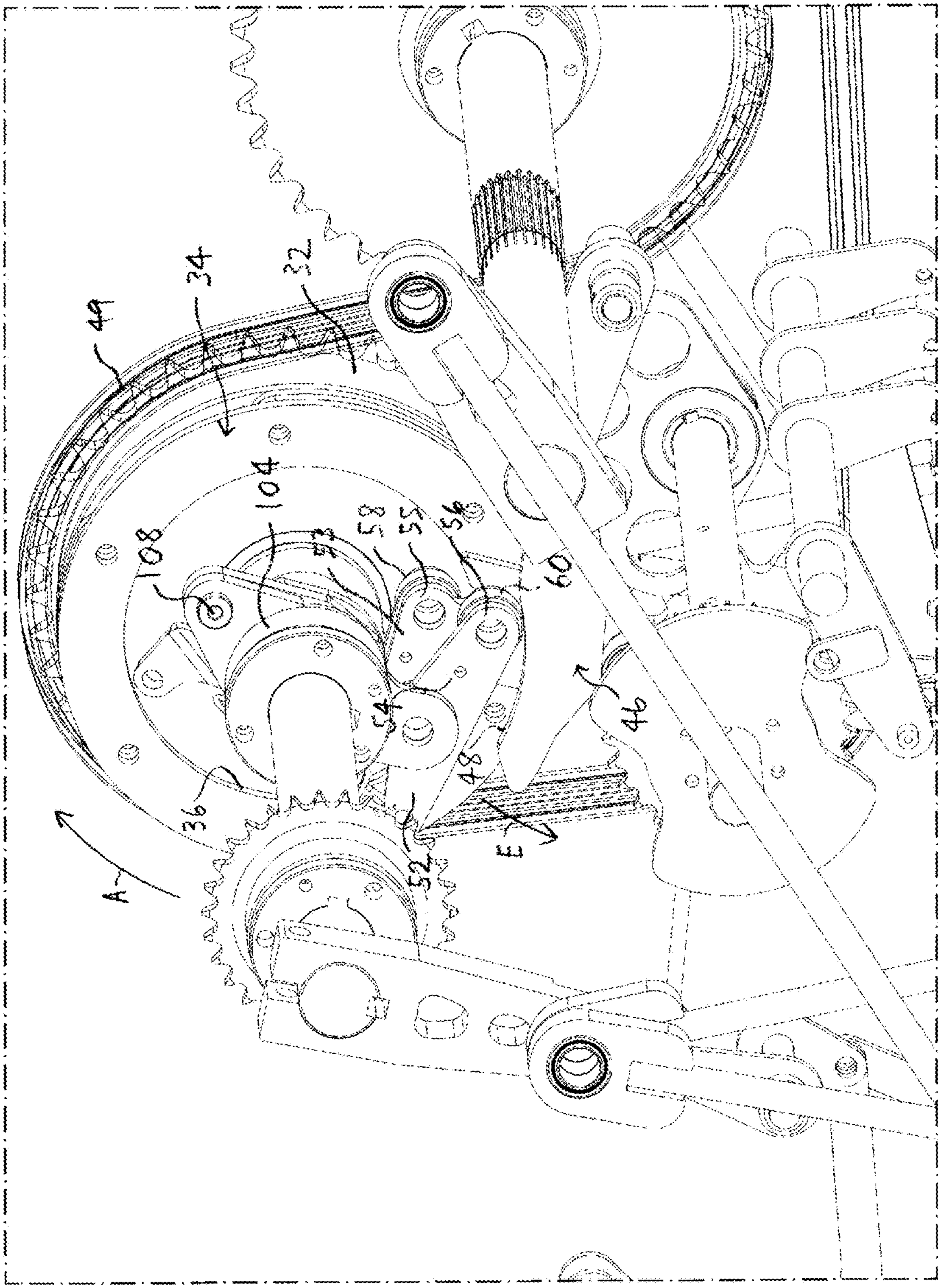
FIG. 1F is an isometric view of the knotter control assembly and the clutch plate of FIG. 1E.
Figure 1G:
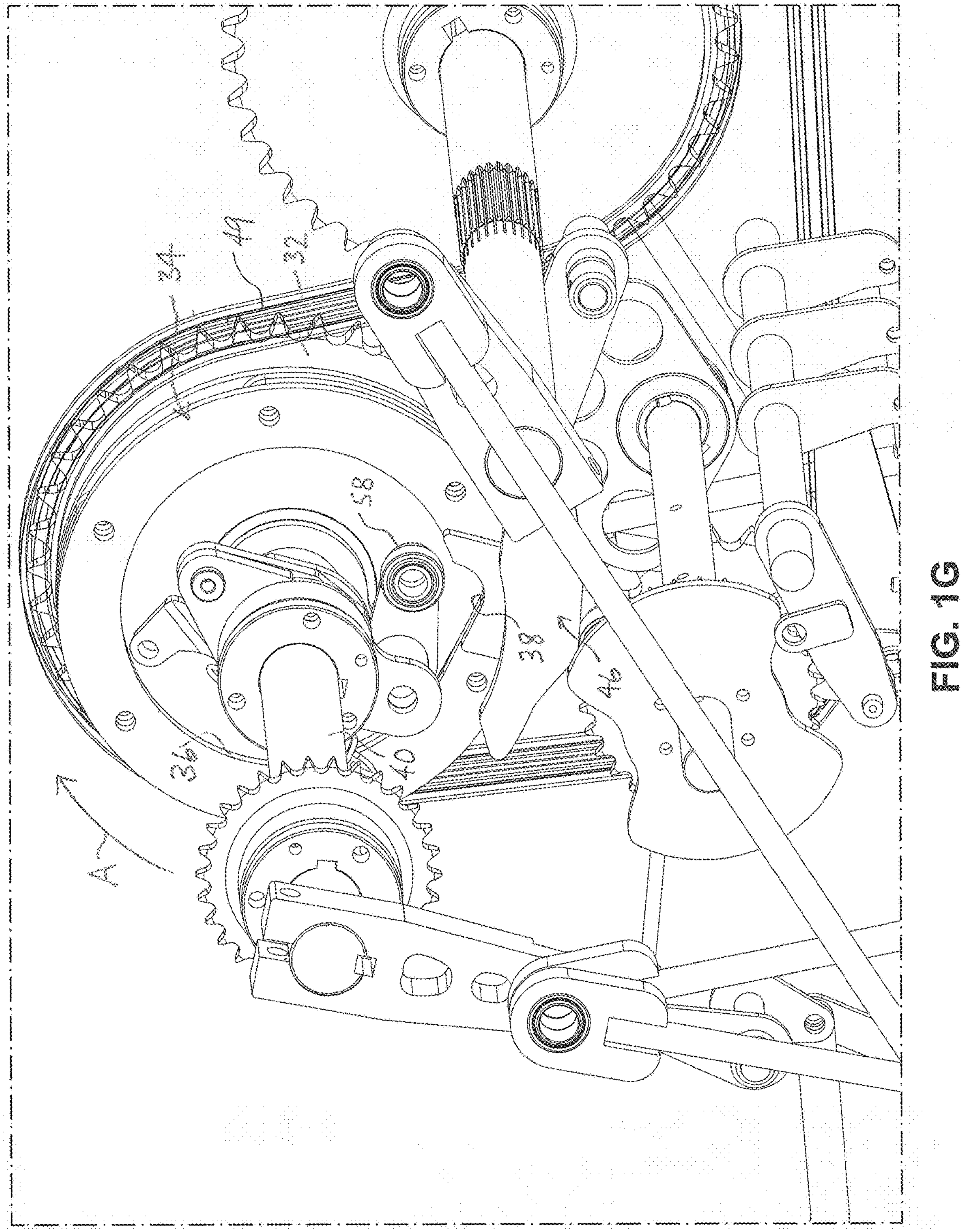
FIG. 1G is another isometric view of the knotter control assembly and the clutch plate of FIG. 1F.

The knotter control assembly 20 preferably includes a clutch plate 34 that is coaxially secured to the drive sprocket 32 (FIGS. 1D, 1E). The clutch plate 34 and the drive sprocket 32 preferably are at least partially connected by one or more rubber bushings 35 (FIG. 1D). As will be described, the clutch plate 34 preferably includes a roller path 36, and a drive cam 38 is formed in the roller path 36 (FIGS. 1E-1G).

As can be seen in FIG. 1B, the knotter control assembly 20 preferably also includes a knotter shaft 40 that is coaxially positioned with the clutch plate 34, and the drive sprocket 32. The knotter shaft 40 is operatively connected with the knotter mechanism 22. Rotation of the knotter shaft 40 in a predetermined direction indicated by arrow "A" about the axis "X" activates and drives the knotter mechanism 22 (FIG. 3B), which knots the twine wrapped onto the bale 31.

In one embodiment, the drive sprocket 32 preferably is driven by a chain 49 engaged therewith, the chain 49 being driven by a suitable engine or prime mover (not shown). Those skilled in the art would appreciate that any suitable means other than a chain may be used for driving the knotter control assembly 20 and the knotter mechanism 22, e.g., a gearbox or other drive system.

As can be seen, e.g., in FIGS. 1D and 1E, the knotter control assembly 20 preferably also includes an actuation subassembly 42 for engaging and disengaging the clutch plate 34 with the knotter shaft 40. The baler 24 preferably also includes a bale length mechanism 30 for measuring a predetermined length of a bale 31 in the compression chamber 28, to activate the actuation subassembly when the bale has been formed (FIG. 1A). As will be described, the bale length mechanism is for activating the actuation subassembly, when the bale is in the predetermined compression position.

When the actuation subassembly 42 is activated (FIG. 2A), the actuation subassembly 42 engages the clutch plate with the knotter shaft to move the knotter control assembly 20 to the engaged condition thereof, thereby activating the knotter mechanism 22. The knotter mechanism knots the twine that has been pulled onto the bale 31, as will be described. Upon the knotter mechanism 22 completing knotting the twine, the actuation subassembly 42 disengages the knotter shaft from the clutch plate, to deactivate the knotter mechanism 22.

The actuation subassembly 42 preferably includes a collar 43 that is at least partially secured to the knotter shaft 40. In one embodiment, the actuation subassembly 42 preferably also includes a control arm 44, and a stop arm 46 partially supported by the control arm 44 (FIG. 1E). Preferably, the stop arm 46 is pivotable about a pivot point 47 and includes one or more upper engagement surfaces 48, as will also be described (FIGS. 1E, 1F).

As can be seen in FIG. 1G, when the actuation subassembly 42 is in its home condition, the clutch plate 34 (i.e., and the drive sprocket) is in a preselected start position, in which the drive cam 38 is located at a six o'clock position, i.e., at a lowermost position.

It will be understood that, in use, the knotter control assembly 20 proceeds through a cycle, in timed relationship with the plunger 26, to control the knotter mechanism 22 for each bale respectively, commencing in a deactivated or home condition, and ultimately returning to the deactivated or home condition. In FIGS. 1A-10E, the knotter control assembly 20 is shown at certain points in its cycle. For example, the knotter control assembly 20 is shown deactivated, i.e., in a home condition thereof, in FIGS. 1A-1G.

Figure 2A:
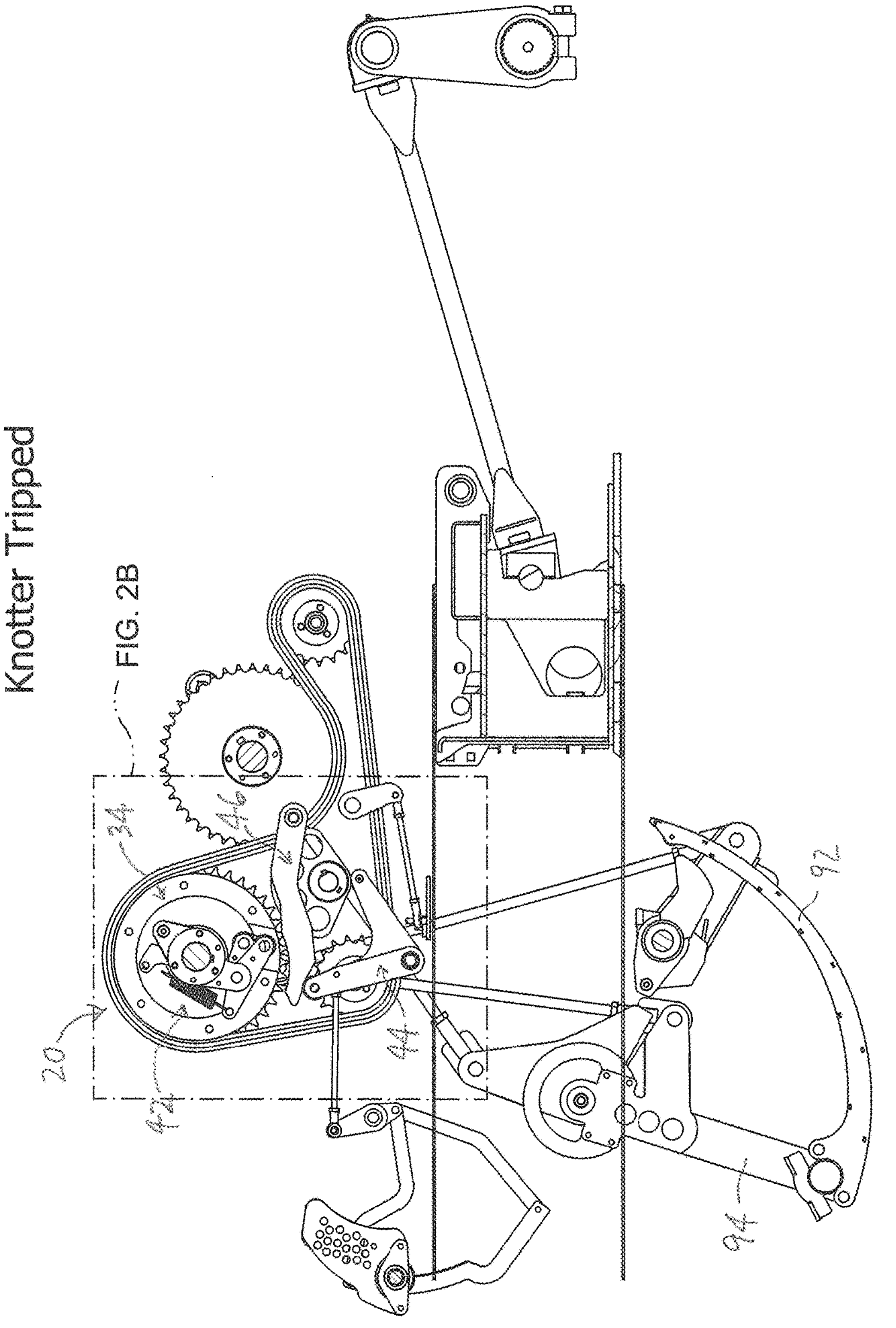
FIG. 2A is a partial cross-section of the baler, drawn at a smaller scale.
Figure 2B:
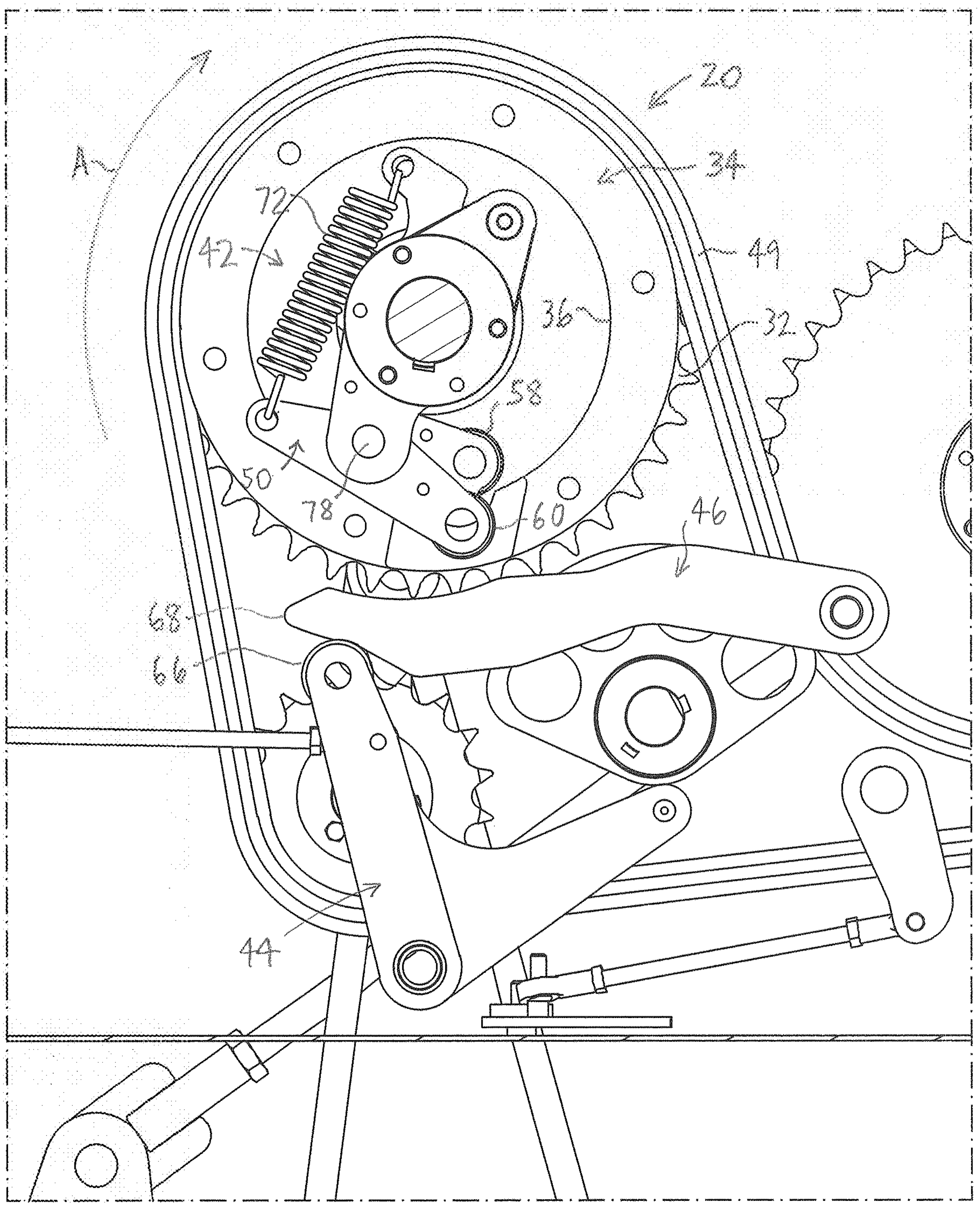
FIG. 2B is a side view of the knotter control assembly and the clutch plate of FIG. 2A in which the actuation subassembly is in an activated condition thereof and the clutch plate is in the start position, drawn at a larger scale.
Figure 2C:
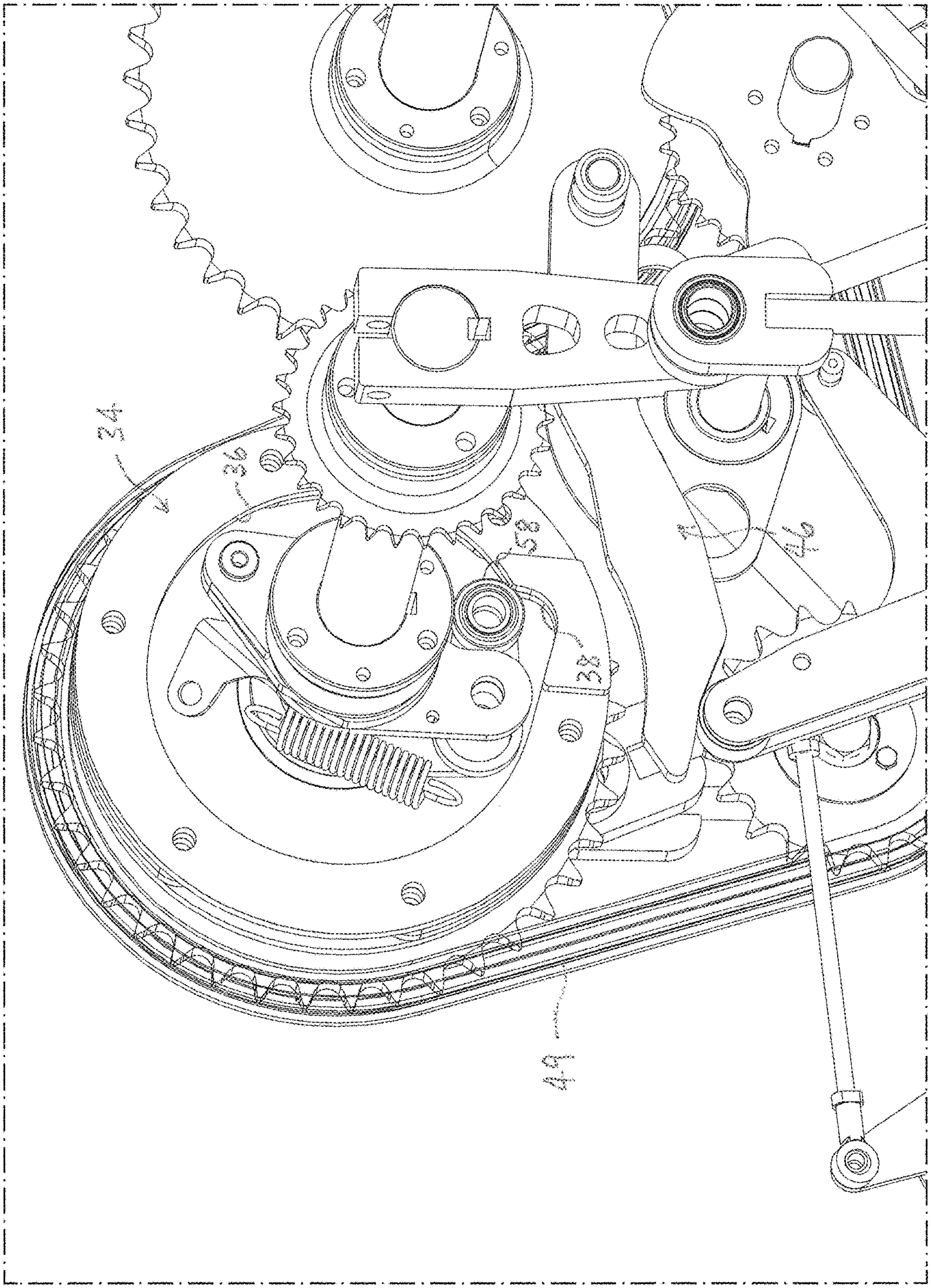
FIG. 2C is an isometric view of the knotter control assembly and the clutch plate of FIG. 2B.

In FIGS. 2A-2C, certain elements of the knotter control assembly 20 are shown when the knotter mechanism has first been tripped, or activated.

Figure 3A:
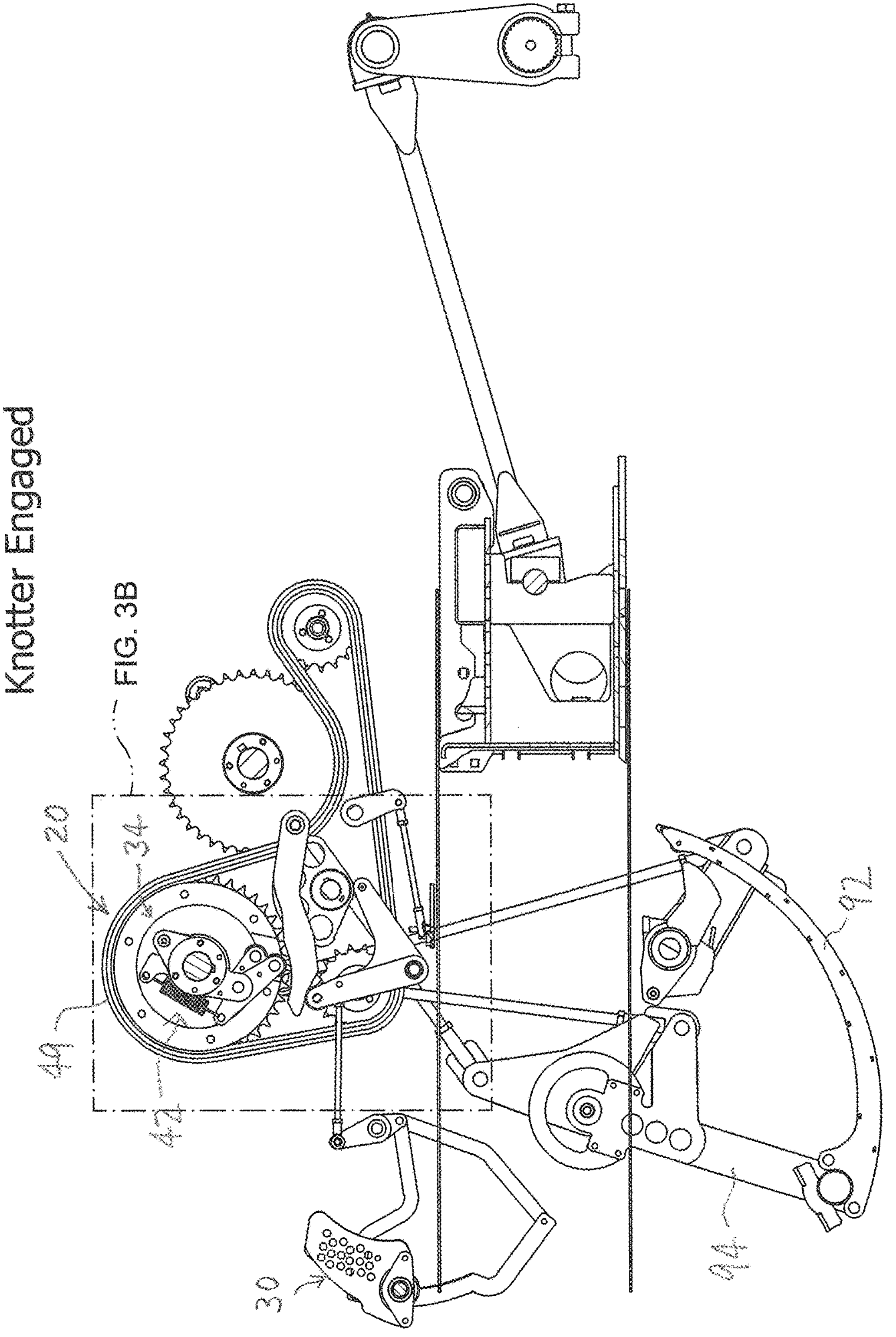
FIG. 3A is a partial cross section of the baler, drawn at a smaller scale.
Figure 3B:
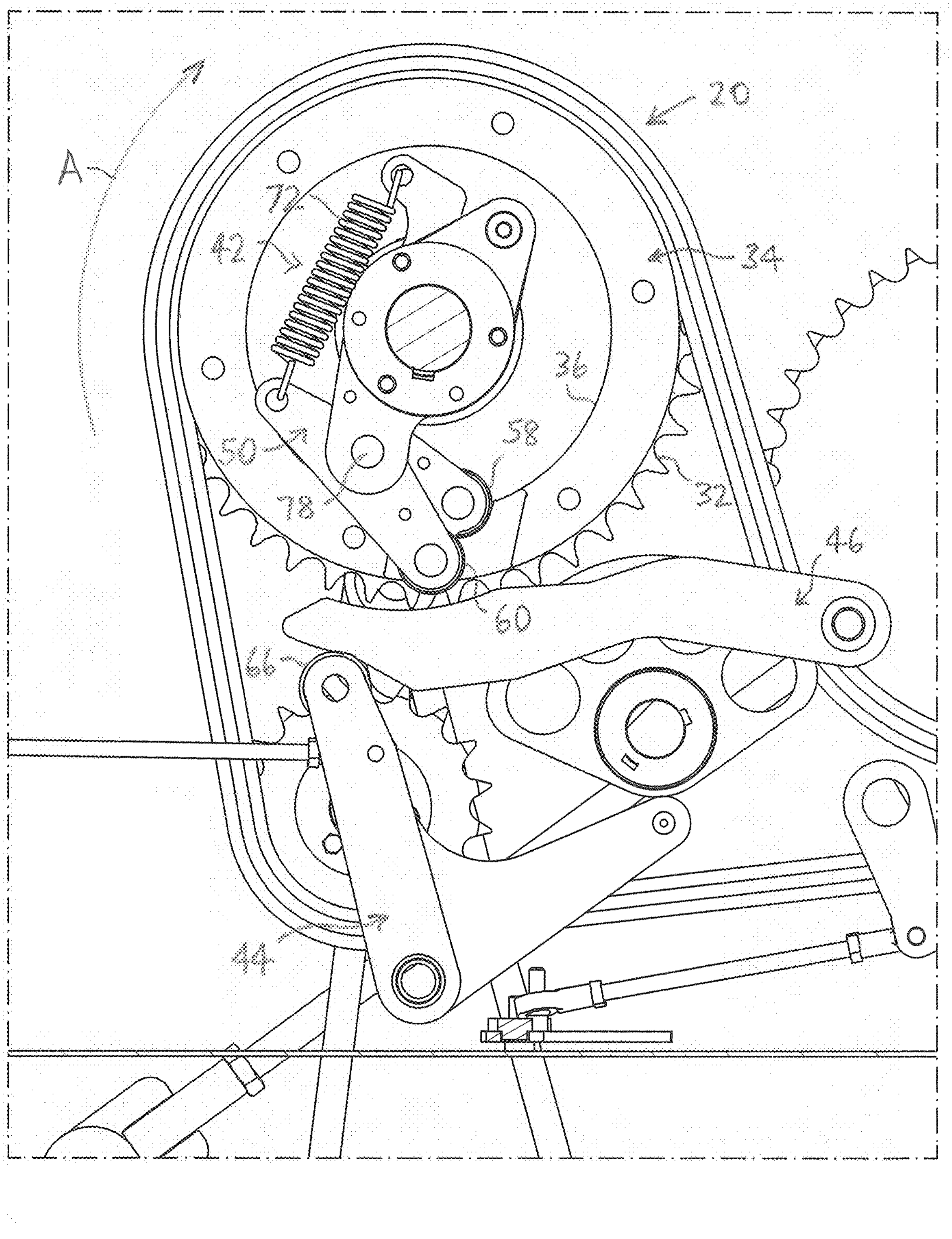
FIG. 3B is a side view of the knotter control assembly and the clutch plate of FIG. 3A in which the actuation subassembly is in an engaged condition thereof and the clutch plate is in the start position, drawn at a larger scale.
Figure 3C:
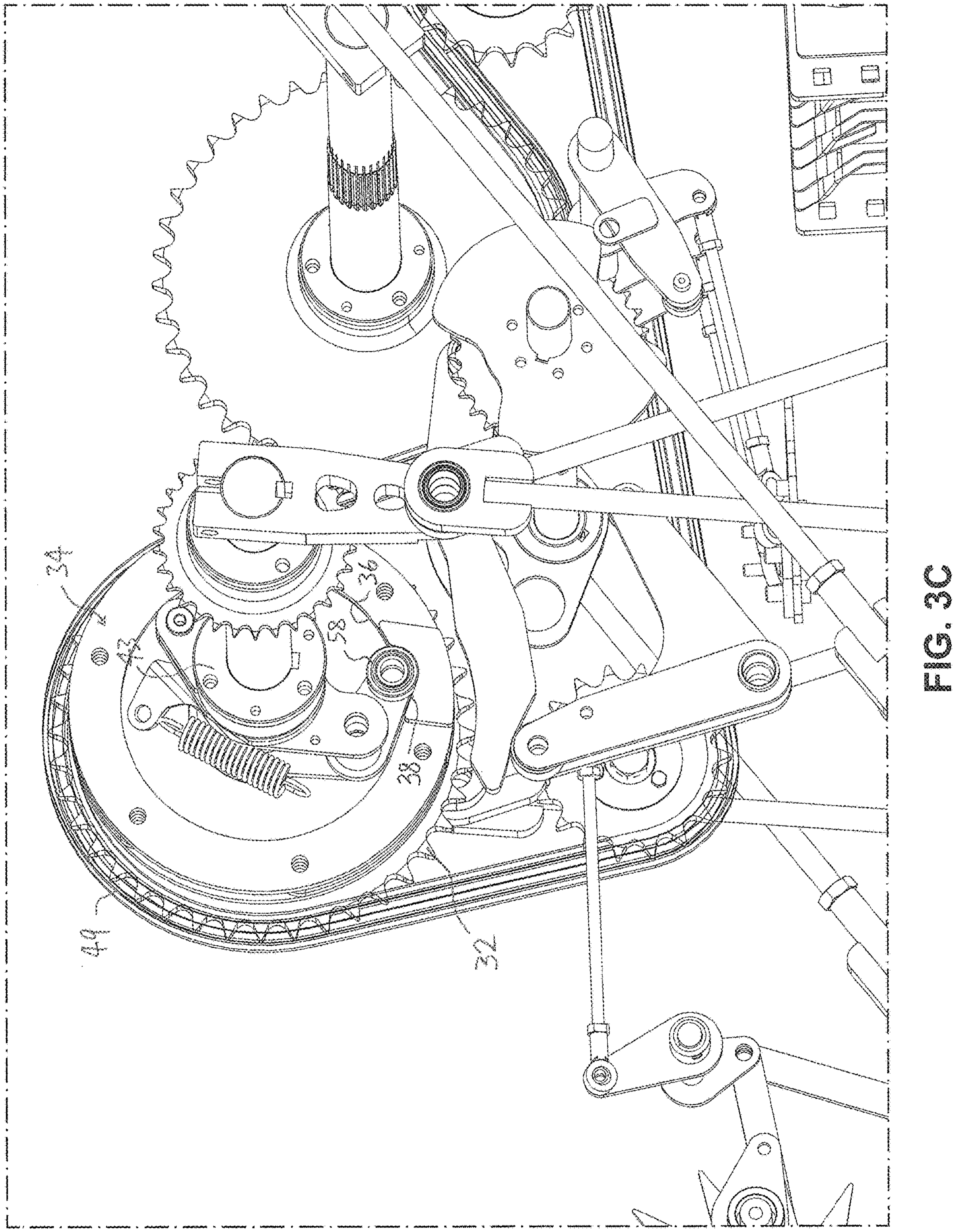
FIG. 3C is an isometric view of the knotter control assembly and the clutch plate of FIG. 3B.

In FIGS. 3A-3C, the knotter control assembly 20 is shown when the knotter mechanism 22 is first engaged.

Figure 4A:
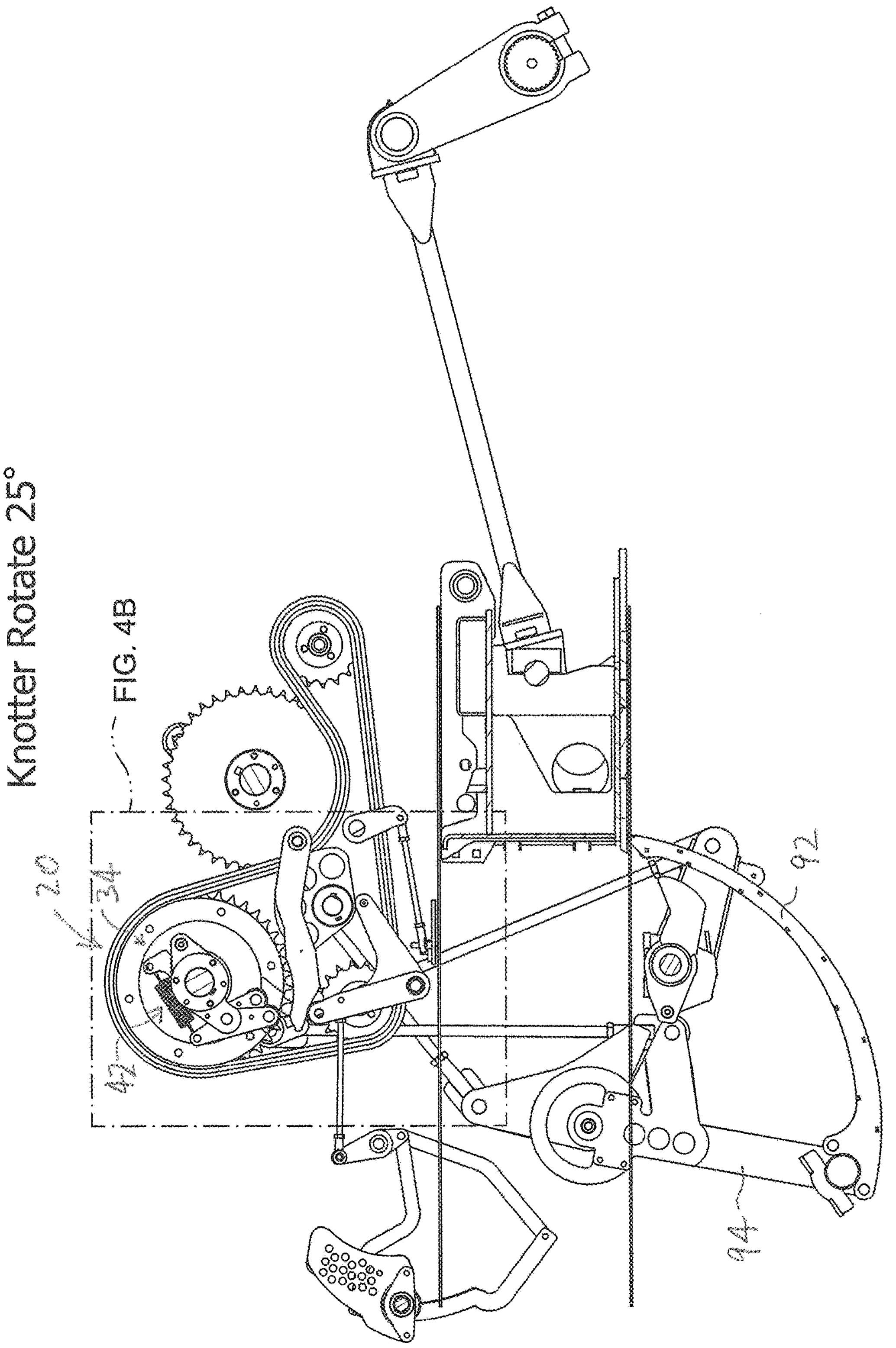
FIG. 4A is a partial cross-section of the baler, drawn at a smaller scale.
Figure 4B:
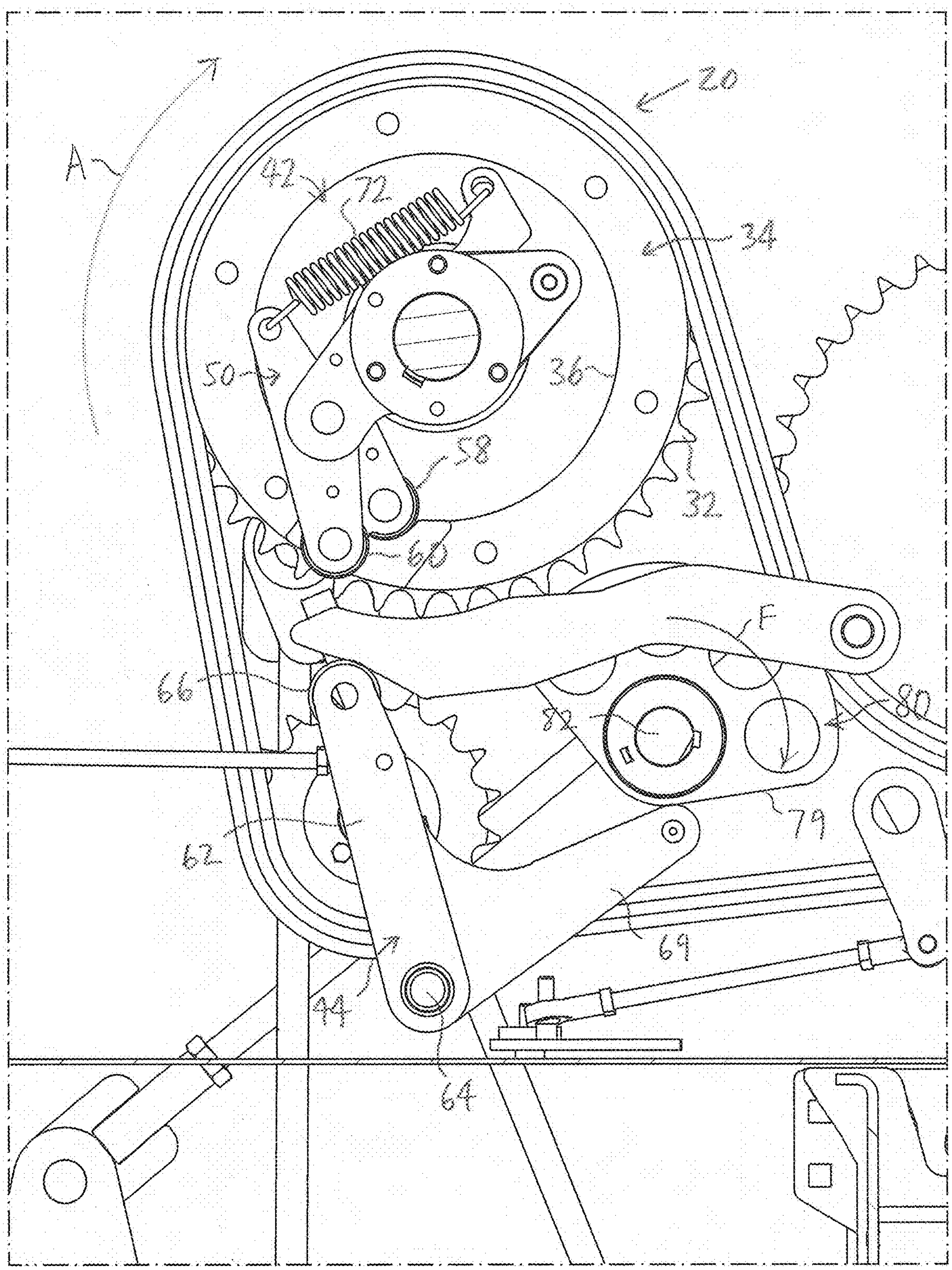
FIG. 4B is a side view of the knotter control assembly and the clutch plate of FIG. 4A, in which a drive cam on the clutch plate and a drive roller engaged in the drive cam have moved approximately 25° from the start position, drawn at a larger scale.
Figure 4C:
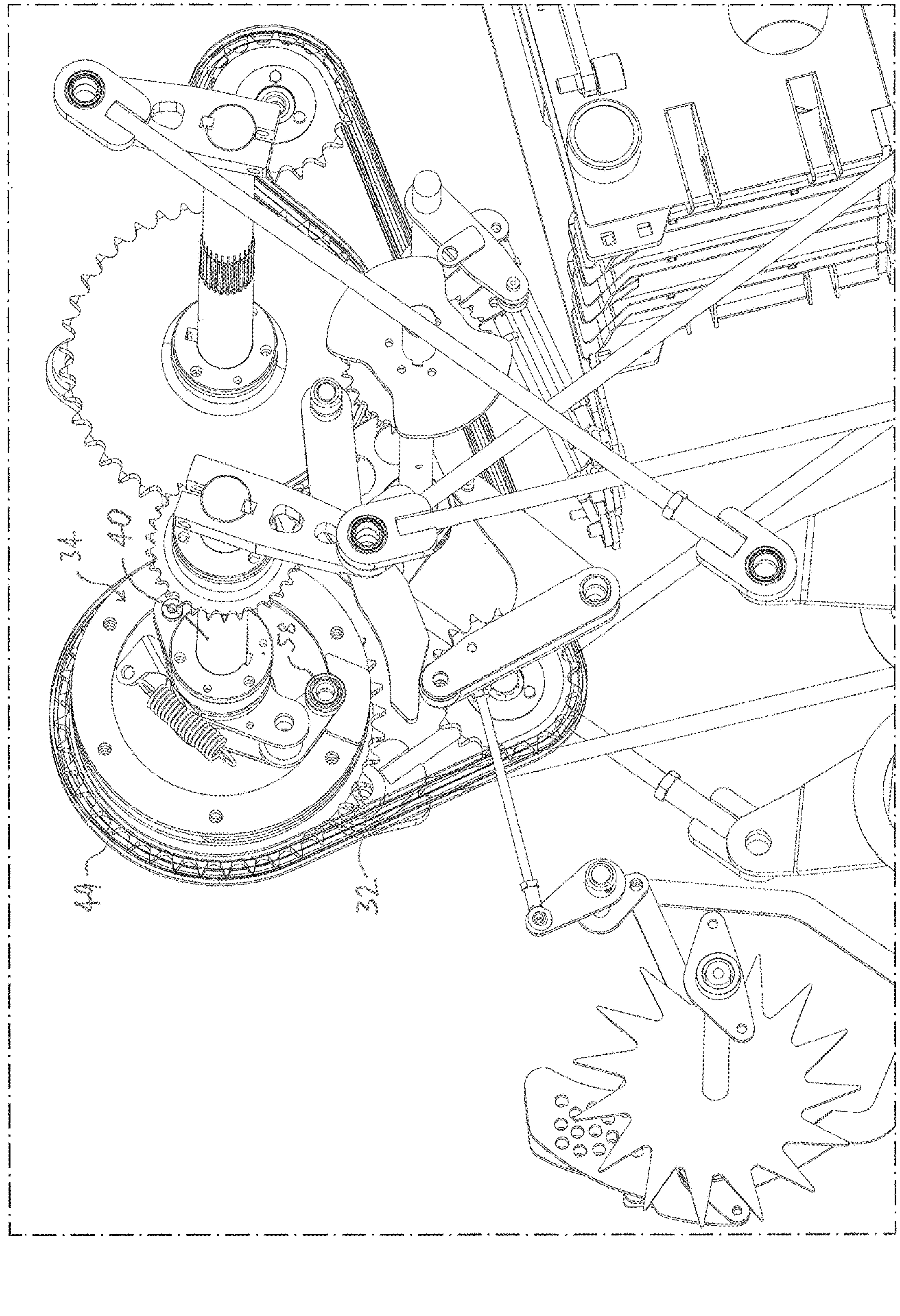
FIG. 4C is an isometric view of the knotter control assembly and the clutch plate of FIG. 4B.

The knotter control assembly 20 is shown, in FIGS. 4A-4C, when the clutch plate 34 has rotated approximately 25° from its start position, about the axis "X".

In FIGS. 5A-5D, the knotter control assembly 20 is shown when the clutch plate 34 has rotated approximately 100°, at which point there is a trip reset.

Figure 6A:
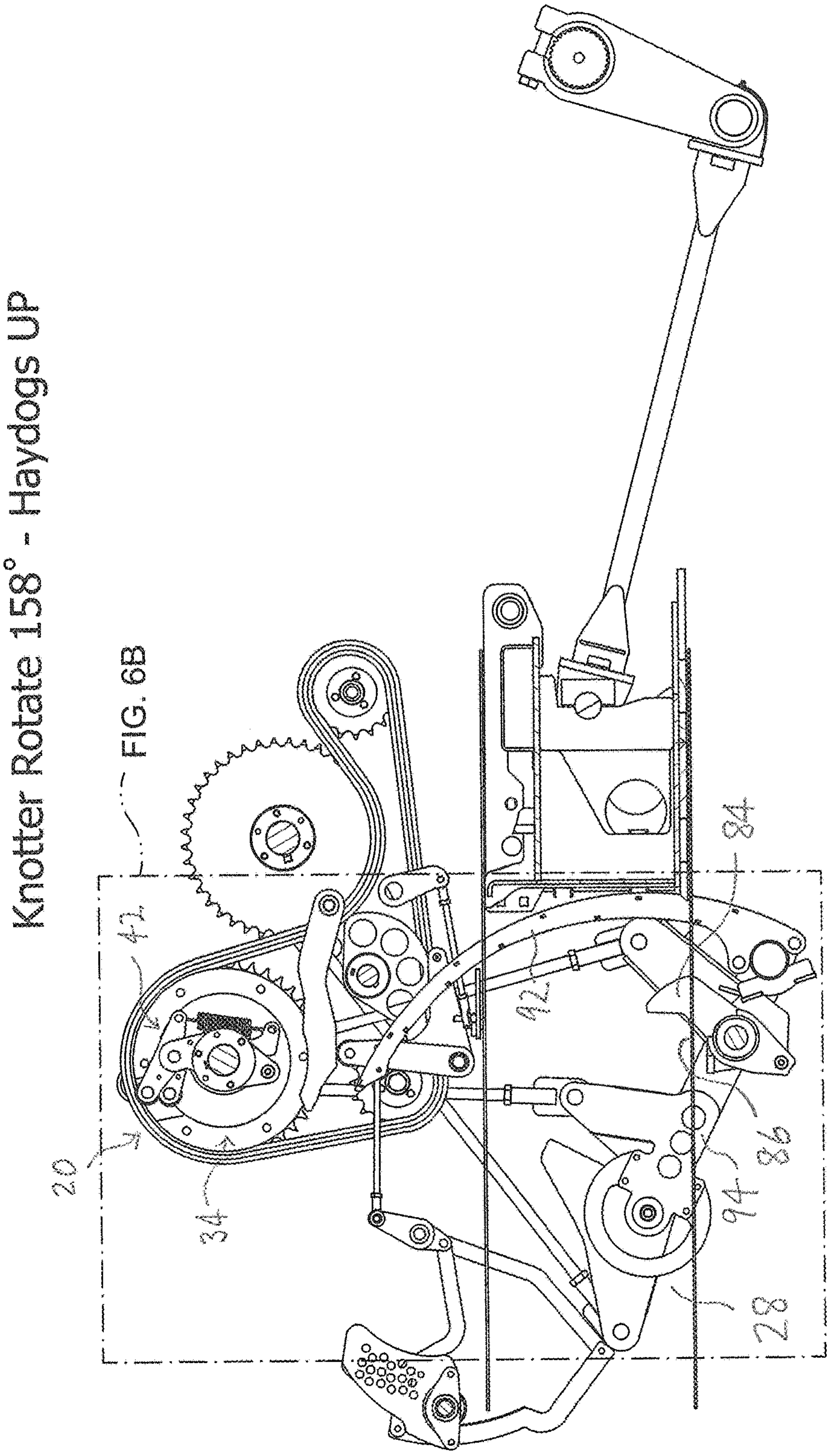
FIG. 6A is a partial cross-section of the baler, drawn at a smaller scale.
Figure 6B:
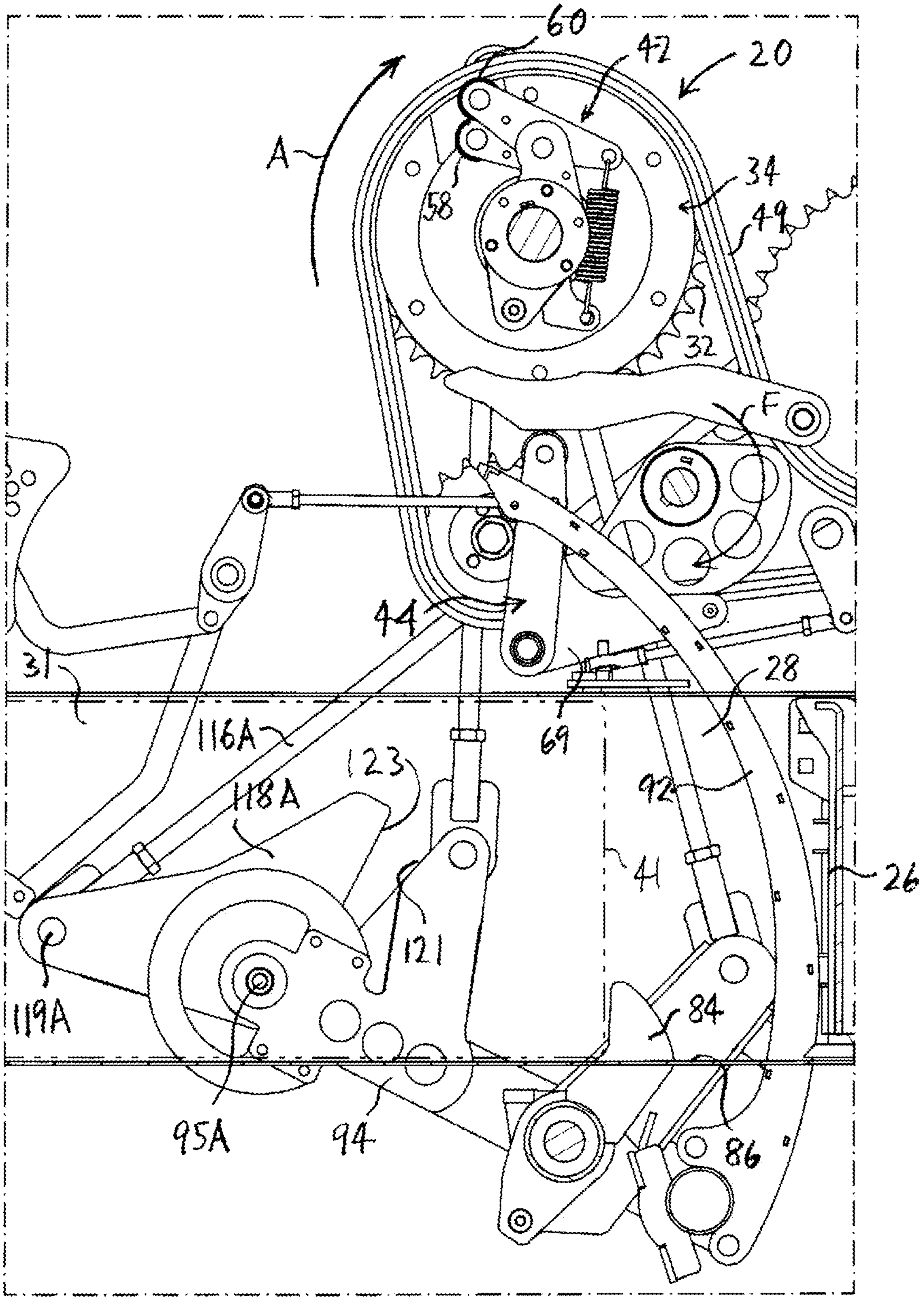
FIG. 6B is a side view of the knotter control assembly and the clutch plate of FIG. 6A, in which a drive cam on the clutch plate and a drive roller engaged in the drive cam have moved approximately 158° from the start position, drawn at a larger scale.

In FIGS. 6A-6B, the knotter control assembly 20 is shown when the clutch plate 34 has rotated approximately 158° from its start position, at which point hay dogs 84 are in their uppermost position, as will be described.

Figure 7A:
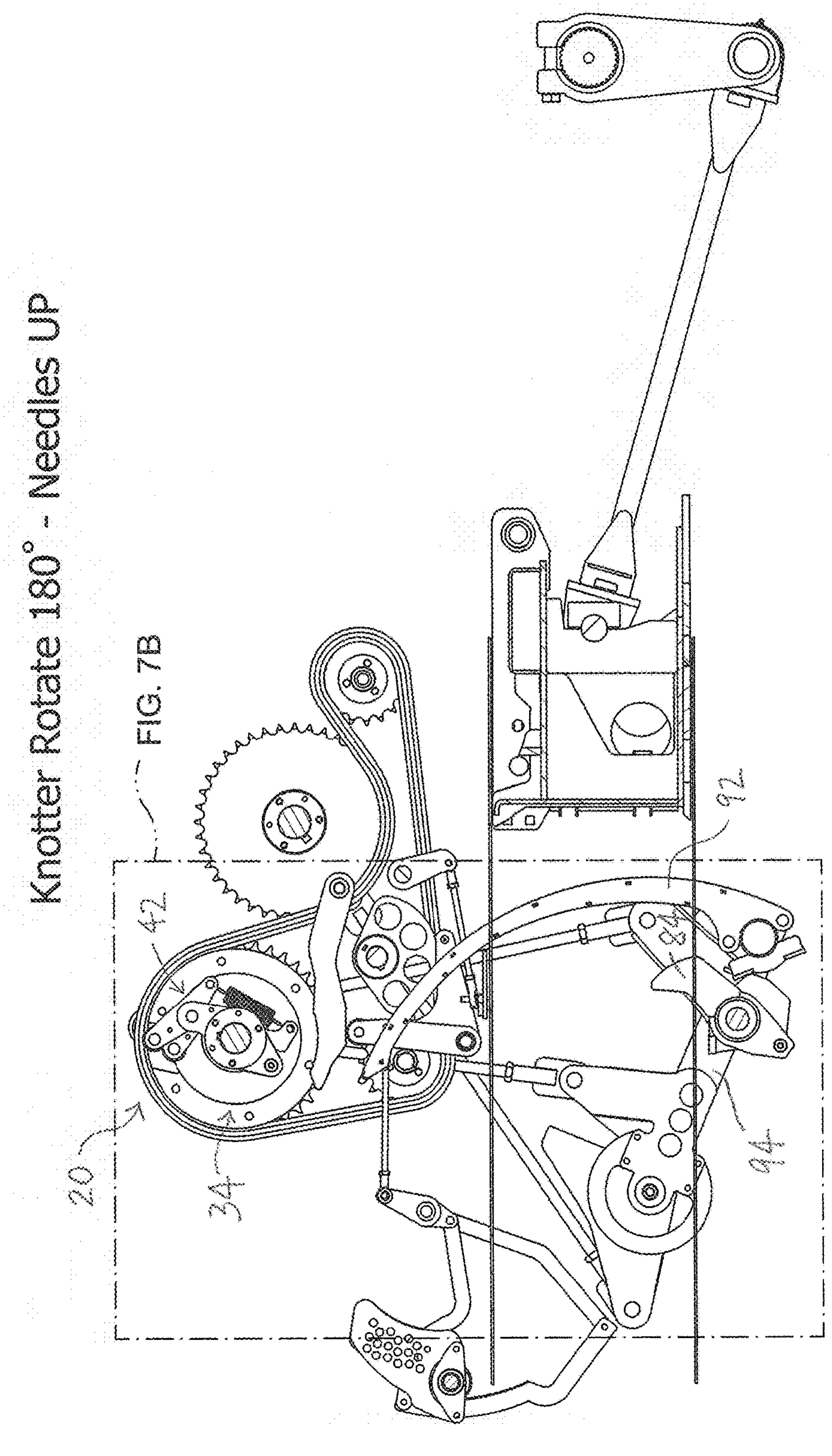
FIG. 7A is a partial cross-section of the baler, drawn at a smaller scale.
Figure 7B:
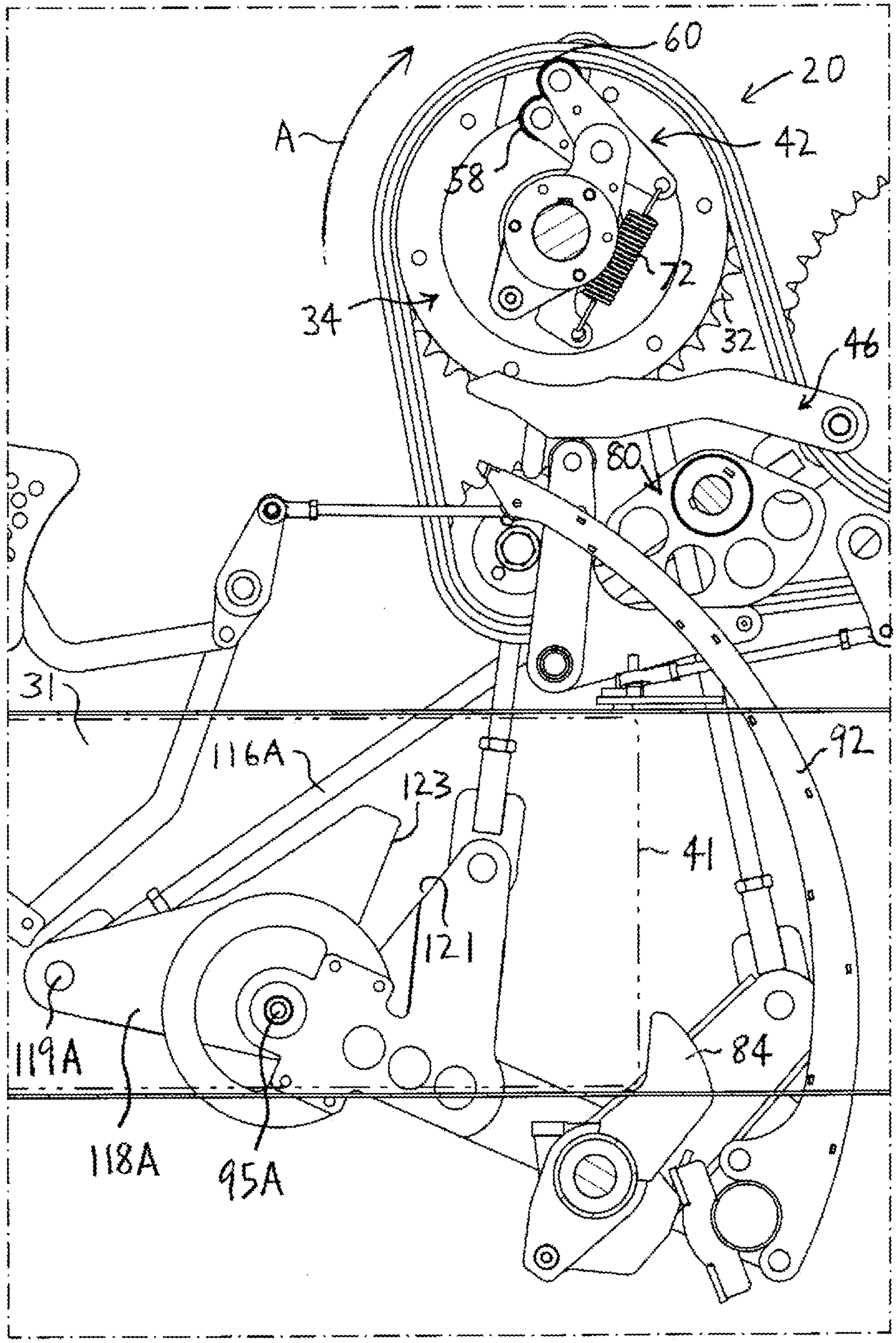
FIG. 7B is a side view of the knotter control assembly and the clutch plate of FIG. 7A, in which a drive cam on the clutch plate and a drive roller engaged in the drive cam have moved approximately 180° from the start position, drawn at a larger scale.
Figure 7C:
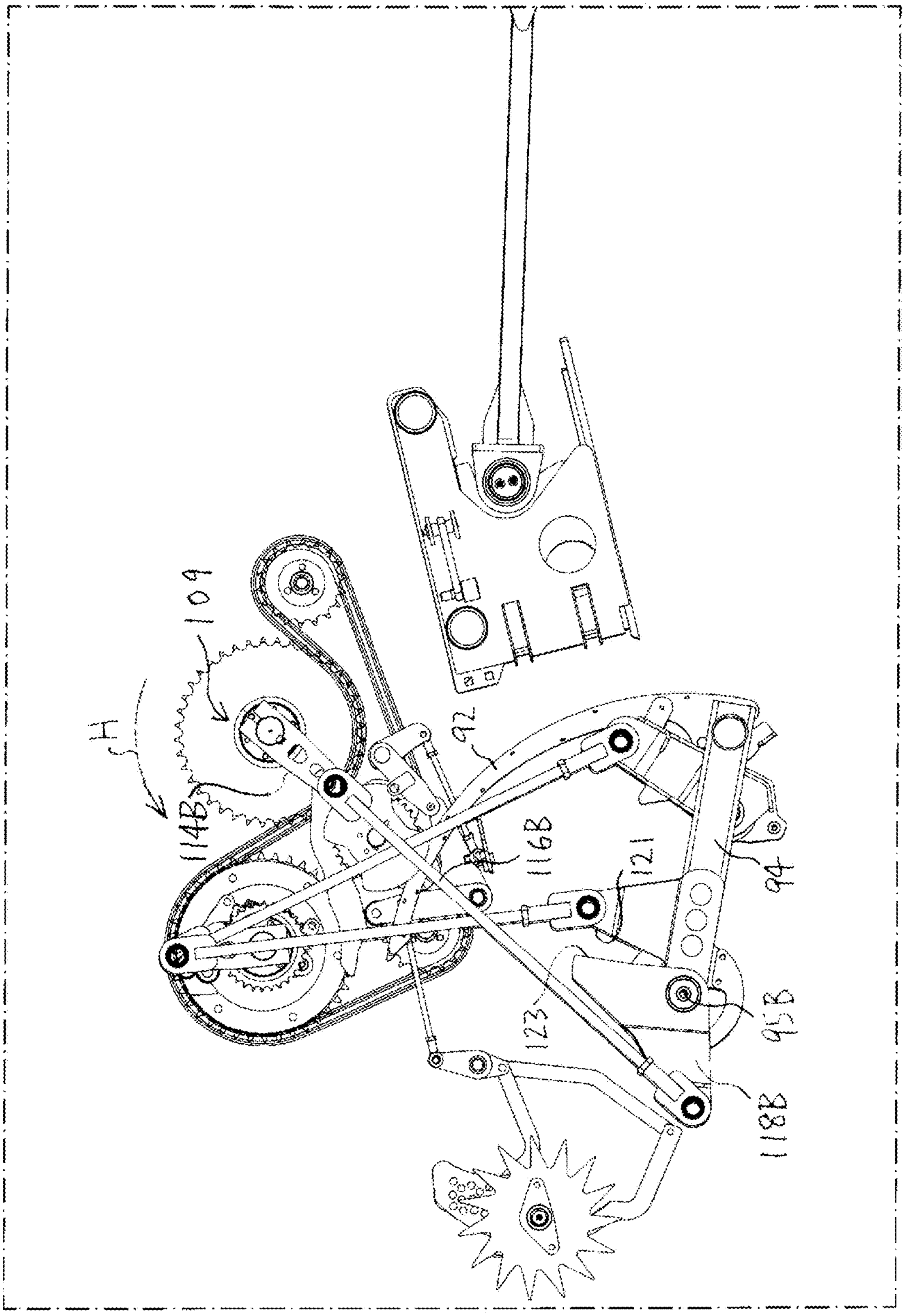
FIG. 7C is a side view of part of an embodiment of a protection assembly of the invention, drawn at a smaller scale.

As can be seen in FIGS. 7A-7C, when the clutch plate 34 has rotated approximately 180°, needles 92 are in their extended position, as will also be described.

In FIGS. 8A-8D, the knotter control assembly 20 is shown when the clutch plate 34 has rotated approximately 270°, and the trip reset is complete.

When the clutch plate 34 has rotated approximately 325° from its start position, the deactivation of the knotter mechanism 22 commences (FIGS. 9A-9D).

In FIGS. 10A-10E, the clutch plate 34 has rotated approximately 355° from its start position, and the deactivation of the knotter mechanism 22 is complete.

It will be understood that a number of elements of the baler 24 are omitted from certain drawings, for clarity of illustration.

As can also be seen in FIG. 1E, the actuation subassembly 42 preferably also includes a trip arm 50. The trip arm 50 preferably includes a body portion 52 and first and second arms 53, 54 extending from the body portion 52 to respective roller ends 55, 56 of the first and second arms (FIG. 1F). The body portion 52 is indirectly connected with the collar 43, as will be described. As can be seen in FIGS. 1E and 1F, the first arm 53 preferably includes a drive roller 58 rotatably mounted thereon at the roller end 55, and the second arm 54 preferably includes a control roller 60 that is rotatably mounted thereon at the roller end 56, for rolling engagement with the one or more upper engagement surfaces 48 of the stop arm 46.

When the drive roller 58 is disengaged from the roller path 36 on the clutch plate 34, as shown in FIG. 1G, the actuation subassembly 42 is in the home (or inactive) condition thereof (FIGS. 1A-1G). Accordingly, when the actuation subassembly 42 is in its home condition, the drive sprocket 32 and the clutch plate 34 rotate together about the axis “X” in the direction indicated by arrow “A”, but are not engaged with or connected to the knotter shaft 40. That is, when the drive roller 58 is disengaged from the clutch plate 34, the knotter shaft 40 and the collar 43 partially secured thereto are not rotated by the clutch plate 34, and in general, they are stationary.

As can be seen in FIG. 1F, the first and second arms 53, 54 are formed to locate the drive roller 58 and the control roller 60 so that they are not axially aligned.

Preferably, the bale 31 is initially formed in the compression chamber 28, by compression of the material (e.g., hay) in a conventional manner. The actuation subassembly 42 is in the home condition thereof (as illustrated in FIGS. 1A-1G) while the plunger 26 is moved to compress the forage material, to form the bale 31.

When the bale is formed, it is located in the predetermined compression position in the compression chamber 28, and the plunger preferably continues to compress the bale 31, for a certain time period. Specifically, while the bale is compressed and in the predetermined compression position, the twine is pulled onto the bale 31 by the needles 92, and then the twine is knotted by the knotter mechanism. The bale 31 is shown in the predetermined compression position in FIG. 1A.

After the twine is knotted, the plunger moves to its retracted position. Next, while the plunger is in its retracted position, more crop material is positioned in the compression chamber. The plunger then moves to its extended position, to form the next bale. When the plunger pushes the crop material to form the next bale, the previous bale is pushed thereby toward an exit chamber 39, at a back end of the baler 24.

It will be understood that, when the actuation subassembly 42 is in its home condition (FIG. 1E), certain movable elements thereof are in their respective home positions. In particular, when the actuation subassembly 42 is in its home condition, the stop arm 46 is in its corresponding home position.

When the bale 31 is moved into the predetermined compression position in the compression chamber 28, the control arm 44 is correspondingly moved by the bale length mechanism 30. Specifically, when the bale 31 is moved into the predetermined compression position thereof, the bale length mechanism 30 engages the bale 31 and as a result of such engagement, the bale length mechanism 30 pulls on a first part 62 of the control arm 44 in the direction indicated by arrow “B” in FIG. 1E. This causes the control arm 44 to pivot about a central pivot point 64 in the direction indicated by arrow “B” in FIG. 1E, to an activated position of the control arm 44. As can be seen in FIGS. 1E and 2A, this movement of the control arm 44 causes the stop arm 46 to move from its home position (FIG. 1E) to an activated stop arm position (FIG. 2A).

As will be described, when the stop arm 46 moves to the activated stop arm position thereof, the stop arm 46 moves the trip arm 50 to a trigger position thereof (FIG. 2B), in which the trip arm 50 locates the drive roller 58 in the drive cam 38. The body portion 52 of the trip arm 50 is indirectly mounted to a part of the collar 43. Accordingly, when the drive roller 58 is engaged in the drive cam 38, the collar 43 and the knotter shaft 40 are securely engaged with the clutch plate 34, and consequently the collar 43, and also the knotter shaft 40, are forced to rotate with the drive sprocket 32.

In FIG. 2B, the drive roller 58 is shown just before it is moved into the drive cam 38, i.e., the trip arm 50 is in its trigger position. In FIG. 3C, the drive roller 58 is shown when it is first positioned in the drive cam 38.

Once the knotter shaft 40 and the clutch plate 34 are engaged and rotating together (FIGS. 3A-3C), the knotter mechanism 22 is activated, i.e., by rotation of the knotter shaft 40.

As will be described, once the clutch plate 34 rotates a predetermined radial distance from the preselected start or home position thereof, the trip arm 50 disengages the drive roller 58 from the drive cam 38, to disengage the knotter shaft 40 from the clutch plate 34, thereby deactivating the knotter mechanism 22. The results of the further rotation of the clutch plate 34 in the direction indicated by arrow “A” are shown in FIGS. 4A-10E, as will be described.

In FIGS. 2A-2C, the actuation subassembly 42 is shown in the activated condition thereof, i.e., when the knotter control assembly 20 is first triggered. It will be understood that, in FIGS. 1A and 1E, the control arm 44 is shown in a home position thereof. In FIGS. 2A-2C, the control arm 44 is shown in its activated position, i.e., after the first part 62 has been pulled in the direction indicated by arrow “B”.

Preferably, and as can be seen in FIGS. 1E, 2B, and 2C, the control arm 44 includes a first control arm roller 66 that engages a lower engagement surface 67 of the stop arm 46, for partially supporting the stop arm 46. Referring to FIG. 1E, it can be seen that when the control arm 44 is in its home position, an outer end 68 of the stop arm 46 is slightly raised, relative to the stop arm’s position when the control arm 44 is in its activated position (FIG. 2B). As can be seen in FIGS. 2B and 20, when the control arm 44 is moved from its home position to its activated position, the outer end 68 is lowered due to the configuration of the lower surface 67 of the stop arm 46.

The control arm 44 preferably also includes a second part 69 with a second control arm roller 70 (FIG. 5D) rotatably mounted thereon, as will be described.

In one embodiment, the collar 43 preferably includes a first extension portion 71 on which the trip arm 50 is pivotably mounted (FIG. 1E). A compression spring 72 is connected to the trip arm 50, at a first end 74 of the body portion 52. The compression spring 72 is also connected to a second extension portion 76 of the collar 43. The first end 74 is urged by the compression spring 72 toward the second extension portion 76, causing the trip arm 50 to pivot about the pivot point 78, i.e., in the direction indicated by arrow “D” in FIG. 1E.

As can be seen in FIGS. 1D and 1E, the body portion 52 of the trip arm 50 is pivotably mounted to the first extension portion 71. The first and second extension portions 71, 76 of the collar 43 are connected with a second part 106 of the collar 43, as will be described.

As noted above, and as can be seen in FIGS. 1E and 1F, the drive roller 58 and the control roller 60 preferably are axially nonaligned. In particular, the drive roller 58 is positioned closer to the axis "X" than is the control roller 60. Preferably, the drive roller 58 and the control roller 60 are also radially nonaligned.

When the actuation subassembly 42 is in its home condition, as shown in FIGS. 1E and 1F, the control roller 60 engages the upper surfaces 48 of the stop arm 46. Due to such engagement, the drive roller 58 is held above the roller path 36 (FIG. 1G), i.e., the drive roller 58 is positioned so that it is disengaged from the roller path 36. It will be understood that the second arm 54 and the control roller 60 are omitted from FIG. 1G for clarity of illustration, in order to clearly show the position of the drive roller 58 relative to the roller path 36 when the actuation subassembly 42 is in its home condition.

As noted above, when the actuation subassembly 42 is in its home condition (FIGS. 1A-1G), the drive sprocket 32 and the clutch plate 34 rotate together, and the knotter shaft 40 and the collar 43 thereon are not connected with the clutch plate 34, and not rotating.

From the foregoing, it can be seen that, due to the compression spring 72, the control roller 60 is urged against the upper engagement surfaces 48 of the stop arm 46, when the control arm 44 is in its home position (FIG. 1E). As noted above, when the control arm 44 moves from its home position to its activation position (FIGS. 2A-2C), the first part 62 pivots in the direction indicated by arrow "C", and the first control arm roller 66 is lowered accordingly. This results in the stop arm 46 pivoting about the pivot point 47 in the direction indicated by arrow "E" to the stop arm's activated position, shown in FIGS. 2A-2C. As can be seen in FIGS. 2A-2C, when the stop arm 46 is in its activated position, the outer end 68 of the stop arm 46 is lowered relative to the collar 43, as compared to the position of the stop arm 46 shown in FIGS. 1A and 1E.

When the outer end 68 is lowered relative to the collar 43, the control roller 60 is disengaged from the upper surfaces 48 of the stop arm 46. As a result, the trip arm 50 pivots about the pivot point 78 to a trigger position thereof (FIG. 2B), to locate the drive roller 58 in a position where the drive roller 58 can engage the roller path 36 on the rotating clutch plate 34.

It will be understood that, in FIG. 2C, the second arm 54 and the control roller 60 are omitted for clarity of illustration in order that the first arm 53 and the drive roller 58 may be clearly seen. In FIG. 2C, the drive roller 58 is shown about to be lowered into the drive cam 38. Subsequently, the drive roller 58 is moved into the drive cam 38, as can be seen in FIG. 3C. The drive roller 58 is moved into the drive cam 38 due to the trip arm 50 pivoting about the pivot point 78 in the direction indicated by arrow "D" in FIGS. 1E and 2B.

In FIGS. 3A-3C, the drive roller 58 is shown engaged in the drive cam 38 (FIG. 3C), and the actuation subassembly 42 is shown in its engaged condition.

As noted above, the drive sprocket 32 and the clutch plate 34 rotate about the axis "X", because the drive sprocket 32 is driven in the direction indicated by arrow "A" by the chain 49. Also as noted above, when the drive roller 58 is engaged in the drive cam 38, because of such engagement, the actuation subassembly 42 temporarily connects the collar 43 and the knotter shaft 40 to the clutch plate 34. Once connected in this way, the collar 43 and the knotter shaft 40 also rotate (with the drive sprocket and the clutch plate) about the axis "X", in the direction indicated by arrow "A".

Those skilled in the art would appreciate that, once triggered, the control roller 58 may initially be positioned on the roller path 36 before moving into the drive cam 38, rather than moving directly into the drive cam 38. In that case, the drive roller 58 engages the roller path 36 as the clutch plate 34 rotates in the direction indicated by arrow "A", until the drive roller 58 engages the drive cam 38.

It will be understood that, when the drive roller 58 is on the roller path 36, the drive roller 58 is urged against the roller path 36 by the compression spring 72. When the clutch plate 34 has rotated to a position in which the drive roller 58 is located at the drive cam 38, the drive roller 58 is urged into the drive cam 38 indirectly, by the compression spring 72.

When the drive roller 58 is located in the drive cam 38, the actuation subassembly 42 engages the clutch plate 34 (i.e., the actuation subassembly is in its engaged condition) and the knotter shaft 40, via the drive roller 58 and the trip arm 50. Due to such engagement, while the drive roller 58 is positioned in the drive cam 38, the knotter shaft 40 rotates in the direction indicated by arrow "A" about the axis "X", activating the knotter mechanism 22.

In summary, the actuation subassembly 42 is shown in the home (or deactivated) condition thereof in FIGS. 1A-1G and in the activated condition thereof (when initially triggered) in FIGS. 2A-2C. In FIGS. 3A-3C, the actuation subassembly 42 is shown in an engaged condition thereof, in which the drive roller 58 is positioned in the drive cam 38. As illustrated in FIG. 3C, when the drive roller 58 is first received in the drive cam 38, the drive cam 38 is approximately positioned at the six o'clock position (i.e., the preselected start position).

As will be described, upon the clutch plate 34 rotating a predetermined radial distance (approximately 355°) in the direction indicated by arrow "A" from the predetermined start position, the trip arm 50 disengages (removes) the drive roller 58 from the drive cam 38 (FIGS. 10A-10E).

As described above, while the baler is operating, the drive sprocket 32 is rotated in the direction indicated by arrow "A" due to the chain's engagement therewith, and the clutch plate 34 and the drive sprocket 32 are at least partially connected by the one or more rubber bushings 35. It will be understood that, upon the drive roller 58 engaging the drive cam 38 (FIGS. 3A-3C), the actuation subassembly 42 is suddenly subjected to substantial torque. The rubber bushings 35 are provided in order to mitigate the stresses to which the clutch plate 34 and the actuation subassembly 42 are subjected, upon engagement of the drive roller 58 in the drive cam 38.

As noted above, the clutch plate 34 rotates about the axis "X" in the direction indicated by arrow "A" (FIG. 4B). It will be understood that the clutch plate 34 rotates the drive cam 38 in specific timing relative to movement of the plunger 26. In particular, as noted above, the drive roller 58 is initially positioned in the drive cam 38 (FIG. 3C) when the drive cam 38 is substantially positioned at the six o'clock position, i.e., at the preselected start position.

For clarity of illustration, the actuation subassembly 42 is shown in FIGS. 4A-4C after the clutch plate 34 has rotated approximately 25° in the direction indicated by arrow "A" from the start position, i.e., from its position when the drive roller 58 was initially positioned in the drive cam 38. It will be understood that, due to the engagement of the drive roller 58 with the clutch plate 34 in the drive cam 48, the knotter shaft 40 is at the same time rotated about the axis "X" by the same radial distance of approximately 25°.

The second arm 54 and the control roller 60 are omitted from FIG. 4C for clarity of illustration, in order to show the drive roller 58 engaged in the drive cam 38.

In FIG. 4B, it can be seen that a first side 79 of a reset cam 80 that is pivotable about a pivot point 82 is engaged with the second control arm roller 70 (FIG. 5D) at a point on the first side 79 that is proximal to the pivot point 82.

The reset cam 80 is rotatable about the pivot point 82 in the direction indicated by arrow "F" in FIG. 4B. As can be seen in FIG. 5D, the reset cam 80 preferably is mounted to a lower shaft 102. The lower shaft 102 defines an axis "W" thereof. The reset cam 80 pivot point 82 is aligned with the axis "W". The knotter shaft 40 and the lower shaft 102 have respective sprockets "$S_1$", "$S_2$" mounted thereon, connected by a chain (not shown in FIG. 5D). Accordingly, when the knotter shaft 40 rotates about its axis "X", the lower shaft 102 also correspondingly rotates about its axis "W". As a result, when the knotter shaft 40 commences its rotation, the reset cam 80 also commences its rotation about the lower shaft's axis "W".

Figure 5A:
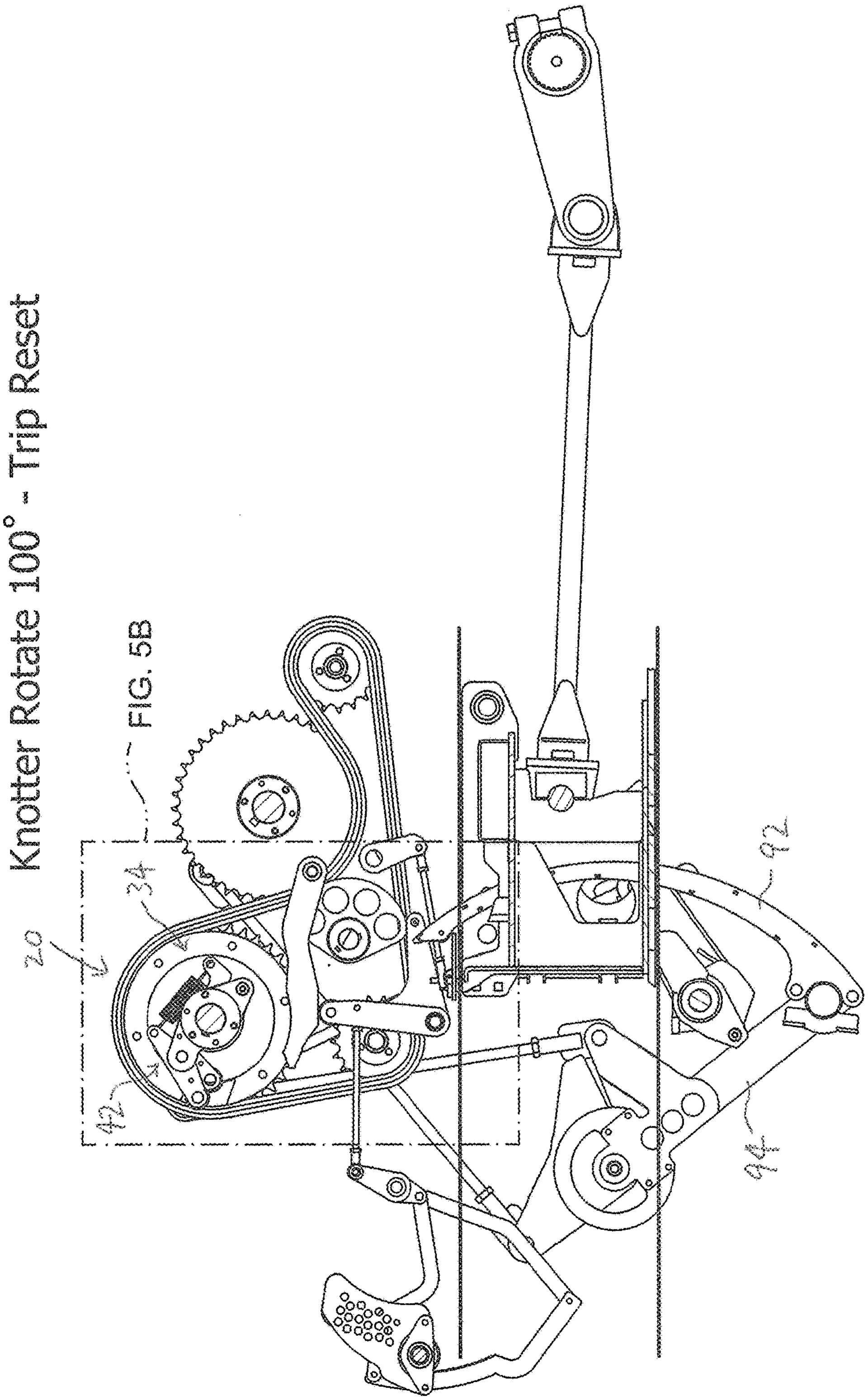
FIG. 5A is a partial cross-section of the baler, drawn at a smaller scale.
Figure 5B:
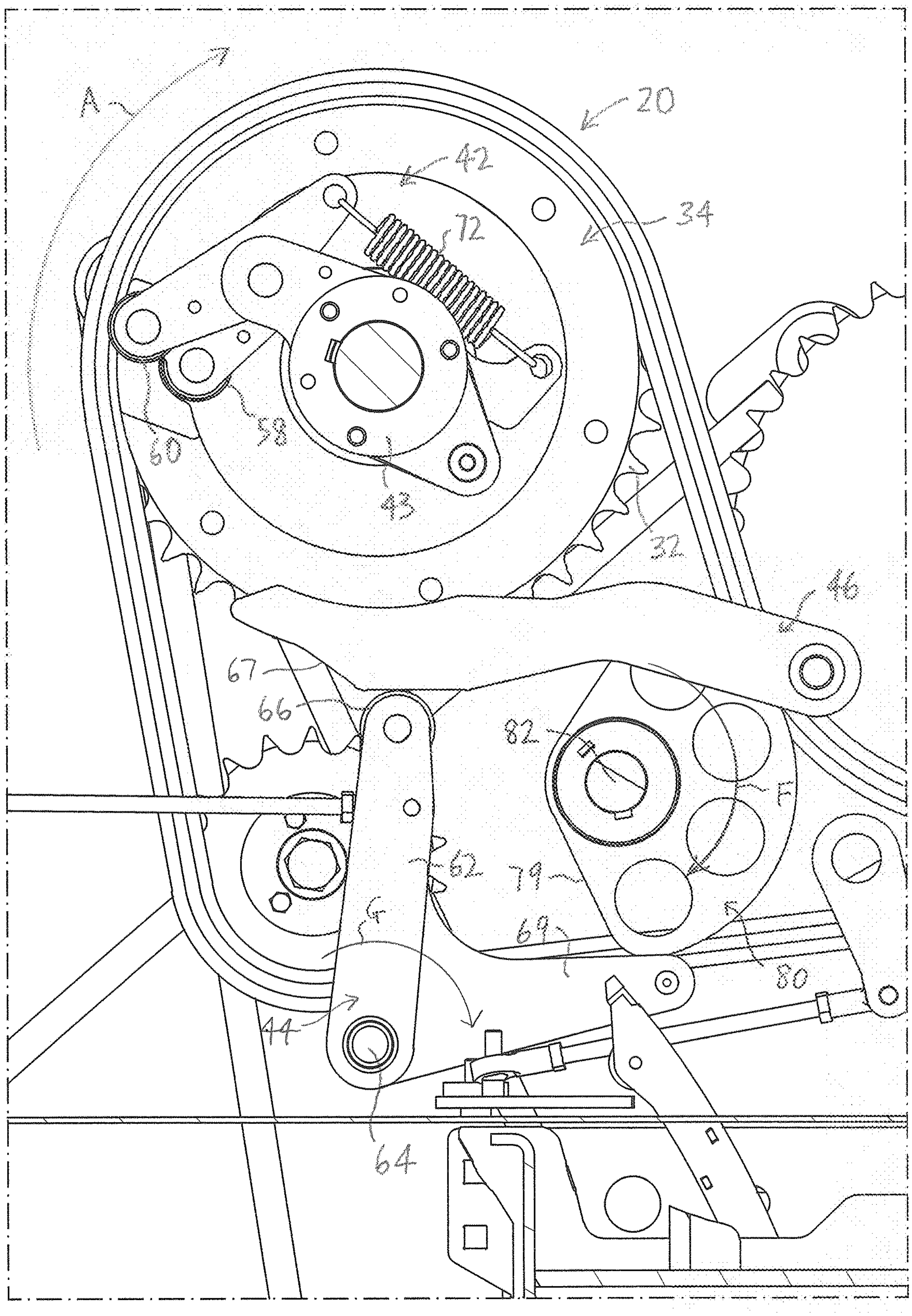
FIG. 5B is a side view of the knotter control assembly and the clutch plate of FIG. 5A, in which a drive cam on the clutch plate and a drive roller engaged in the drive cam have moved approximately 100° from the start position, drawn at a larger scale.
Figure 5C:
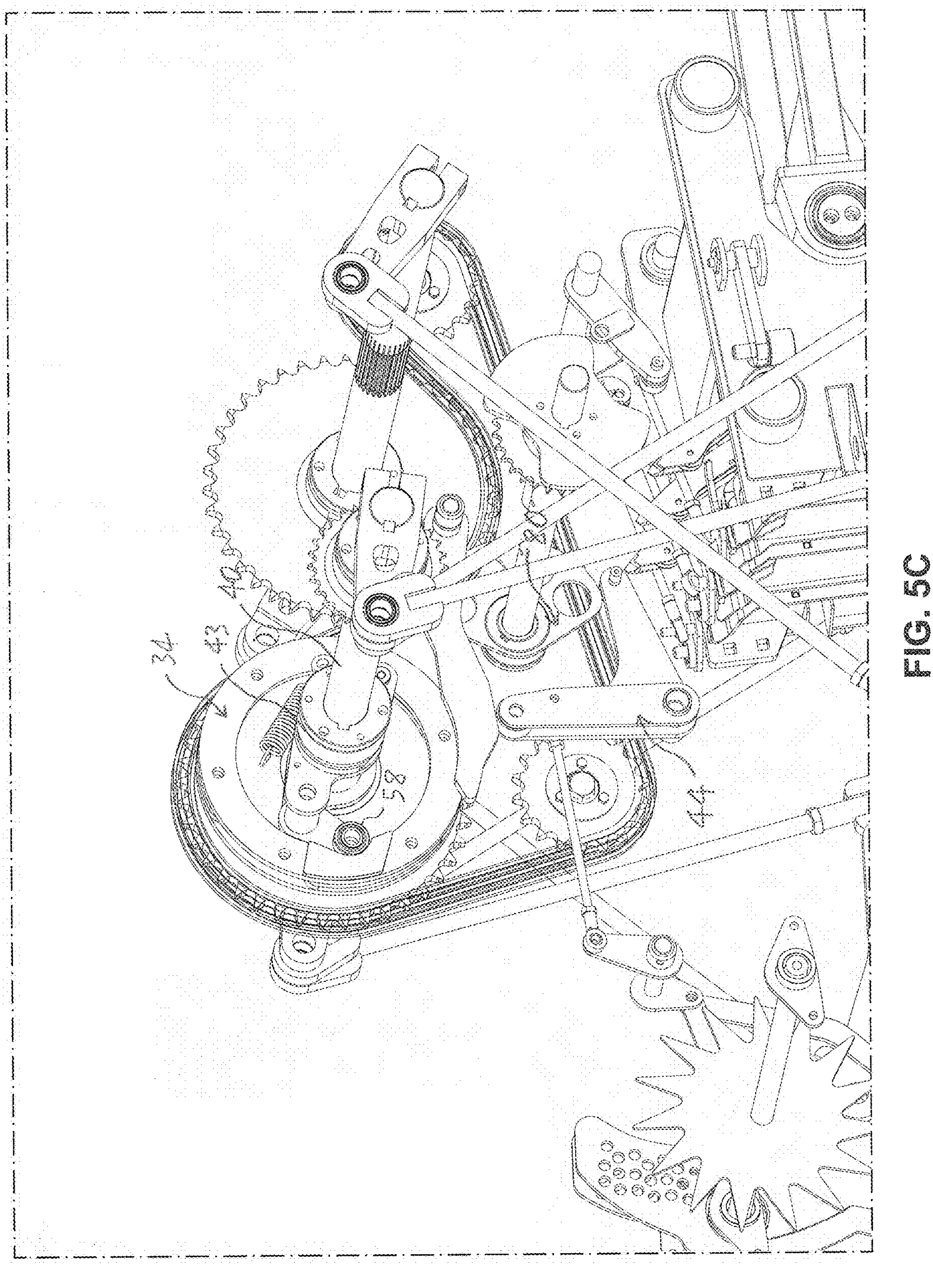
FIG. 5C is an isometric view of the knotter control assembly and the clutch plate of FIG. 5B.
Figure 5D:
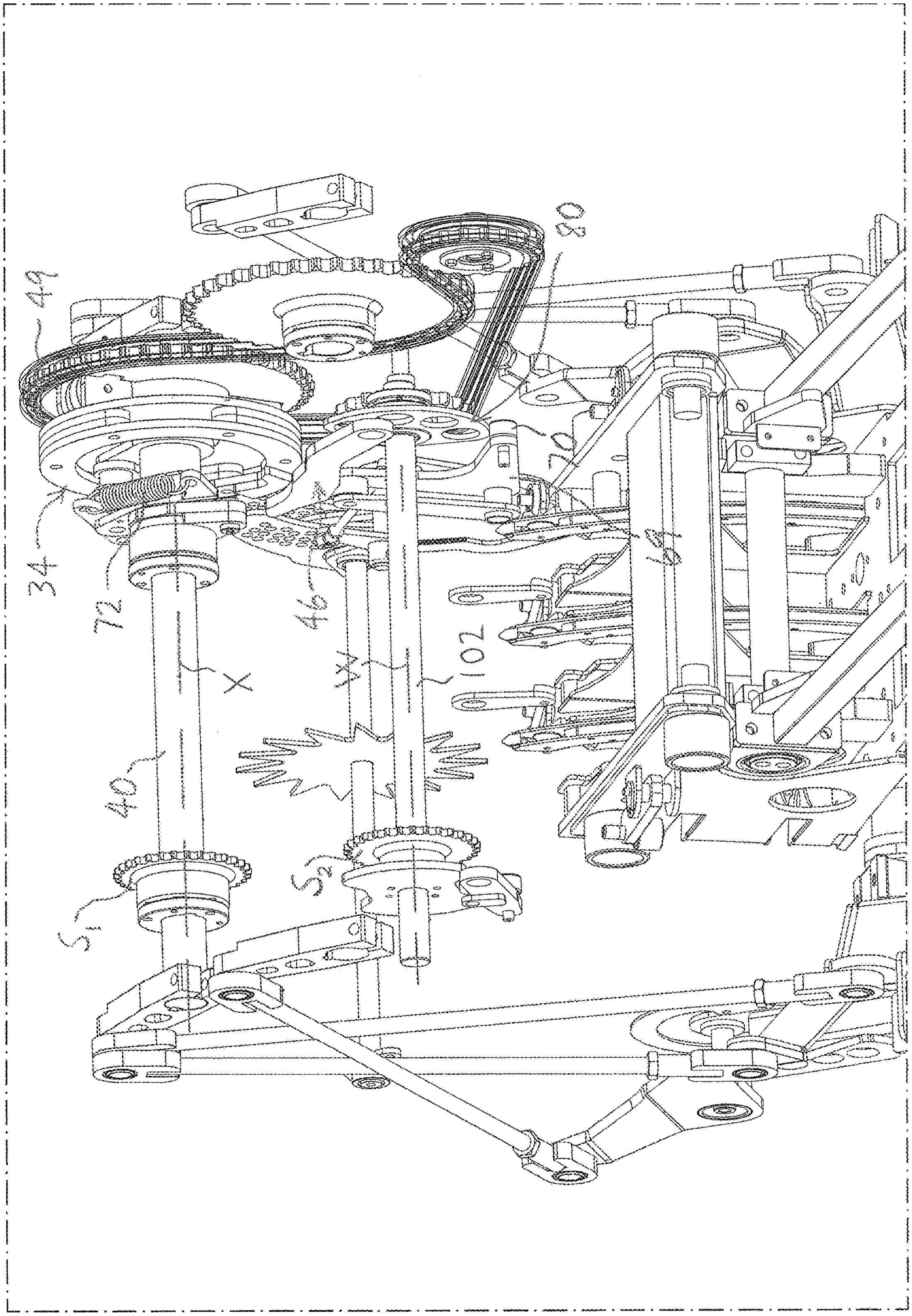
FIG. 5D is another isometric view of the knotter control assembly and the clutch plate of FIG. 5B.

In FIGS. 5A-5D, it can be seen that when the drive cam 38 has been rotated approximately 100° from the preselected start position, the reset cam 80 has been rotated to cause the control arm 44 to pivot in the direction indicated by arrow "G" in FIG. 5B. As can be seen in FIGS. 5A-5D, the rotation of the reset cam 80 about the pivot point 82 in the direction indicated by arrow "F" (FIG. 4B) causes the control arm 44 to pivot about its central pivot point 64, in the direction indicated by arrow "G" in FIG. 5B. Specifically, due to the rotation of the reset cam 80 about its pivot point 82, the first side 79 engages the roller 70 to push the second part 69 of the control arm 44 downwardly, as can be seen in FIGS. 4B and 5B.

Figure 8A:
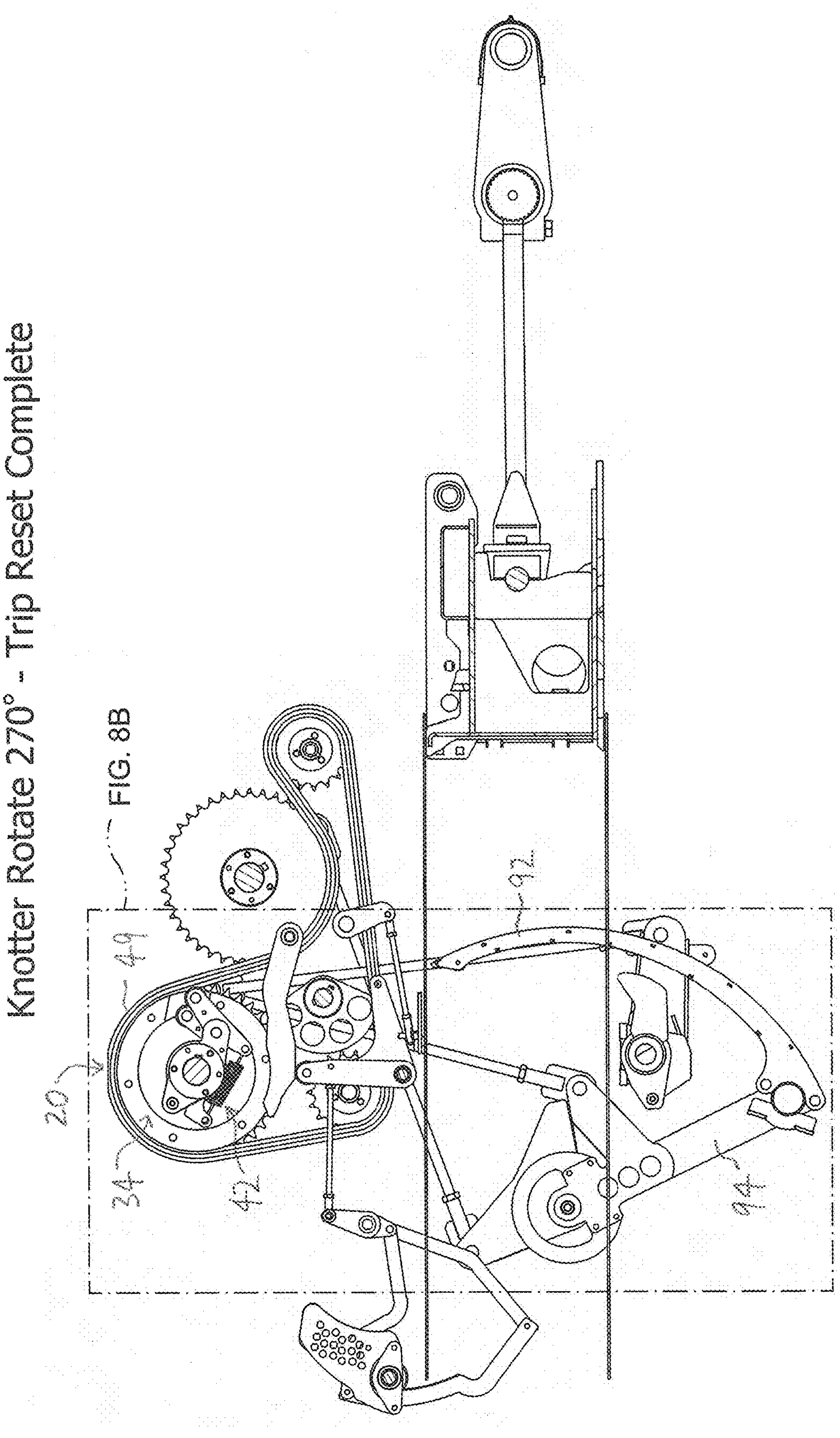
FIG. 8A is a partial cross-section of the baler.
Figure 8B:
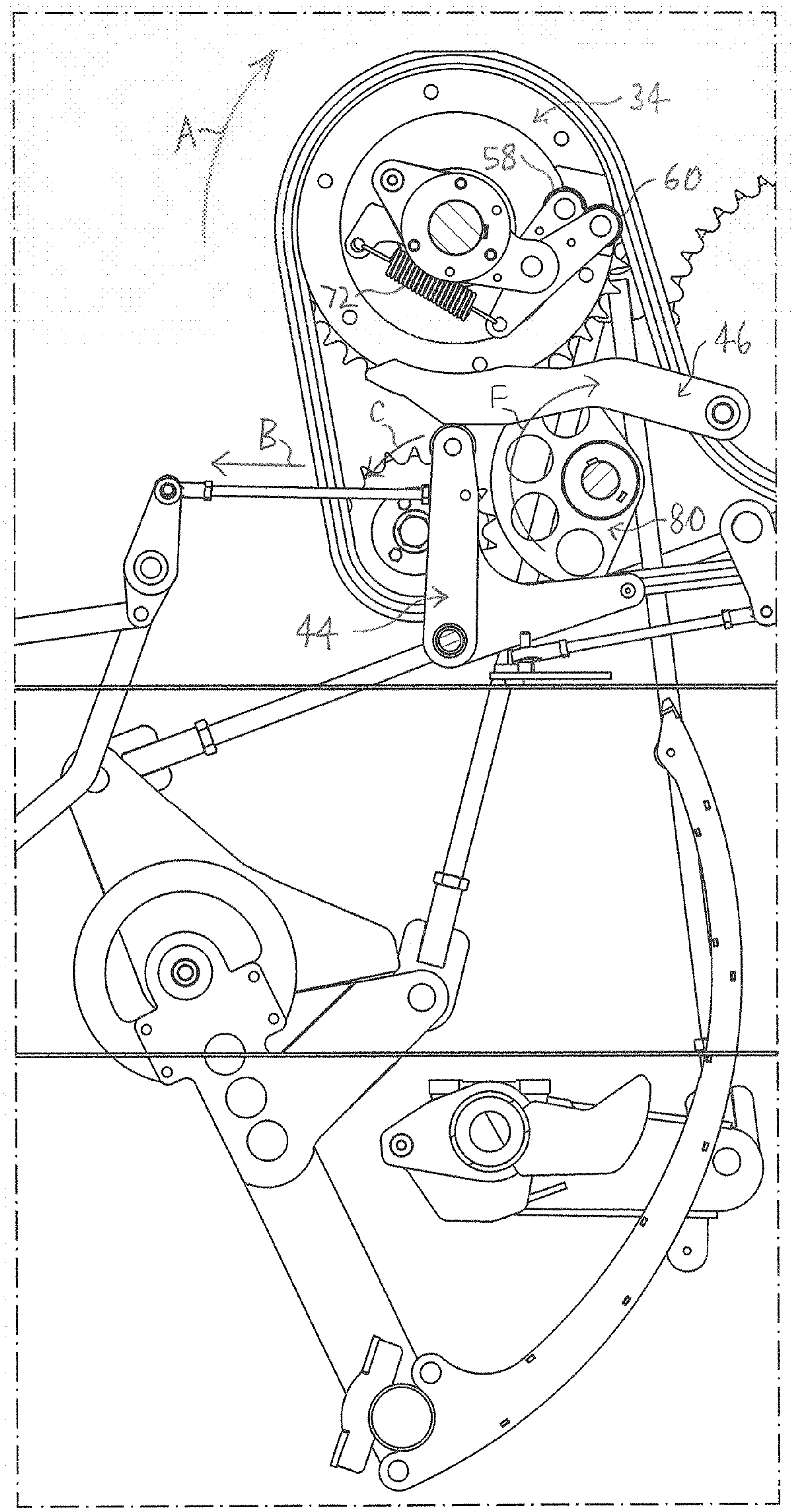
FIG. 8B is a side view of the knotter control assembly and the clutch plate of FIG. 8A, in which a drive cam on the clutch plate and a drive roller engaged in the drive cam have moved approximately 270° from the start position, drawn at a larger scale.

As will be described, and as shown in FIGS. 6B, 7B, and 8B, the rotation of the reset cam 80 about its pivot point 82 continues until the control arm 44 is in a reset position thereof (FIG. 8B). When the control arm 44 is in its reset position, the first part 62 is located to position the roller 66 to support the stop arm 46 in a position in which the drive roller 60 may engage the upper engagement surface 48 and thereby disengage the drive roller 58 from the drive cam 38.

For clarity of illustration, the second arm 54 and the control roller 60 are omitted from FIG. 5C.

As will also be described, when the drive cam 38 has been rotated approximately 158° to 180° from the preselected start position, the hay dogs 84 are at their uppermost position, relative to a floor 86 of the compression chamber 28 (FIGS. 6A, 7A). The floor 86 and slots or notches 51 therein can be seen, for example, in FIGS. 13B and 14.

Referring to FIGS. 1B and 1C, the hay dogs 84 are pivotably mounted to a hay dog yoke 87 that is pivotably connected, via hay dog rods 88A, 88B, to cranks 90A, 90B that are secured to the knotter shaft 40. Therefore, the cranks 90A, 90B are rotated only when the knotter shaft 40 rotates. Preferably, the cranks 90A, 90B are secured to the knotter shaft 40 at the outer ends thereof (FIGS. 1B, 1C).

As can be seen, e.g., in FIGS. 1A and 6A and 7A, the hay dog yoke 87 is movable between a first position thereof (FIG. 1A), in which the hay dogs 84 are positioned by the hay dog yoke 87 at the lowermost position of the hay dogs 84, and a second position thereof (FIGS. 6A, 7A), in which the hay dogs 84 are positioned by the hay dog yoke 87 at the uppermost position of the hay dogs 84. The hay dog yoke 87 is moved by the hay dog rods 88A, 88B when the hay dog rods 88A, 88B are moved by the cranks 90A, 90B.

The baler 24 preferably also includes a plurality of the needles 92 that are pivotably mounted to a needle yoke 94. As can be seen in FIG. 1C, the needle yoke 94 is pivotably mounted to rods 96A, 96B that are also pivotably mounted to the respective cranks 90A, 90B. Movement of the needle yoke 94 causes the needles 92 to move between retracted and extended positions thereof, as will be described.

As can be seen in FIGS. 1A, 2A, 3A, 4A, 5A, 6A, and 7A, the needles 92 are first moved from the retracted position to the extended position thereof. The needles 92 are shown in their initial retracted position in FIGS. 1A, 2A, and 3A. In FIG. 7A, the needles 92 are shown in their extended position. The needles 92 are shown in intermediate positions, while moving from the retracted position to the extended position, in FIGS. 4A, 5A, and 6A.

Figure 9A:
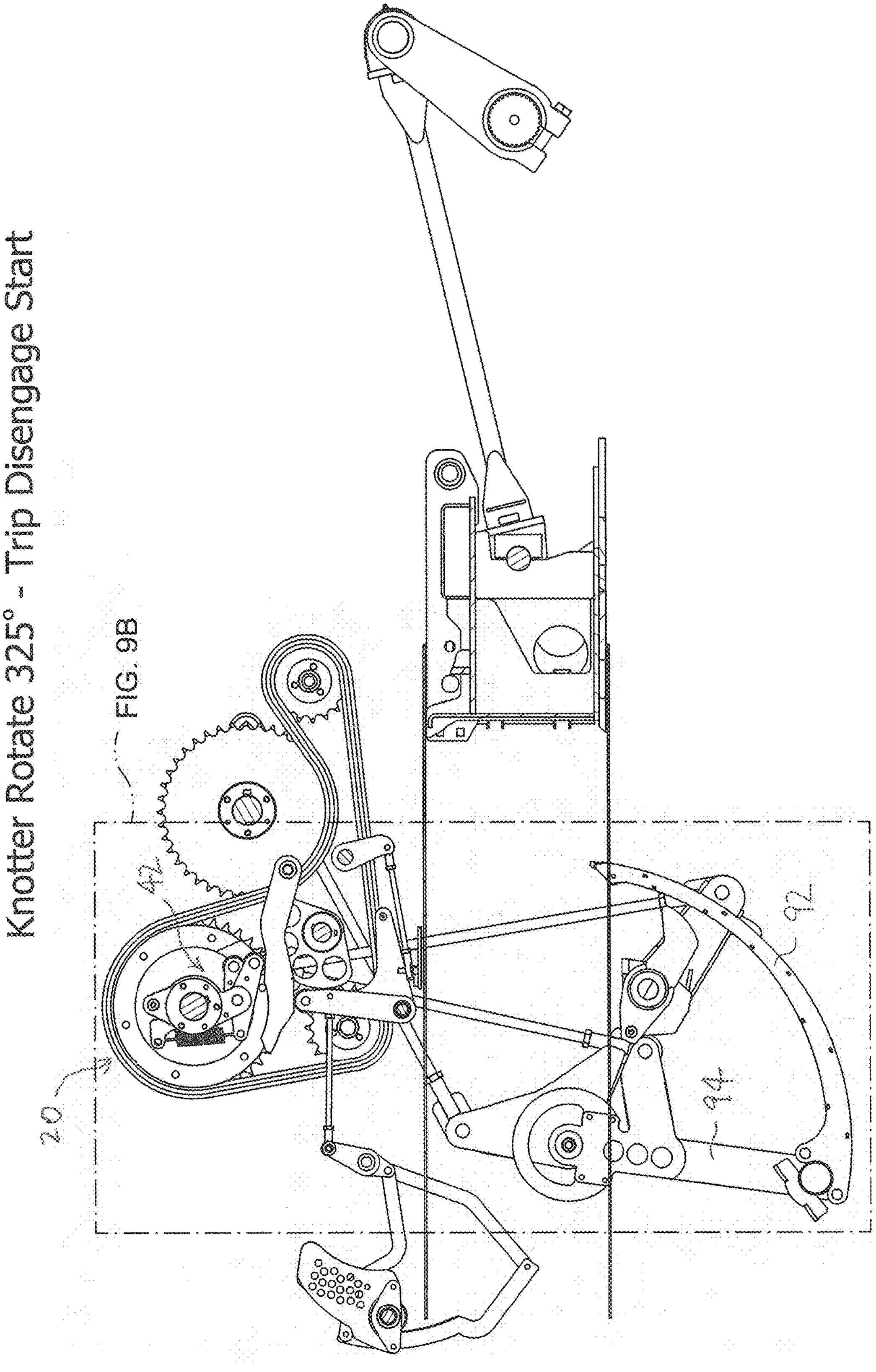
FIG. 9A is a partial cross-section of the baler.
Figure 10A:
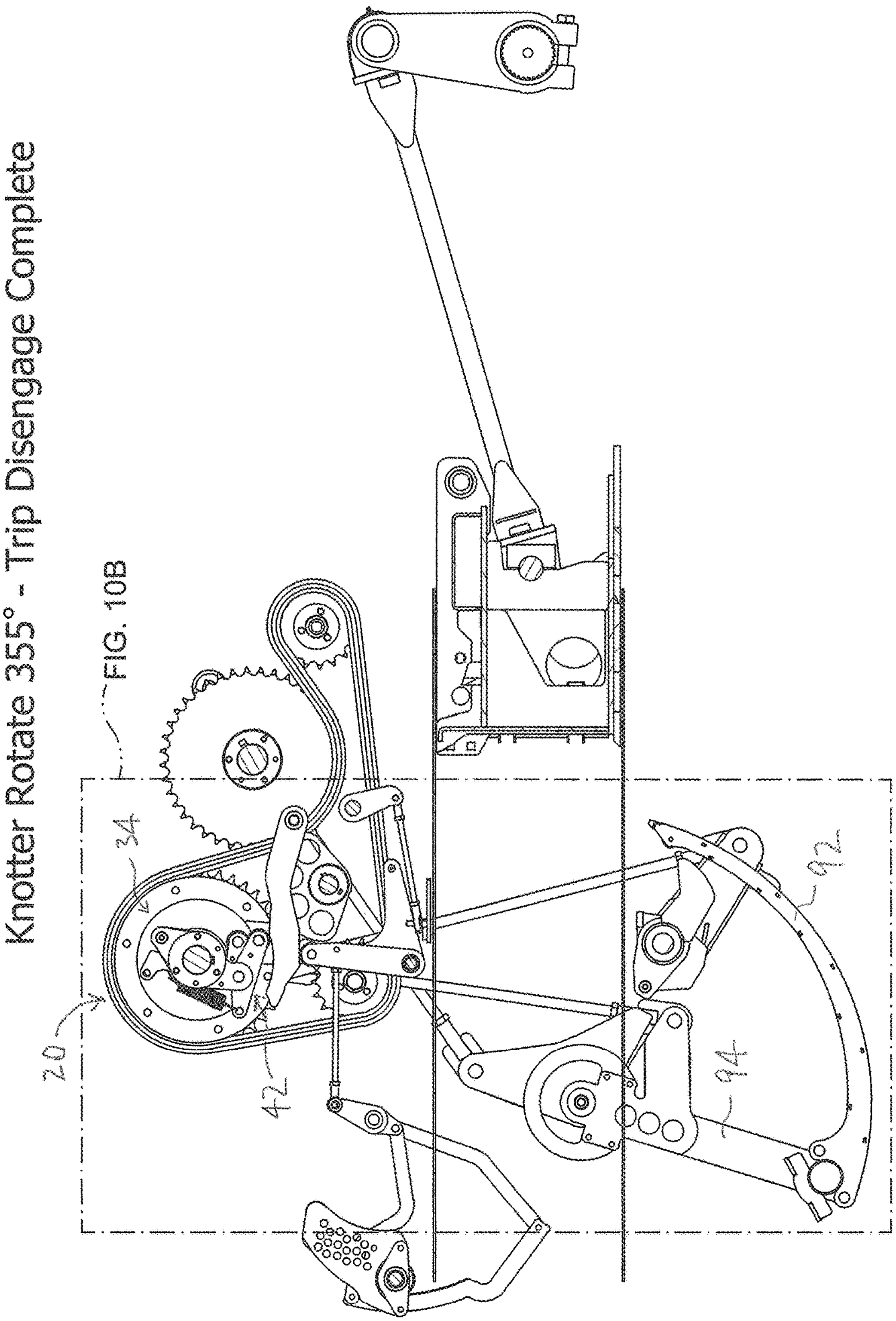
FIG. 10A is a partial cross-section of the baler.
Figure 11:
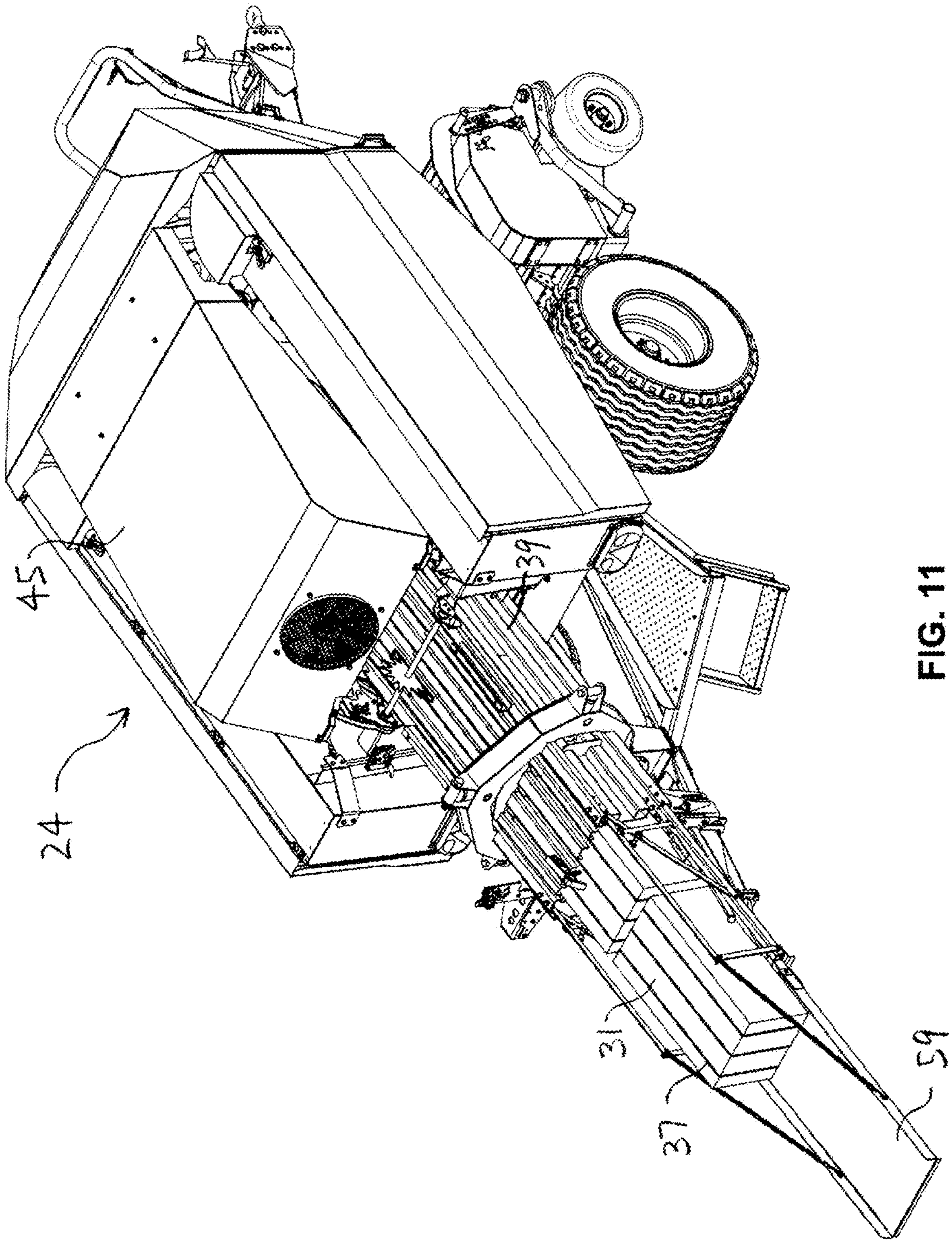
FIG. 11 is an isometric view of an embodiment of a baler of the invention with bales exiting therefrom, drawn at a smaller scale.
Figure 12:
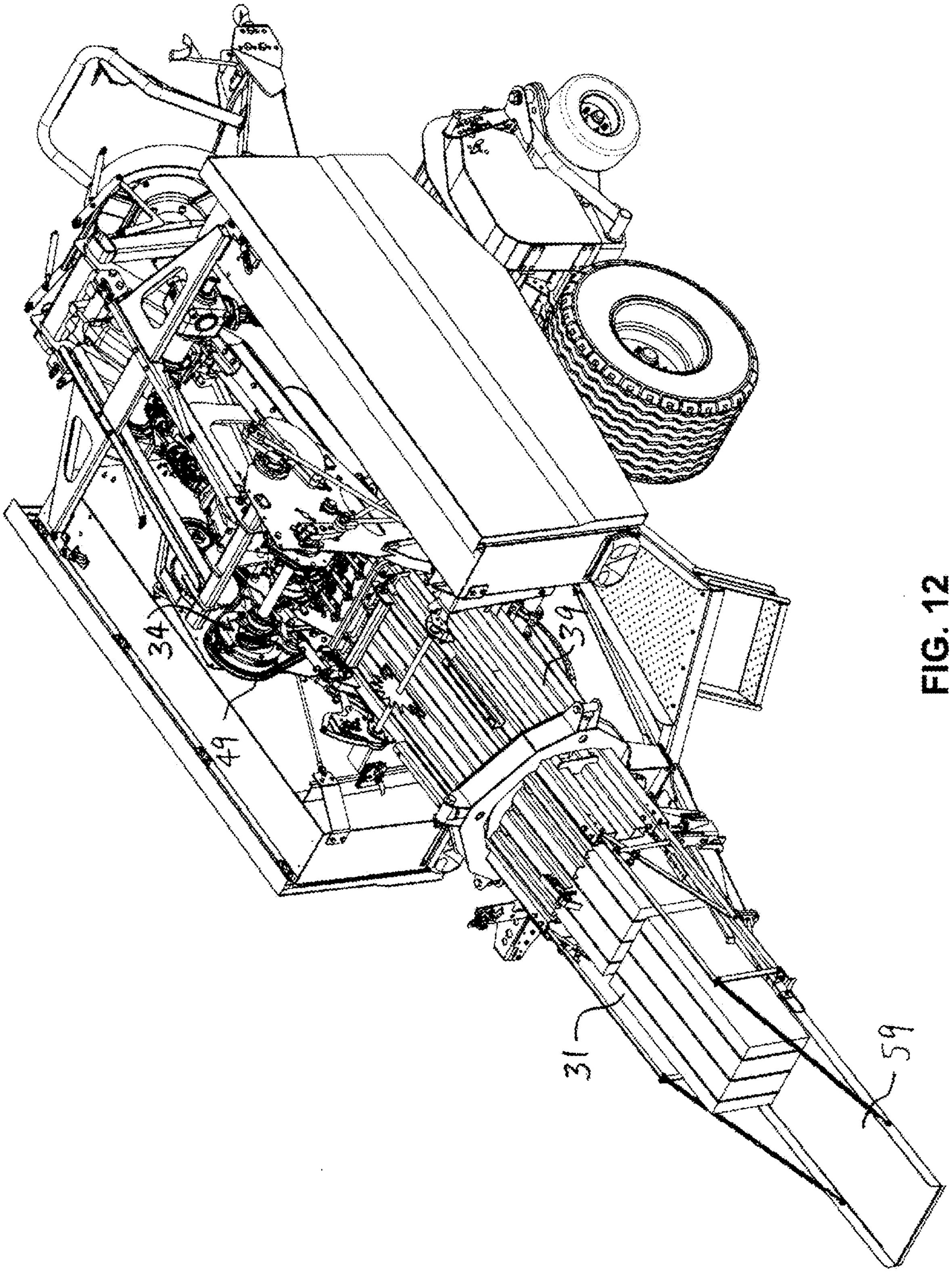
FIG. 12 is an isometric view of the baler of FIG. 11, with a shield assembly thereof omitted.

In FIGS. 7A, 8A, 9A, and 10A, it can also be seen that the needles 92 are subsequently moved from the extended position back to the retracted position. The needles 92 are shown in intermediate positions, while moving from the extended position to the retracted position, in FIGS. 8A and 9A. In FIG. 10A, the needles 92 are shown in a final retracted position (which is the same as the retracted position shown in FIGS. 1A, 2A, and 3A), ready for the next bale.

In order to position the twine on the bale 31, the needles 92 are moved into and out of the compression chamber 28 in a very short time period, i.e., after the bale 31 is formed by the plunger 26, and before the plunger 26 extends into the compression chamber 28 again, to form the next bale. Those skilled in the art would appreciate that the movement of the needles 92 between their retracted and extended positions is required to be coordinated with movement of the plunger 26.

From the foregoing, it can be seen that the movement of the needles 92 into the compression chamber 28 is illustrated in FIGS. 3A, 4A, 5A, 6A, and 7A, and the movement of the needles 92 out of the compression chamber 28 is illustrated in FIGS. 8A, 9A, and 10A.

When the needles 92 are in their retracted position, as can be seen, for example, in FIGS. 1A-1C, the needle yoke 94 is in a home position thereof. When the needles 92 are in their extended position, as shown in FIGS. 7A and 7B, the needle yoke 94 is in an activated position thereof.

When the actuation subassembly 42 is first engaged (i.e., when the drive roller 58 is first positioned in the drive cam 38), the cranks 90A, 90B begin to rotate about the axis "X", in the direction indicated by arrow "A" in FIGS. 1B and 1C. It will be understood that the cranks 90A, 90B and the rods 88A, 88B respectively pivotably connected therewith, and the elements connected with the rods 88A, 88B, are configured so that rotation of the cranks 90A, 90B about the axis "X" causes the hay dogs 84 to be pivoted to the uppermost position thereof when the drive cam 38 is approximately at the 158° rotation position, as illustrated in FIGS. 6A and 6B. It will be understood that the hay dogs 84 are positioned so that they partially extend through slots 51 in the floor 86 when the hay dogs 84 are in their uppermost position.

As can be seen in FIGS. 1A and 6A and 7A, when the needle yoke 94 is in the home position thereof, the hay dog yoke 87 is in the first position thereof, and when the needle yoke 94 is in the activated position thereof, the hay dog yoke 87 is in the second position thereof. As noted above, when the hay dog yoke 87 is in its first position, the hay dogs 84 are in their lowermost position, and located below the floor 86. When the hay dog yoke 87 is in its second position, the hay dogs 84 are in their uppermost position, and partially located above the floor 86, and urging loose crop material against the front face 41 of the bale 31.

Those skilled in the art would appreciate that, as the crop material is pushed into the compression chamber to form the bale 31, there often is some crop material that hangs into a stuffer throat (not shown) under the compression chamber. Much of this crop material is cut with a knife (not shown) on the leading edge of the plunger as it crosses an edge at the rear of the stuffer throat opening, but there still may be crop material positioned in the notches or slots 51 in the floor 86 through which the needles 92 pass as they are moved into or out of the compression chamber 28. When the crop material in the notches is pushed into the compression chamber by the upward movement of the needles 92, that crop material is loose (i.e., not compressed by the plunger), and the loose crop material is located at a front side 41 of the bale 31, when the twine is pulled against the front side of the bale 31 (FIGS. 1A, 7B).

The hay dogs 84 are configured to address this, by pushing any of the crop material that is in the notches or slots 51 in the floor of the compression chamber against the front face 41 of the bale 31. It will be understood that the hay dogs 84 are raised to uppermost positions thereof (FIGS. 6B, 7B) after the bale has been formed by the plunger 26, before or shortly after twine is pulled around the bale by the needles 92.

When the hay dogs 84 are in their uppermost positions (FIGS. 6B, 7B), which may be at the same time or slightly before or after the needles 92 are in their uppermost position, the hay dogs 84 press any of the loose crop material that was compressed into the notches in the floor during the compression of the bale 31 against the face of the bale 31. (It will be understood that, for clarity of illustration, such loose crop material is omitted from FIGS. 6B and 7B.) This creates a clear path for the twine from the bottom of the bale 31 to the top of the bale in the compression chamber 28, so as to reduce any slack twine that there may be across the front of the bale. This achieves a more consistent bale length when the bale exits the compression chamber (i.e., after the twine is knotted thereon), as the crop of the bale decompresses and tightens the tied twine.

It will also be understood that the cranks 90A, 90B and the connecting rods 96A, 96B respectively pivotably connected therewith, and the elements connected with the connecting rods 96A, 96B, are configured so that rotation of the cranks 90A, 90B about the axis "X" causes the needles 92 to be pivoted to the extended position thereof when the drive cam 38 is approximately at the 180° rotation position, illustrated in FIGS. 7A and 7B.

Figure 8C:
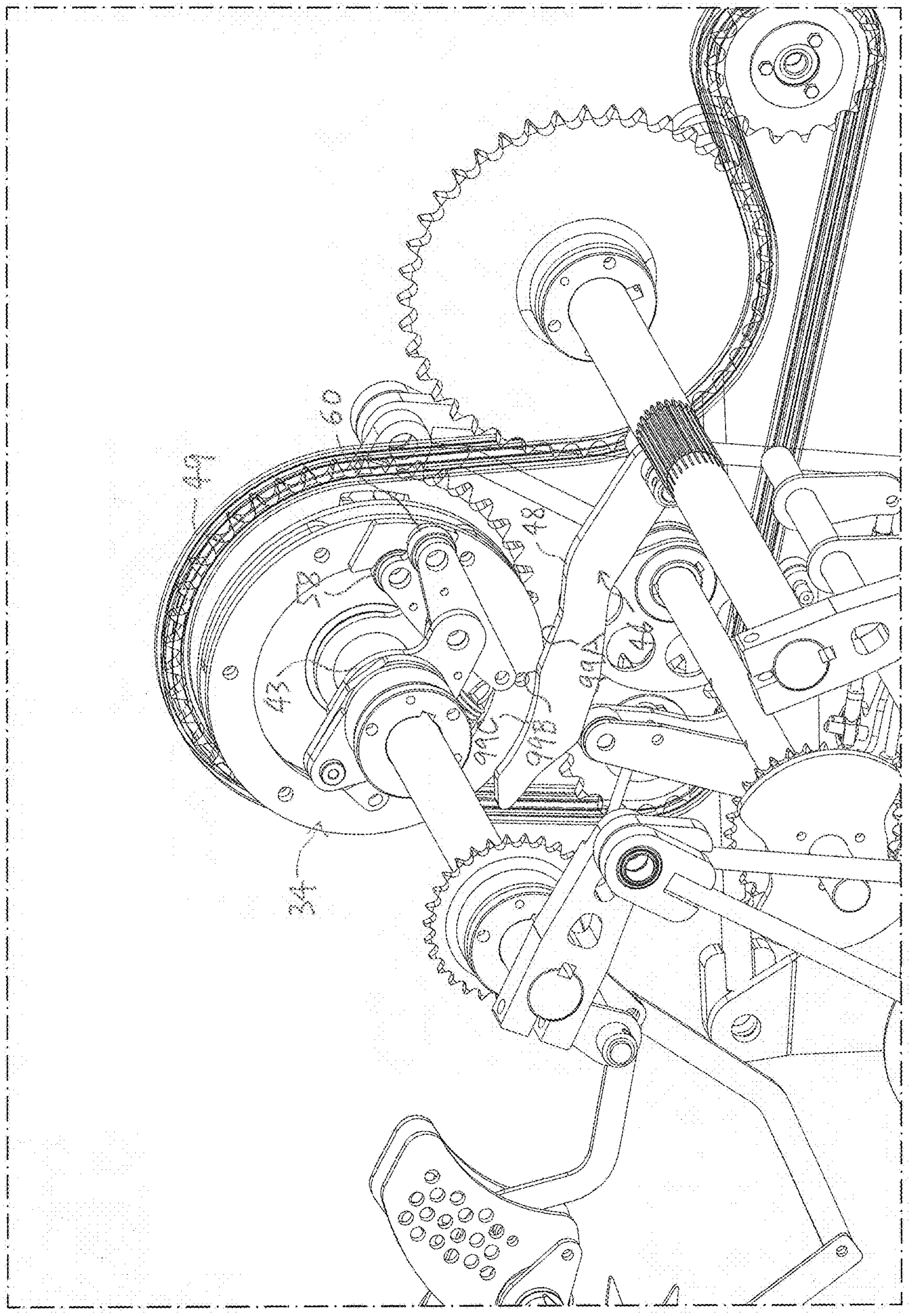
FIG. 8C is an isometric view of the knotter control assembly and the clutch plate of FIG. 8B.

As can be seen in FIGS. 8A-8C, the drive roller 58 remains positioned in the drive cam 38, and continued rotation of the clutch plate 34 causes the drive roller 58 to rotate to a position that is 270° from the six o'clock (start) position thereof. At the same time, the reset cam 80 rotates further in the direction indicated by arrow "F" (FIG. 8B), and the second control arm roller 70 is disengaged from the reset cam 80. Due to this disengagement, the control arm 44 pivots in the direction indicated by arrow "C" in FIG. 8B. This enables a gear (not shown) on a bale length arm 98 of the bale length mechanism 30 to engage on a starwheel drive roller (not shown in FIG. 8B) of the bale length mechanism 30.

In addition, due to the movement of the control arm 44 in the direction indicated by arrow "C" in FIG. 8B, the first control arm roller 66 is located to position the stop arm 46 for engagement of the upper engagement surfaces 48 by the control roller 60, when the clutch plate 34 rotates to the point where such engagement is possible.

Figure 9B:
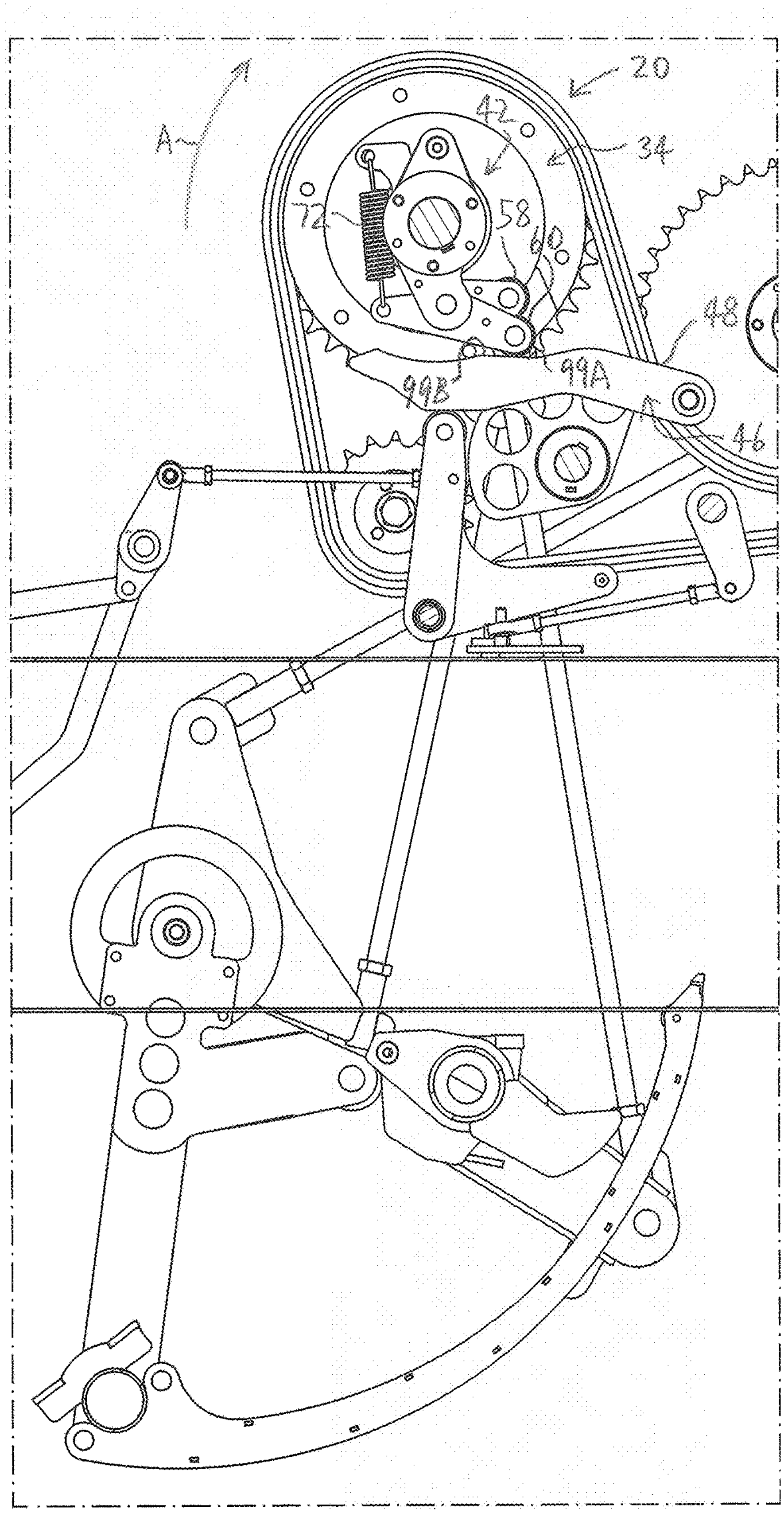
FIG. 9B is a side view of the knotter control assembly and the clutch plate of FIG. 9A, in which a drive cam on the clutch plate and a drive roller engaged in the drive cam have moved approximately 325° from the start position, drawn at a larger scale.
Figure 9C:
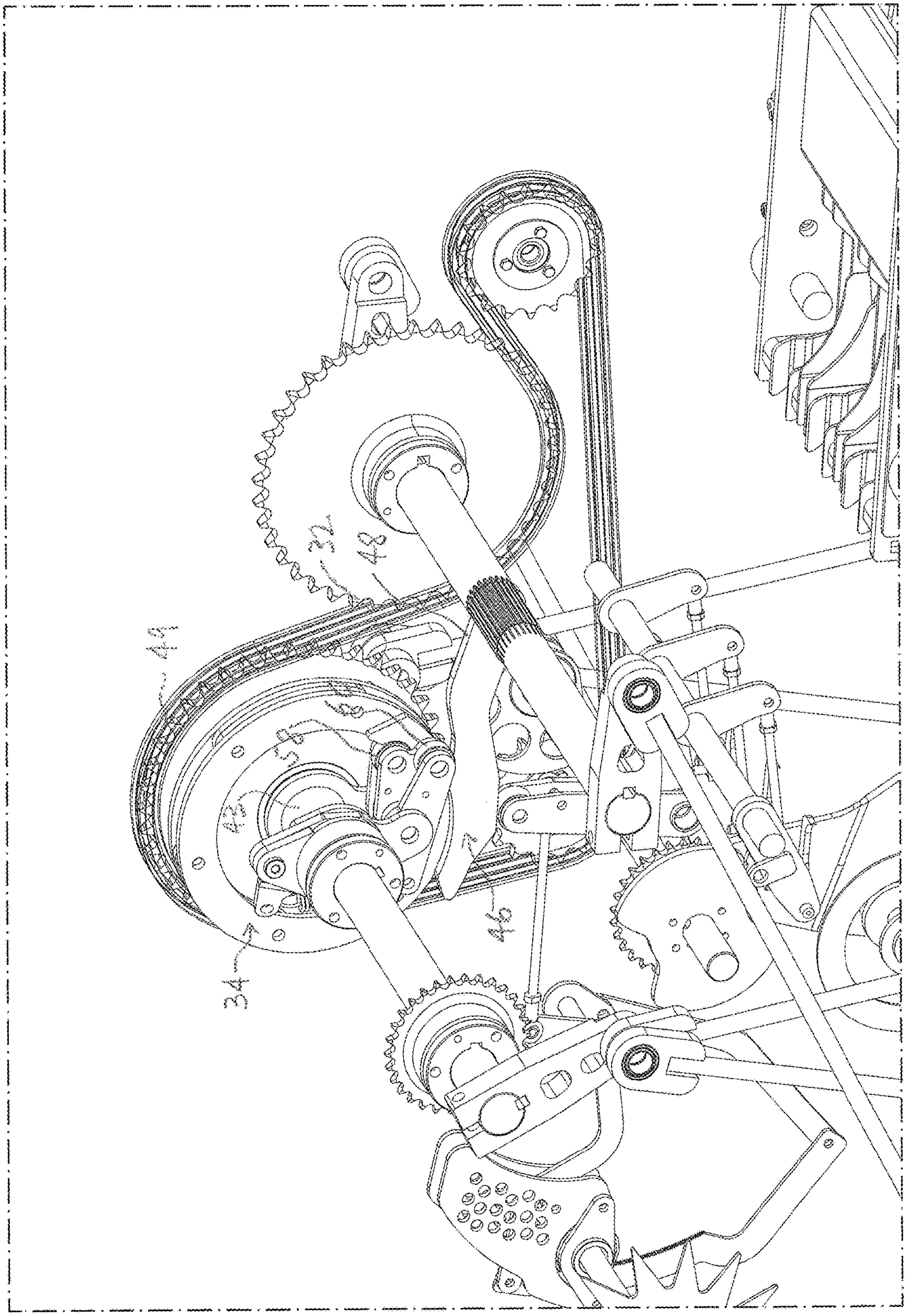
FIG. 9C is an isometric view of the knotter control assembly and the clutch plate of FIG. 9B.

In FIGS. 9A-9C, the drive cam 38 is shown to have rotated to a location that is approximately 325° from the six o'clock (start) position. As can be seen in FIG. 9C, at this point, the drive roller 58 is positioned in the drive cam 38. However, as can be seen in FIGS. 9B and 9C, the control roller 60 also begins to engage the upper engagement surfaces 48 of the stop arm 46. In FIGS. 8C and 9B, it can be seen that the upper engagement surfaces 48 have a profile that includes a lower region 99A at which the control roller 60 makes initial contact therewith, and an upper region 99B that is to the left of the lower region 99A, as illustrated in FIG. 9B.

It will be understood that, as the knotter shaft 40 continues to rotate with the clutch plate 34 in the direction indicated by arrow "A", the control roller 60 moves from the lower region 99A toward the upper region 99B. Because of the control roller's movement along the upper engagement surfaces 48 to the upper region 99B and the simultaneous rotation of the clutch plate 34, the drive roller 58 is lifted out of the drive cam 38.

The disengagement of the drive roller 58 from the drive cam 38 can be seen in FIGS. 10A-10D, when the drive cam 38 is at approximately 355° from the six o'clock (start) position. It will be understood that, in FIG. 10D, the second arm 54 and the control roller 60 are omitted for clarity of illustration, in order to show that the drive roller 58 is disengaged from the drive cam 38 at that point.

Figure 10B:
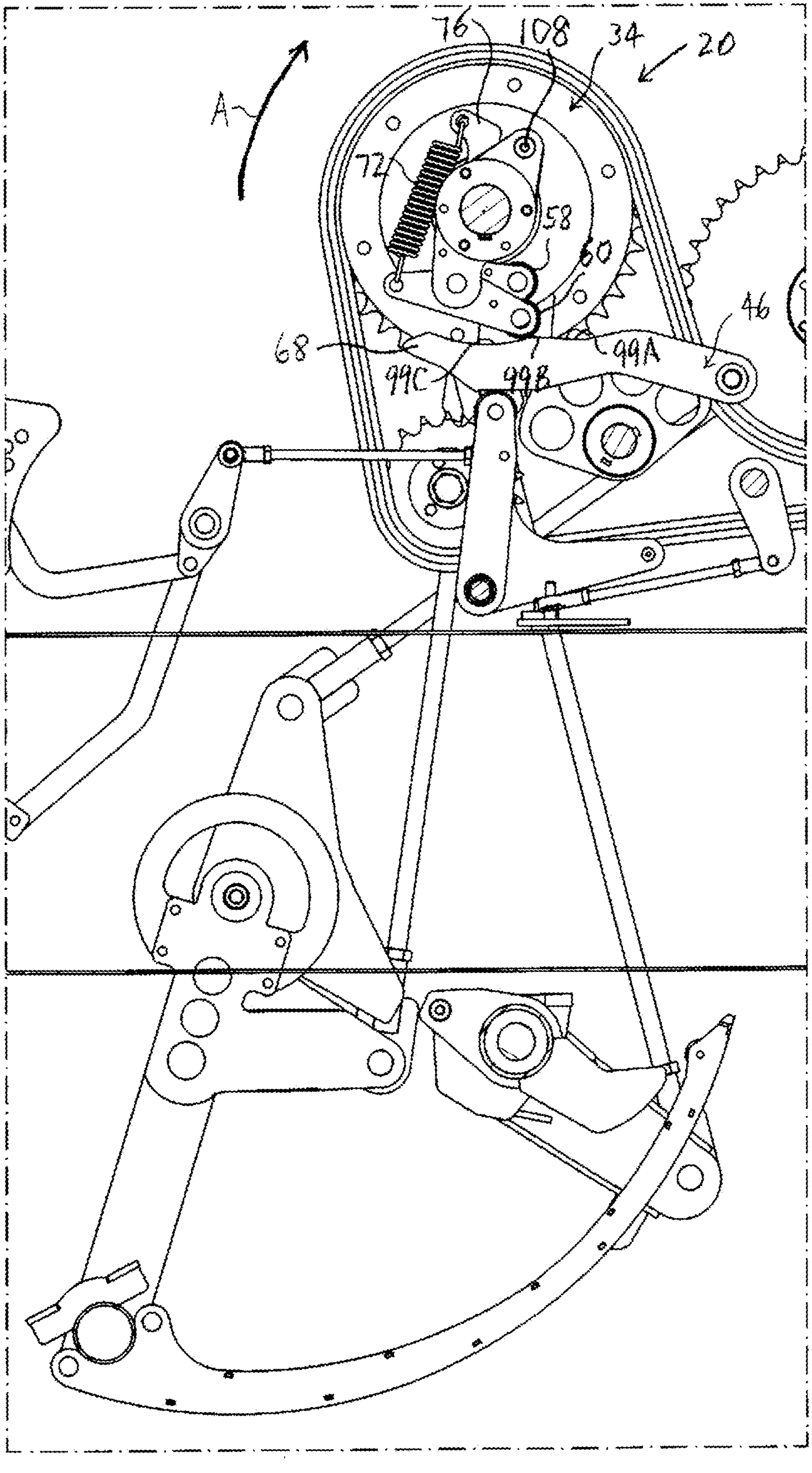
FIG. 10B is a side view of the knotter control assembly and the clutch plate of FIG. 10A, in which a drive cam on the clutch plate and a drive roller engaged in the drive cam have moved approximately 355° from the start position, drawn at a larger scale.
Figure 10C:
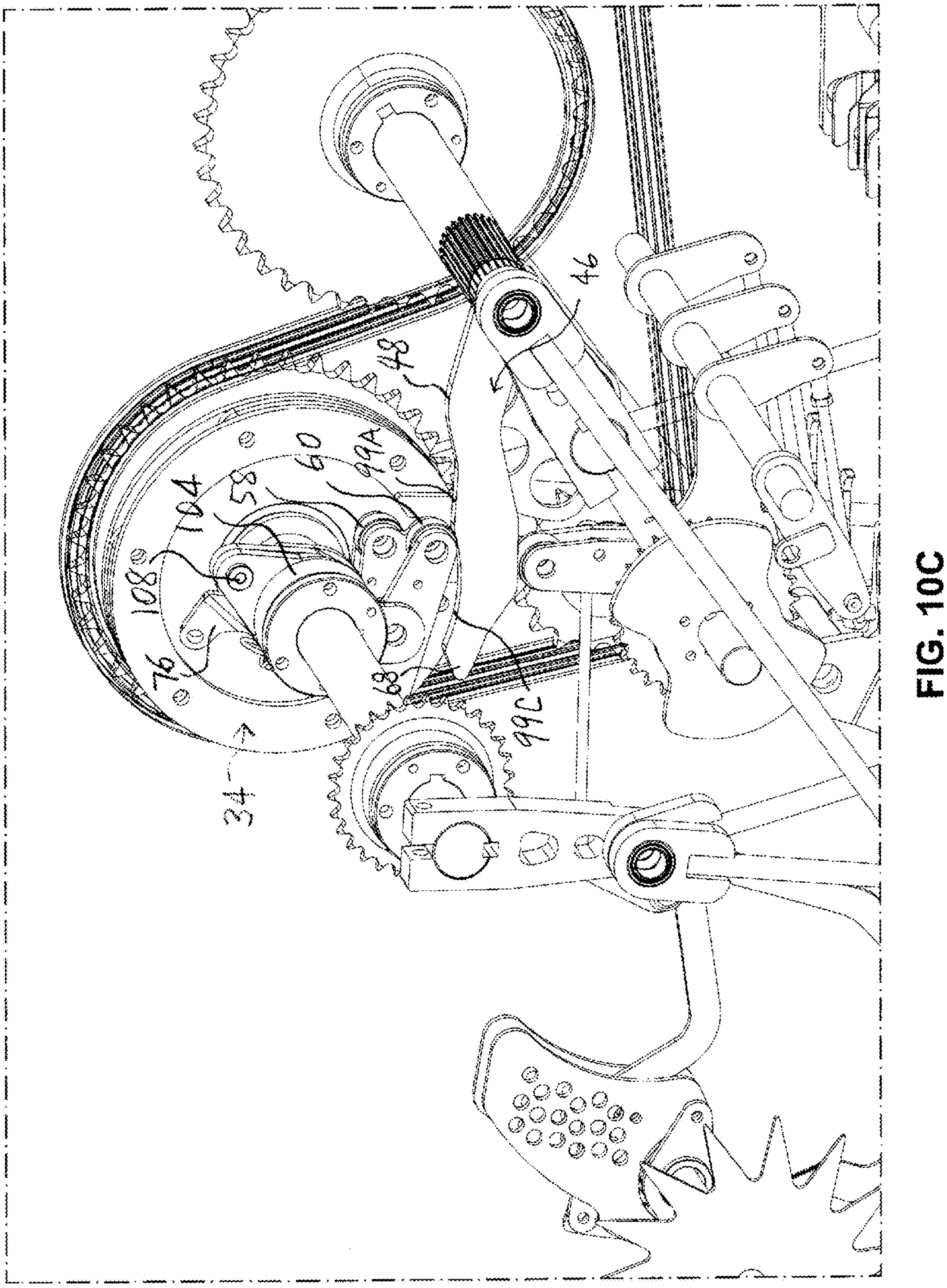
FIG. 10C is an isometric view of the knotter control assembly and the clutch plate of FIG. 10B.
Figure 10D:
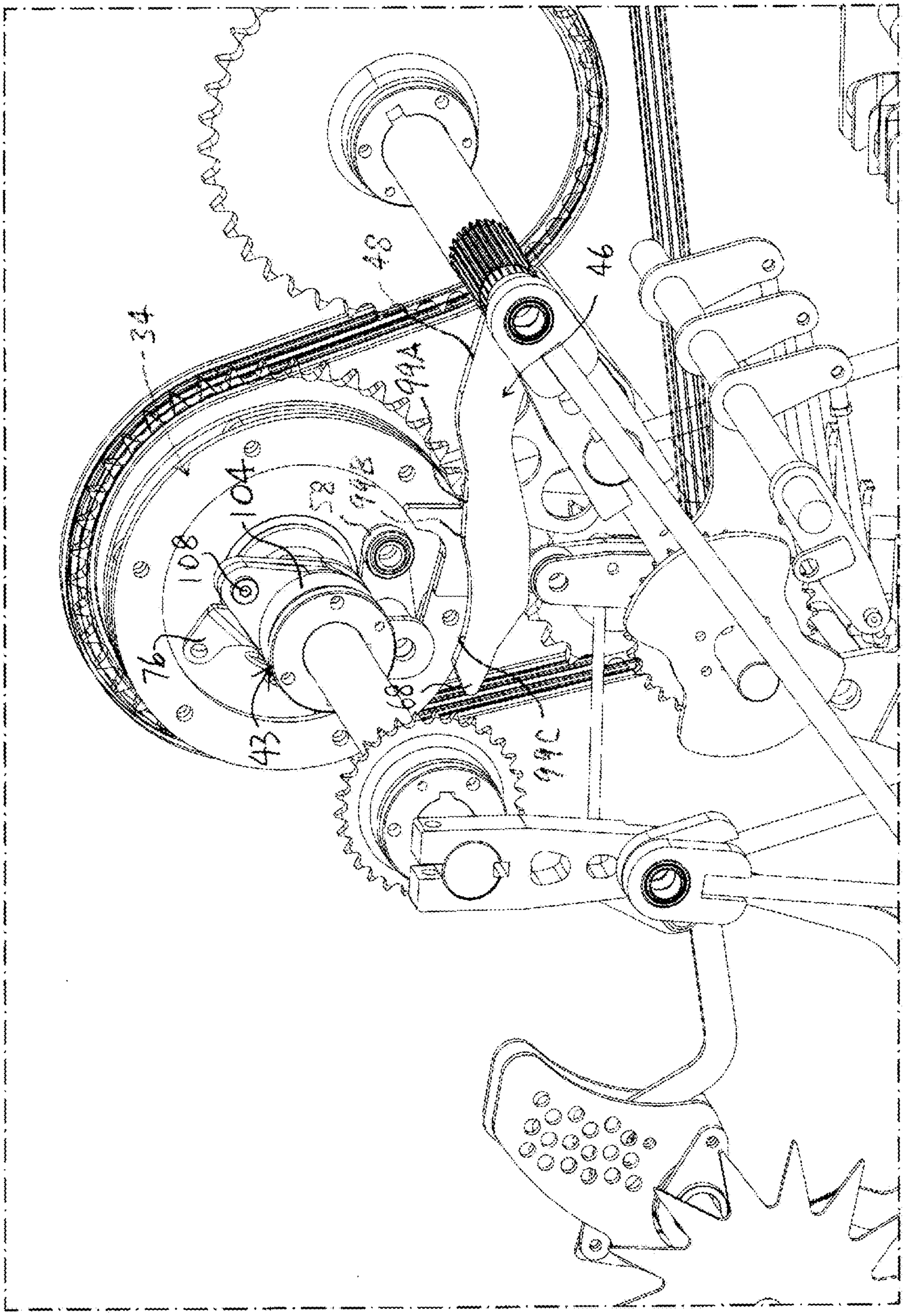
FIG. 10D is another isometric view of the knotter control assembly and the clutch plate of FIG. 10C.

Those skilled in the art would appreciate that, after the clutch plate and knotter shaft are disengaged, the knotter shaft 40 may tend to continue its rotation, independently of the clutch plate 34. As can be seen in FIGS. 10B and 10C, due to such rotation, the control roller 60 may continue to roll along an extension region 99C (shown in FIGS. 8C and 10B-10D) of the upper engagement surfaces 48 toward the outer end 68, i.e., if the knotter shaft 40 continues to rotate in the direction indicated by arrow "A" in FIG. 10B after disengagement of the drive roller 58. The control roller 60 may continue to roll along the extension region 99C until the knotter shaft 40 ceases rotating.

The extension region 99C represents an improvement over the prior art because the extension region 99C enables the knotter control assembly 20 to function normally even if the knotter shaft 40 continues to rotate for a short time after disengagement of the drive roller. The baler 24 has worked at a higher production rate than the prior art balers, e.g., achieving approximately 30% to 50% higher production rates.

As can be seen in FIG. 1D, the collar 43 preferably includes a first part 104 that is secured to the knotter shaft 40, and the second part 106. The second part 106 is positioned between the first part 104 and the clutch plate 34. The second part 106 is not directly secured to the knotter shaft 40, but instead, the second part 106 is only secured to the first part 104 by a shear bolt 108. The second part 106 is also indirectly connected to the trip arm 50 via the first extension portion 71, as described above. The shear bolt 108 is clearly illustrated in FIGS. 1D and 10B-10D.

It will be understood that the first and second extension portions 71, 76 of the collar 43 extend from the second part 106. The trip arm 50 is pivotably mounted to the first extension portion 71 (FIG. 1E).

The shear bolt 108 is configured (i.e., formed) to be sheared off, to disengage the knotter shaft 40 from the clutch plate 34, in the event of a malfunction of the baler 24. When the shear bolt 108 is sheared off, the knotter shaft 40 is disengaged or released from the clutch plate 34. This is intended to minimize the damage to certain parts of the baler that may result from the malfunction.

When the drive roller 58 is in the drive cam 38, the connection of the drive roller 58 to the collar 43 is via the trip arm 50, which is connected to the second part 106 of the collar 43 via the first extension portion 71. It can therefore be seen that if the shear bolt 108 is sheared off, because the second part 106 is not secured to the knotter shaft 40, then the knotter shaft 40 and the clutch plate 34 are no longer connected.

For instance, if the needles 92 are blocked from moving into the compression chamber 28 when they are required to do so (i.e., after the bale is formed) for operating in the proper sequence with the proper timing, this would stop rotation of the cranks 90A, 90B, and consequently also stop rotation of the knotter shaft 40. However, at that point, due to the continued rotation of the clutch plate 34 and the engagement of the drive roller 58 in the drive cam 38, the shear bolt 108 would shear off, disconnecting the first and second parts 104, 106 of the collar 43. After the first and second parts 104, 106 are disconnected, the knotter shaft 40 ceases rotating. Also, after the shear bolt 108 is sheared off, the actuation subassembly 42 would thereafter complete its cycle, with the drive roller 58 being disengaged from the drive cam 38 approximately when the drive cam's rotation is completed (i.e., when the drive cam 58 is at approximately 355° from the start position), as described above.

As can be seen in FIGS. 1B and 1C, the baler 24 preferably includes a protection assembly 109 that is also intended to provide protection to certain elements of the baler 24 in the event of a malfunction. The protection assembly 109 preferably includes a forward shaft 110 to which a second drive sprocket 112 is mounted. The second drive sprocket 112 is driven by the chain 49 engaged therewith while the baler 24 is operating. The second drive sprocket 112 rotates in the direction indicated by arrow "H" in FIGS. 1B and 1C, rotating the forward shaft 110 about its axis "Z".

The protection assembly 109 also includes second cranks 114A, 114B that are mounted to the forward shaft 110, and rotate with the second drive sprocket 112.

The protection assembly 109 preferably also includes second connecting rods 116A, 116B that are respectively connected with the second cranks 114A, 114B. As can be seen in FIGS. 1B and 1C, the second connecting rods 116A, 116B are also pivotably connected with attachment elements 118A, 118B, at respective pivot points 119A, 119B. The protection assembly 109 includes the attachment elements 118A, 118B, each of which is respectively pivotably attached to the needle yoke 94, at respective pivot points 95A, 95B.

To simplify the description, only the movements of the attachment element 118B and the connecting rod 116B and the second crank 114B will be described below. It will be understood that the corresponding movements of the corresponding elements on the other side of the baler are the mirror image thereof.

As can best be seen in FIGS. 6B and 7B, the needle yoke 94 preferably includes upper surfaces 121 that are engageable by respective lower surfaces 123 of the attachment elements 118A, 118B.

Referring to FIG. 1B, rotation of the second drive sprocket 112 in the direction indicated by arrow "H" causes corresponding rotational movement of the forward shaft and corresponding rotational movement of the second crank 114B about the axis "Z". Depending on the position of the second crank 114B, rotation of the second drive sprocket 112 and the front shaft 110 causes the second connecting rod 116B to be moved in the directions indicated by arrows "$J_1$", "$J_2$".

Figure 8D:
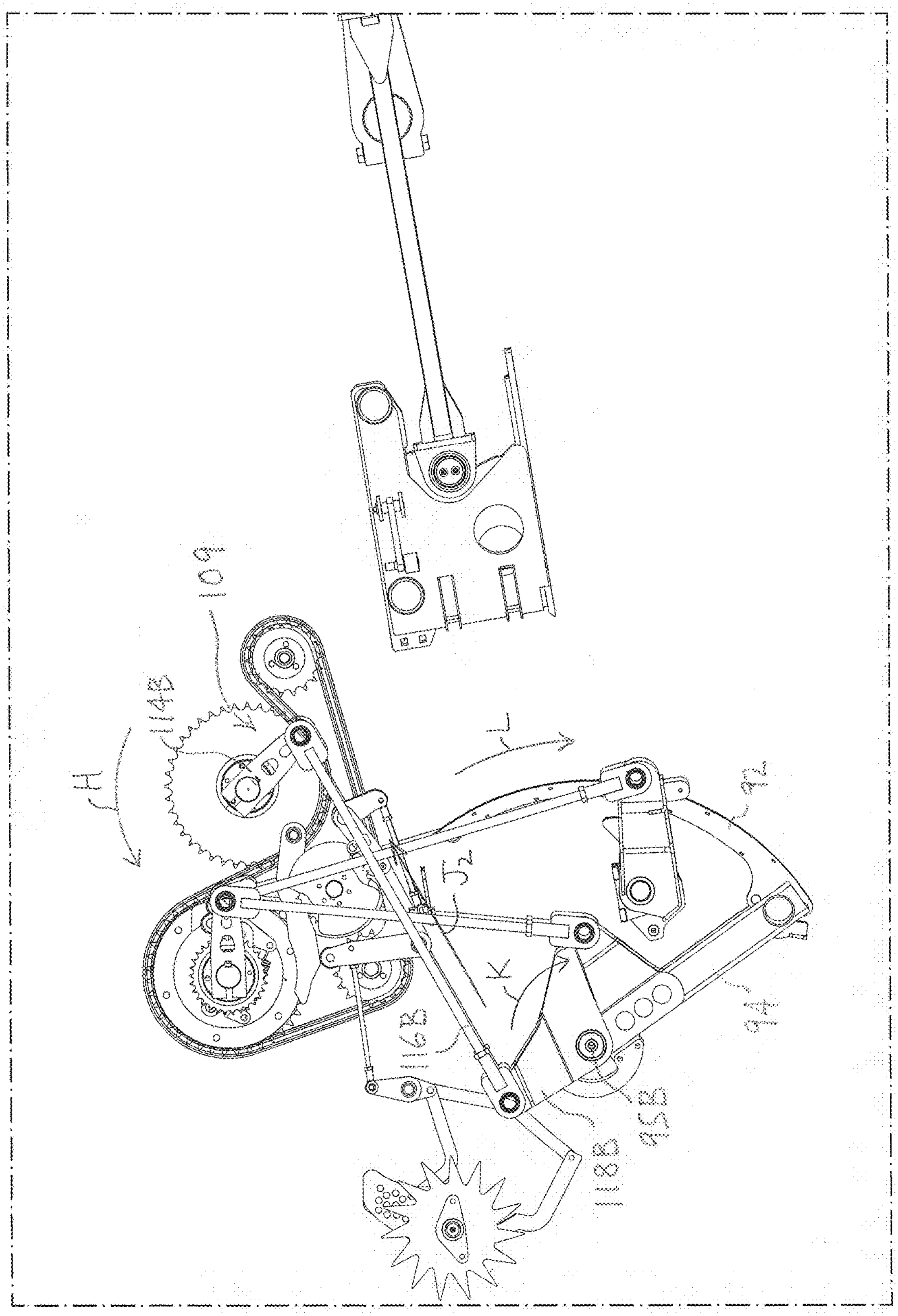
FIG. 8D is a side view of part of the protection assembly, drawn at a smaller scale.

For example, as can be seen in FIG. 7C, when the needles 92 are in their extended position, the crank 114B is in a downward position, aligned with the connecting rod 116B. Even if the needles 92 were jammed or stuck in the extended position as illustrated in FIG. 7C, the rotation of the forward shaft 110 would cause the crank 114B to rotate as indicated by arrow "H" to its position as shown in FIG. 8D, pulling the connecting rod 116B in the direction indicated by arrow "$J_2$", thereby causing the attachment element 118B to rotate about the pivot point 95B in the direction indicated by arrow "K".

The rotation of the attachment element 118B causes its lower surface 123 to push downwardly on the upper surface 121 of the needle yoke 94, causing the needle yoke 94 also to pivot in the direction indicated by arrow "K". This causes the needles 92 to be pulled in the direction indicated by arrow "L" (FIG. 8D).

Figure 9D:
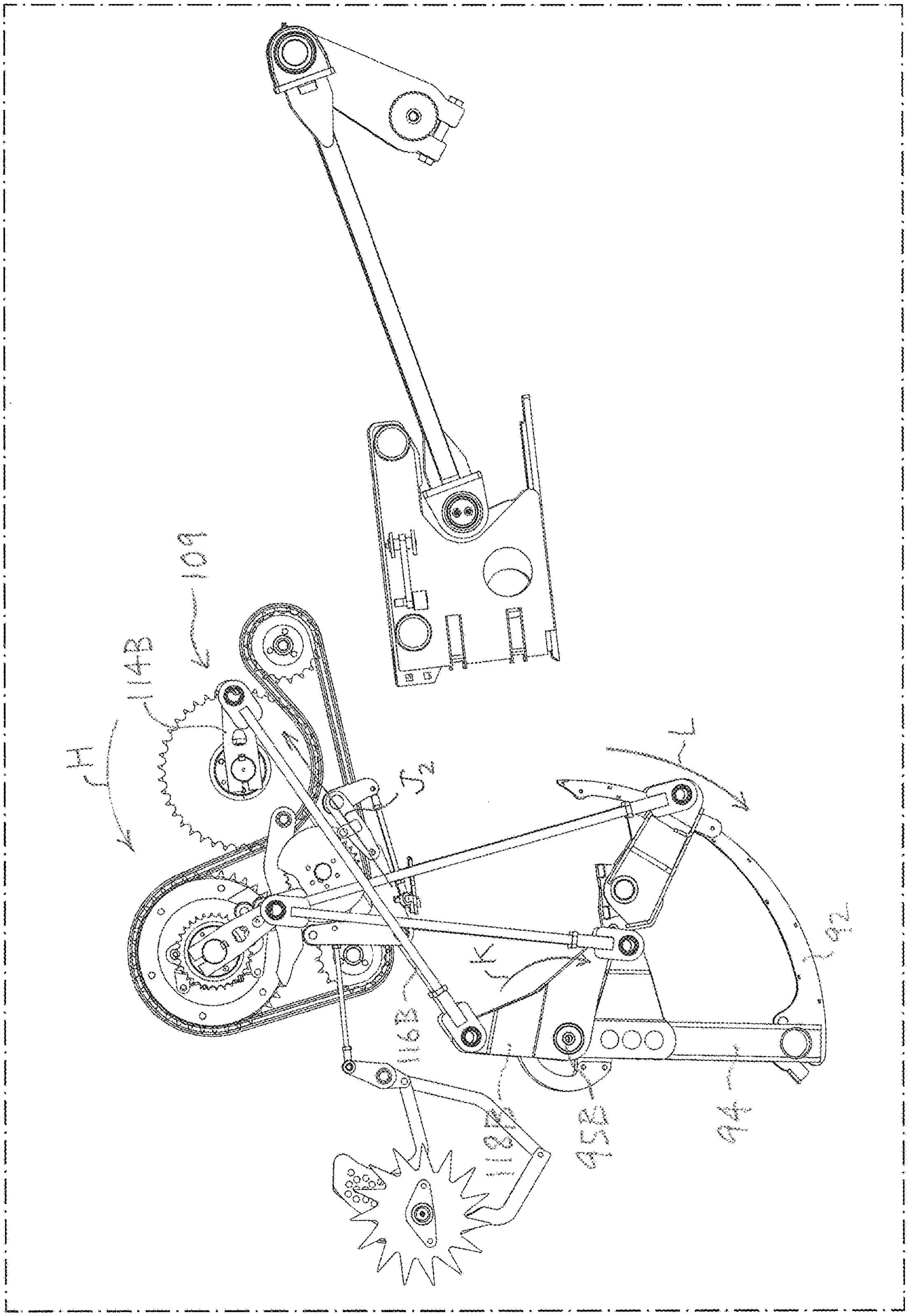
FIG. 9D is a side view of part of the protection assembly, drawn at a smaller scale.

Further rotation of the forward shaft 110 in the direction indicated by arrow "H" in FIG. 9D pulls the connecting rod 116B further in the direction indicated by arrow "$J_2$", causing further rotation of the attachment element 118B about the pivot point 95B in the direction indicated by arrow "K". In turn, such rotation of the attachment element 118B causes corresponding rotation of the needle yoke 94 in the direction indicated by arrow "K", resulting in further downward movement of the needles 92 in the direction indicated by arrow "L", toward the retracted position of the needles 92.

Figure 10E:
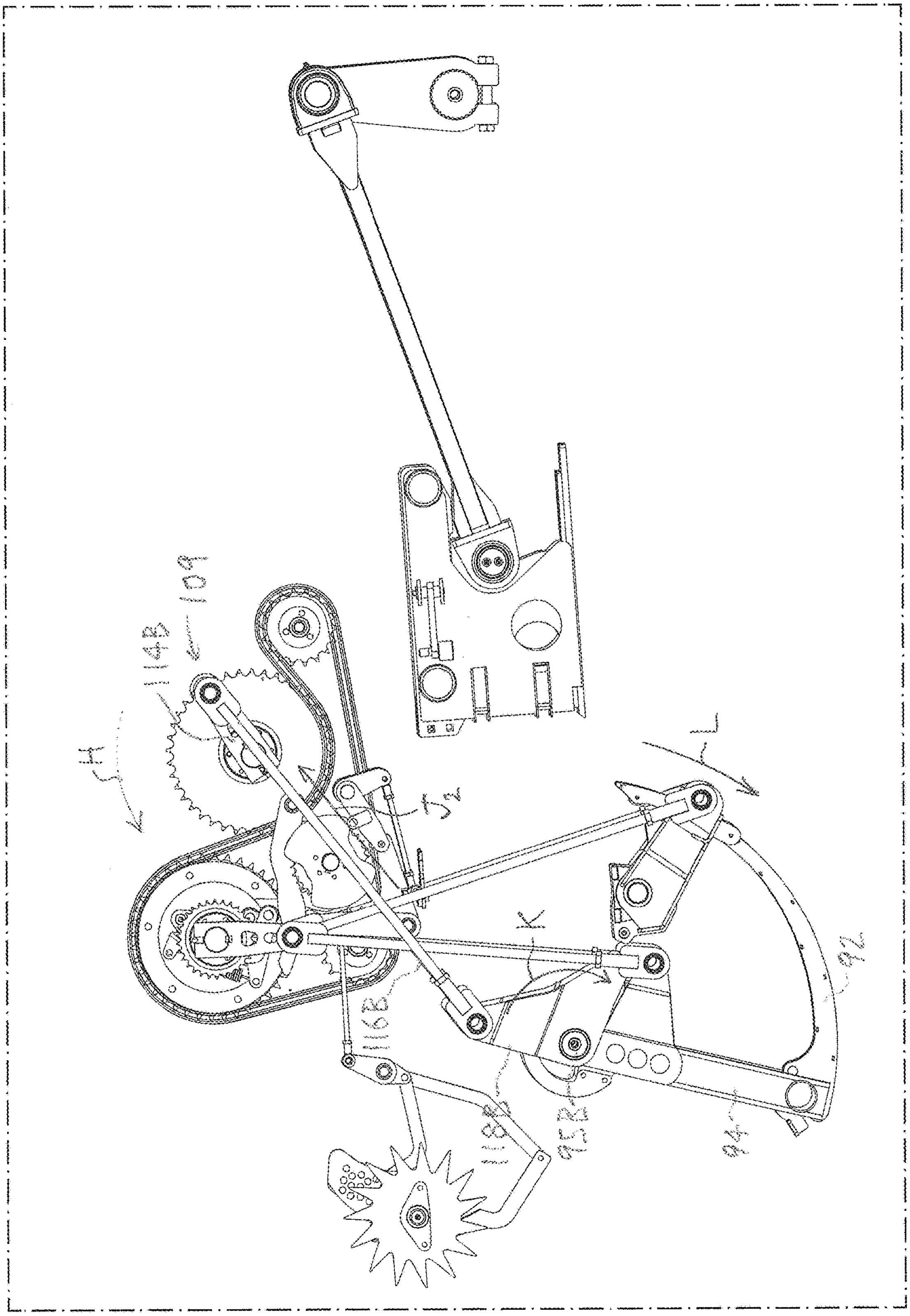
FIG. 10E is a side view of part of the protection assembly, drawn at a smaller scale.

As can be seen in FIG. 10E, further rotation of the forward shaft in the direction indicated by arrow "H" pulls the connecting rod 116B further in the direction indicated by arrow "$J_2$". This causes further rotation of the attachment element 118B about the pivot point 95B in the direction indicated by arrow "K". In turn, such further rotation of the attachment element 118B causes corresponding further rotation of the needle yoke 94 in the direction indicated by arrow "K". This results in further corresponding movement of the needles 92 in the direction indicated by arrow "L", and the needles 92 at this point are fully withdrawn from the compression chamber 28.

In summary, rotation of the forward shaft 110 about the axis "Z" thereof causes corresponding movement of the second cranks 114A, 114B, causing corresponding movement of the respective connecting rods 116A, 116B, to move the needle yoke 94 to the home position thereof.

As noted above, while the baler 24 is operating, the second drive sprocket 112 is driven by the chain 49 and rotating in the direction indicated by arrow "H", causing the front shaft 110 also to rotate in the same direction. While the baler 24 is operating, the second cranks 114A, 114B are rotating about the axis "Z", so that the protection assembly 109 is continuously activated.

As outlined above, one type of malfunction may be a blocking of the needles 92, e.g., preventing them from moving to their extended position when required, or the needles 92 may become jammed in a position in which they are partially extending into the chamber 28. Those skilled in the art would appreciate that if the needles 92 are held in an intermediate position between their retracted and extended positions, then the needle yoke 94 would at that time also be held in a corresponding intermediate position, i.e., between the home and activated positions of the needle yoke 94. As an example, the needles 92 may become jammed and hold the needle yoke 94 in an intermediate position thereof (i.e., between its home and activated positions) that is illustrated in FIG. 5A. (It can be seen in FIG. 5A that the needle yoke 94 is at that time in a corresponding intermediate position thereof.)

The protection assembly 109 addresses the risk of malfunction by moving the needle yoke 94 from any intermediate position thereof to the home position thereof, thereby bringing the needles 92 to the retracted position thereof. From the foregoing, it can be seen that, if (for example) the needles 92 are jammed in the slots 51 in the floor of the compression chamber or otherwise prevented from moving through their cycle, the protection assembly 109 moves the needle yoke 94 to the home position thereof, thereby bringing the needles 92 to the retracted position thereof.

When the needles 92 are removed from the compression chamber 28 in this way, damage to the needles 92 is avoided, even though there has been a malfunction.

As can be seen in FIG. 11, the bales are pushed into an exit chamber 39 from the compression chamber 28. Preferably, the baler 24 includes a shield assembly 45 (FIG. 11). For clarity of illustration, the shield assembly 45 is omitted from FIG. 12.

As noted above, as bales are formed in the compression chamber 28, one at a time, each new bale is pushed rearwardly (i.e., toward and through the exit chamber 39) (FIG. 13A). It will be understood that the lower segments 31' of the bales are shown in FIG. 13A, because FIG. 13A is a horizontal longitudinal section. As indicated by arrow "Q" in FIG. 13A, The bales are pushed past the exit chamber 39, one at a time, as each new bale is formed in the compression chamber 28. Those skilled in the art would appreciate that the bale positioned furthest rearwardly may be allowed to fall off a rear platform 57 (FIG. 13B). A ramp 59 may be positioned rearwardly of the rear platform 57 to allow bales to slide from the rear platform 57 down to the ground.

FIG. 13B is the same view as FIG. 13A, except that the bale segments 31' shown in FIG. 13A have been omitted from FIG. 13B in order to show certain elements of the baler 24.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

I claim:

1. A baler (24) for forming crop material into at least one bale, the baler (24) comprising:

a compression chamber (28) in which the crop material is compressed into said at least one bale (31), the compression chamber (28) being partially defined by a floor (86) with slots (51) therein;

a plunger (26) for compressing the crop material;

a plunger subassembly (27) configured to move the plunger (26) between extended and retracted positions thereof in the compression chamber (28), to compress the crop material into said at least one bale in the compression chamber (28) when the plunger is in the extended position, wherein the plunger locates said at least one bale in a predetermined compression position in the compression chamber when the plunger is in the extended position;

a feeder assembly (29), for feeding the crop material into the compression chamber when the plunger is in the retracted position thereof;

a knotter mechanism (22), for knotting twine (37) that has been pulled onto said at least one bale in the predetermined compression position;

a knotter control assembly (20) for controlling the knotter mechanism (22), the knotter control assembly being configured to move between a home condition thereof in which the knotter mechanism is deactivated, and an engaged condition thereof in which the knotter mechanism is activated, the knotter control assembly comprising:

a drive sprocket (32) defining an axis (X) thereof, the drive sprocket being rotatable about the axis (X) in timed relationship with movement of the plunger (26) between the extended and retracted positions thereof;

a clutch plate (34) coaxially connected to the drive sprocket (32) by at least one rubber bushing (35), the clutch plate comprising a roller path (36) with a drive cam (38) formed in the roller path (36);

a knotter shaft (40) positioned coaxial to the clutch plate, the knotter shaft being operatively connected with the knotter mechanism, wherein rotation of the knotter shaft in a predetermined direction about the axis (X) activates the knotter mechanism, to knot the twine wrapped onto said at least one bale;

an actuation subassembly (42) for engaging and disengaging the clutch plate (34) with the knotter shaft (40);

a bale length mechanism, for activating the actuation subassembly when said at least one bale is located in the predetermined compression position, wherein, when the actuation subassembly is activated, the actuation subassembly engages the clutch plate with the knotter shaft to move the knotter control assembly (20) to the engaged condition thereof, thereby activating the knotter mechanism, wherein the knotter mechanism knots the twine on said at least one bale, and wherein, upon the knotter mechanism completing knotting the twine, the actuation subassembly disengages the knotter shaft from the clutch plate, to deactivate the knotter mechanism.

2. The baler according to claim 1 in which:

the actuation subassembly (42) comprises:

a collar (43) at least partially secured to the knotter shaft;

a control arm (44);

a stop arm (46) partially supported by the control arm, the stop arm comprising at least one upper engagement surface (48);

a trip arm (50) pivotably mounted to the collar (43), the trip arm (50) comprising a body portion (52) and first and second arms (53, 54) extending from the body portion (52), the first arm (53) comprising a drive roller (58) rotatably mounted thereon, and the second arm (54) comprising a control roller (60) rotatably mounted thereon for rolling engagement with said at least one upper engagement surface (48) of the stop arm (46);

wherein, upon said at least one bale being located in the predetermined compression position, the control arm is moved by the bale length mechanism to an activated position thereof, to move the stop arm to an activated stop arm position;

wherein, the trip arm (50) is moved to a trigger position thereof when the stop arm moves to the activated stop arm position, to locate the drive roller in the drive cam, for engaging the knotter shaft with the clutch plate to rotate the knotter shaft about the axis, to activate the knotter mechanism; and wherein, upon the clutch plate rotating a predetermined radial distance from a preselected start position thereof, the trip arm disengages the drive roller from the drive cam to disengage the knotter shaft from the clutch plate, to deactivate the knotter mechanism.

3. The baler according to claim 2 additionally comprising:

an extension region (99C) of said at least one upper engagement surface (48), wherein, upon the trip arm (50) disengaging the drive roller from the drive cam, if the knotter shaft (40) continues to rotate about its axis (X), the control roller (60) rolls along the extension region (99C), until the knotter shaft ceases rotating.

4. The baler according to claim 2 in which the collar (43) comprises:

a first part (104) secured to the knotter shaft (40); and a second part (106) that is connected to the trip arm (50) and that is secured to the first part (104) by a shear bolt (108) that is configured to be sheared off, to disengage the knotter shaft (40) from the clutch plate (34).

5. The baler according to claim 2 in which, when the actuation subassembly (42) is in a home condition thereof, the drive sprocket (32) and the clutch plate (34) rotate together about the axis (X) of the drive sprocket (32), and the drive roller (58) is disengaged from the roller path (36) on the clutch plate (34).

6. The baler according to claim 5 in which, when the plunger is moved to compress the crop material to form said at least one bale, the actuation subassembly is in the home condition thereof.

7. The baler according to claim 2 in which the first and second arms (53, 54) are formed to locate the drive roller (58) and the control roller (60) axially non-aligned with each other.

8. The baler according to claim 7 in which the drive roller (58) and the control roller (60) are radially non-aligned.

9. The baler according to claim 8 in which the drive roller is positioned closer to the axis (X) of the drive sprocket (32) than the control roller.

10. The baler according to claim 1 additionally comprising:

a plurality of needles (92) for moving through the slots to pull twine onto said at least one bale, when said at least one bale is in the predetermined compression position;

a needle yoke (94) to which the needles are mounted, the needle yoke being movable between home and activated positions thereof for moving the needles through the slots, wherein, when the needle yoke is in the home position thereof, the needles are in a retracted position thereof, and when the needle yoke is in the activated position thereof, the needles are in an extended position thereof, wherein the needles pull the twine onto said at least one bale as the needles are moved between the retracted position and the extended position thereof;

a protection assembly (109) for moving the needle yoke (94) from an intermediate position thereof between the home and activated positions thereof to the home position, the protection assembly (109) comprising:

a second drive sprocket (112) defining an axis (Z) thereof;

a forward shaft (110) coaxially mounted to the second drive sprocket (112);

second cranks (114A, 114B) mounted to the forward shaft (110), wherein the second cranks rotate with the second drive sprocket (112);

second connecting rods (116A, 116B) respectively connected with the second cranks (114A, 114B); and attachment elements (118A, 118B) pivotably connected with the needle yoke (94), the attachment elements being respectively pivotably connected with the second connecting rods (116A, 116B), wherein rotation of the forward shaft (110) about the axis (Z) thereof causes corresponding movement of the second cranks (114A, 114B), causing corresponding movement of the respective connecting rods (116A, 116B), to move the needle yoke (94) to the home position thereof.

11. The baler according to claim 1 additionally comprising:

a plurality of needles (92) for moving through the slots to pull twine onto said at least one bale, when said at least one bale is in the predetermined compression position;

a needle yoke (94) to which the needles are mounted, the needle yoke being movable between home and activated positions thereof for moving the needles through the slots, wherein, when the needle yoke is in the home position thereof, the needles are in a retracted position thereof, and when the needle yoke is in the activated position thereof, the needles are in an extended position thereof, wherein the needles pull the twine onto said at least one bale as the needles are moved between the retracted position and the extended position thereof; and the needle yoke (94) being pivotably connected to rods (96A, 96B) that are pivotably mounted to cranks (90A, 90B) secured to the knotter shaft (40), wherein the cranks (90A, 90B) rotate when the knotter shaft (40) rotates, to move the needle yoke between the home and activated positions thereof, for corresponding movement of the needles between the retracted and extended positions thereof respectively.

12. The baler according to claim 11 additionally comprising:

a hay dog assembly, comprising:

a hay dog yoke (87);

a plurality of hay dogs (84) pivotably mounted to the hay dog yoke (87);

the hay dog yoke being pivotably connected to the cranks (90A, 90B) via respective hay dog rods (88A, 88B);

the hay dog yoke (87) being movable between a first position thereof when the needle yoke (94) is in the home position thereof and a second position thereof when the needle yoke is in the activated position thereof, wherein, when the hay dog yoke is in the first position thereof, the hay dogs are in a lowermost position thereof below the floor (86), and when the hay dog yoke is in the second position thereof, the hay dogs are in an uppermost position thereof and urged against said at least one bale in the predetermined compression position thereof, to move the crop material that is located in the slots against said at least one bale.

* * * * *